United States Patent
Urano

(10) Patent No.: US 7,535,153 B2
(45) Date of Patent: May 19, 2009

(54) DRIVE CONTROL METHOD FOR A PIEZOELECTRIC ACTUATOR, DRIVE CONTROL APPARATUS FOR A PIEZOELECTRIC ACTUATOR, AND ELECTRONIC DEVICE

(75) Inventor: Osamu Urano, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 11/507,500

(22) Filed: Aug. 22, 2006

(65) Prior Publication Data

US 2007/0046144 A1 Mar. 1, 2007

(30) Foreign Application Priority Data

| Aug. 23, 2005 | (JP) | ............................. 2005-241096 |
| Oct. 27, 2005 | (JP) | ............................. 2005-312368 |
| May 11, 2006 | (JP) | ............................. 2006-132475 |

(51) Int. Cl.
*H01L 41/08* (2006.01)
(52) U.S. Cl. ............................................. 310/316.02
(58) Field of Classification Search ............ 310/316.01, 310/316.02, 317
See application file for complete search history.

(56) References Cited

U.S. PATENT DOCUMENTS

| 4,833,358 | A | * | 5/1989 | Suzuki et al. | .......... 310/316.02 |
| 6,229,245 | B1 | * | 5/2001 | Kitani | .................... 310/316.02 |
| 7,247,970 | B2 | * | 7/2007 | Matsuzaki et al. | ..... 310/316.02 |
| 2002/0096970 | A1 | * | 7/2002 | Hayashi et al. | ........ 310/316.02 |
| 2003/0107298 | A1 | * | 6/2003 | Matsushita et al. | ..... 310/316.02 |
| 2005/0110368 | A1 | * | 5/2005 | Varadi et al. | ........... 310/316.02 |

FOREIGN PATENT DOCUMENTS

| JP | S64-8875 A | 1/1989 |
| JP | 2506895 B | 4/1996 |

* cited by examiner

*Primary Examiner*—Mark Budd
(74) *Attorney, Agent, or Firm*—Global IP Counselors, LLP

(57) ABSTRACT

The piezoelectric actuator drive control device has a controller, and executes an initialization process including an optimum phase difference acquisition process P1 and a phase difference inversion detection process P4 at a predetermined frequency. As a result, the optimum phase difference is updated each time the optimum phase difference acquisition process P1 runs to account for wear or temperature change from continuous operation. Furthermore, even if the phase difference between the drive signal and detection signal inverts during a drive frequency sweep due to variation in the vibration characteristic of the piezoelectric actuator, the phase difference inversion frequency and clamping frequency are reset each time the phase difference inversion detection process P4 is executed, thus preventing phase difference feedback control errors. Appropriate drive control based on the optimum phase difference can therefore be provided because the suitability and stability of the optimum phase difference are assured.

20 Claims, 38 Drawing Sheets

TBL

| DRIVE FREQUENCY | |
|---|---|
| 253.5 | PHASE DIFFERENCE INVERSION RANGE |
| 253.6 | PHASE DIFFERENCE INVERSION RANGE |
| 253.7 | PHASE DIFFERENCE INVERSION RANGE |
| 253.8 | PHASE DIFFERENCE INVERSION RANGE |
| 253.9 | PHASE DIFFERENCE INVERSION RANGE |
| 254.0 | PHASE DIFFERENCE INVERSION RANGE |
| 255.0 | PHASE DIFFERENCE INVERSION RANGE |
| 255.1 | PHASE DIFFERENCE INVERSION RANGE |
| 255.2 | PHASE DIFFERENCE INVERSION RANGE |
| 255.3 | PHASE DIFFERENCE INVERSION RANGE |
| 255.4 | PHASE DIFFERENCE INVERSION RANGE |
| 255.5 | PHASE DIFFERENCE INVERSION RANGE |

DRIVE CONTROL METHOD FOR A PIEZOELECTRIC ACTUATOR, DRIVE CONTROL APPARATUS FOR A PIEZOELECTRIC ACTUATOR, AND ELECTRONIC DEVICE

CROSS-REFERENCE TO RELATED APPLICATION

This application claims priority to Japanese Patent Application Nos. 2005-241096 and 2005-312368. The entire disclosure of Japanese Patent Application Nos. 2005-241096 and 2005-312368 is hereby incorporated herein by reference.

TECHNICAL FIELD OF THE INVENTION

The present invention relates to a drive control method for a piezoelectric actuator, a drive control apparatus for a piezoelectric actuator, and an electronic device.

PRIOR ART

Piezoelectric devices feature outstanding response and efficiency converting electrical energy to mechanical energy. This has resulted in the development of piezoelectric actuators (ultrasonic motors) that use an oscillator having a piezoelectric device to drive a rotor or other driven body by transferring vibration from the oscillator to the driven body. Piezoelectric actuators are used in cameras, printers, electronic timepieces, toys, and other types of electronic devices, and their use in other applications is expected to continue growing.

Resonance type piezoelectric actuators that operate using the resonance of a piezoelectric vibrator are known from the literature. Driving this type of piezoelectric actuator requires achieving a particular vibration characteristic by keeping the phase difference between the drive signal supplied to the piezoelectric element and the detection signal acquired from the vibration state of the piezoelectric device substantially constant at a value suitable for driving. More specifically, drive control of this piezoelectric actuator defines the optimum phase difference needed to achieve the desired drive state, and controls driving the piezoelectric actuator based on this optimum phase difference.

The frequency of the drive signal supplied to the piezoelectric element must be near the resonance point of the vibrator in order to efficiently drive this piezoelectric actuator, but the resonance point of the vibrator varies according to such factors as the ambient temperature and the load. To overcome this problem, Japanese Patent 2,506,895 and Japanese Unexamined Patent Appl. Pub. S64-8875 teach a phase difference feedback control method for adjusting the frequency of the drive signal (the drive frequency) so that the phase difference goes to the optimum phase difference.

SUMMARY OF INVENTION

Problem to be Solved by the Invention

The optimum phase difference for achieving the desired drive state varies according to individual differences in the pressure applied by the vibrator of the piezoelectric actuator to the driven body, and with change over time in the friction between the vibrator and driven body. The optimum phase difference is an index for piezoelectric actuator drive control, and a change in the optimum phase difference causes the torque output to change and thus makes it difficult to achieve the desired drive efficiency. More specifically, the optimum phase difference suited to achieving a desired drive state is not necessarily constant. This change in the optimum phase difference results from a change in the resonance point, and the drive efficiency of a resonance type piezoelectric actuator drops significantly with just a slight shift in the resonance point and a slight shift in the optimum phase difference from the appropriate value.

Phase difference feedback control as described above causes the drive frequency to track the size of the phase difference to the target phase difference between the drive signal and detection signal, but the size of the phase difference can invert depending upon the drive state. This causes the drive frequency to change in the direction opposite of the appropriate direction, and thus results in unstable drive control.

More specifically, as shown in to FIG. 38, assuming that the desired vibration characteristic can be achieved at optimum drive state G, there is an inversion point Pt where the target phase difference θ in the optimum drive state G is achieved again when sweeping the drive frequency at a specific bandwidth in a specific direction. The tracking direction of the drive frequency based on the size of the phase difference to the target phase difference reverses at approximately this inversion point Pt (this is referred to below as a "phase difference inversion" or "reversing" phenomenon), and the size of phase difference relative to the target phase difference θ increases in range B adjacent to drive range A that is used for driving and includes optimum drive state G. As a result, the drive frequency changes in the direction opposite the appropriate direction, that is, rises, in order to bring the phase difference closer to the target phase difference θ.

This causes the drive state to shift from range B to range C where the slope of the change in the phase difference to the target phase difference θ is the same as in drive range A and the drive frequency changes in the same direction as in drive range A. The drive state therefore does not return to the drive state in range A, and the piezoelectric actuator is driven in an unstable state with low drive efficiency. The drive frequency and phase difference in range C and range B are rather far from being able to achieve the desired vibration characteristic.

The drive state changes from drive range A to range B because drive frequency tracking by means of phase difference feedback control continues uninterrupted while driving the piezoelectric actuator. While this phase difference inversion does not have a particularly great effect when drive control uses a fixed drive frequency, arrangements that use a fixed drive frequency cannot adjust the drive frequency to accommodate changes in the resonance point resulting from changes in temperature or load. When the piezoelectric actuator is used in an environment subject to large temperature fluctuations, or when the piezoelectric element generates heat from continuous driving or by applying a heavy drive current, the drive frequency is preferably increased or decreased appropriately by means of phase difference feedback control or other method.

The problem is that while changes in temperature and load can be accommodated by variably controlling the drive frequency by means of phase difference feedback, the drive frequency is adjusted in the wrong direction as a result of the slope of the change in the phase difference reversing, and an unstable drive state results.

One factor contributing to this phase difference inversion problem is deviation introduced during vibrator assembly. More specifically, the vibrator commonly includes a plurality of piezoelectric elements bonded to opposite sides of a reinforcing member. Deviation in bonding causes a shift in the phase of the piezoelectric elements, and the accumulated effects of these phase shifts result in phase difference inversion.

It is also possible to drive the piezoelectric elements with a single drive signal of a frequency between the resonance point of the longitudinal oscillation and the resonance point of the sinusoidal oscillation, instead of supplying two different drive signals of different phase as taught in Japanese Unexamined Patent Appl. Pub. S64-8875. This combination of the longitudinal oscillation phase and sinusoidal oscillation phase also sufficiently accounts for phase difference inversion.

Considering the problems described above, an object of the present invention is to provide a drive control method for controlling driving a piezoelectric actuator suitably and stably as the drive conditions required to maintain a particular drive state change, to provide a drive control apparatus for a piezoelectric actuator, and to provide an electronic device.

Means for Solving the Problem

A first aspect of the invention is a drive control method for a piezoelectric actuator that has an oscillator that vibrates when a drive signal is supplied to a piezoelectric element, transfers vibration of the oscillator to a driven body, and detects a vibration state of the oscillator. The drive control method has an initialization process including an optimum phase difference acquisition process for acquiring an optimum phase difference, which is the phase difference between the drive signal and a detection signal representing the detected vibration state that achieves a predetermined drive state, by means of a drive signal frequency sweep, and a phase difference inversion detection process for sweeping a predetermined range of drive signal frequencies including the frequency achieving the predetermined drive state in a predetermined direction while detecting the phase difference between the drive signal and detection signal, and detecting as a phase difference inversion frequency the frequency at which the phase difference again equals the optimum phase difference; and a drive process for causing the frequency of the drive signal to track the phase difference by detecting the phase difference between the drive signal and detection signal and increasing or decreasing the drive signal frequency based on the size of the phase difference relative to the optimum phase difference while limiting the drive signal frequency from reaching a clamping frequency that is set to a value on a specific drive state side of the phase difference inversion frequency. The optimum phase difference and phase difference inversion frequency are updated by executing the initialization process at a predetermined frequency.

Another aspect of the invention is a drive control device for a piezoelectric actuator that has an oscillator that vibrates when a drive signal is supplied to a piezoelectric element, transfers vibration of the oscillator to a driven body, and detects a vibration state of the oscillator. The drive control device has an initialization means including a phase difference detection means for detecting a phase difference between the drive signal and a detection signal representing the detected vibration state, an optimum phase difference acquisition means for acquiring an optimum phase difference, which is the phase difference that achieves a predetermined drive state, based on a drive signal frequency sweep and phase difference detection by the phase difference detection means, and a phase difference inversion detection means for sweeping a predetermined range of drive signal frequencies including the frequency achieving the predetermined drive state in a predetermined direction while detecting the phase difference between the drive signal and detection signal, and detecting as a phase difference inversion frequency the frequency at which the phase difference again equals the optimum phase difference; a drive means for setting the frequency of the drive signal based on the optimum phase difference; and an acquisition frequency control means for updating the optimum phase difference and phase difference inversion frequency by executing the process of the initialization means at a predetermined frequency. The control means includes a clamping means for limiting the drive signal frequency from reaching a clamping frequency that is set to a value on a specific drive state side of the phase difference inversion frequency, and the control means causes the frequency of the drive signal to track the phase difference by detecting the phase difference by means of the phase difference detection means and increasing or decreasing the drive signal frequency based on the size of the phase difference relative to the optimum phase difference while limiting the drive signal frequency by means of the clamping means.

This invention acquires the optimum phase difference at a predetermined frequency during the initialization process, thereby updating the optimum phase difference to a suitable corrected optimum phase difference. As a result, suitable drive control based on this optimum phase difference can be applied and the desired drive efficiency can be achieved by applying the drive force (torque) required to suitably drive the driven body even when the optimum phase difference needed to achieve a specific drive state changes as a result of change over time in the pressure between the oscillator and driven body due to wear or change in temperature due to continuously driving the piezoelectric actuator.

This predetermined acquisition frequency can be set to an interval from multiple minutes to multiple hours, to a number of startup operations, or the number of times some other specific operation is executed.

Phase difference inversion is also detected during the initialization process. More specifically, by detecting the frequency at which phase difference inversion occurs with the optimum phase difference initialized (or updated) in the initialization process, the phase difference inversion frequency is also updated when the optimum phase difference is updated.

More specifically, the phase difference inversion detection process sweeps the drive signal frequencies while detecting the phase difference between the drive signal and detection signal, and detects as the phase difference inversion frequency the frequency at which the phase difference again equals the optimum phase difference. To prevent the size of the phase difference relative to the optimum phase difference from inverting during drive control after initialization, tracking the drive signal frequency to the phase difference is controlled while limiting the drive frequency so that the frequency of the drive signal does not go to the clamping frequency, which is set based on the phase difference inversion frequency. As a result, incorrectly changing the drive frequency in the wrong direction as a result of phase difference inversion can be prevented, and stable drive control can be achieved. Note that the phase difference inversion frequency and the clamping frequency can be the same.

The present invention can thus accommodate changes in the resonance point and the optimum phase difference due to temperature change or the effects of aging, such as wear, and when the phase difference inverts during a frequency sweep as a vibration characteristic of the piezoelectric actuator. The application range of piezoelectric actuators can therefore be further increased (including long term continuous operation)

and reliability can be improved regardless of the environment in which the piezoelectric actuator is used and how long the piezoelectric actuator is driven continuously, and cost can be reduced.

The present invention applies phase difference feedback control based on an optimum phase difference to compare the phase of the detection signal denoting the vibration state of the oscillator and the phase of the drive signal, and can therefore desirably control drive efficiency expressed as the piezoelectric actuator current or how much (the speed, for example) the driven body is driven. Speed control of the driven body is thus possible.

A piezoelectric actuator drive control method according to another aspect of the invention is applied to a piezoelectric actuator that is incorporated in a timekeeping device including a timekeeping unit and a time display unit for displaying time information kept by the timekeeping unit, and drives the time display unit. The optimum phase difference acquisition process includes a motion resetting step for resetting the position of the driven body that moved while the optimum phase difference acquisition process executed to the position when the optimum phase difference acquisition process started; and the drive process controls movement of the driven body based on a command value output from the timekeeping unit according to the execution time of the initialization process.

In a piezoelectric actuator in which gears and other parts that operate in conjunction with the hands or other time display unit are assembled as the driven body in a watch or other timekeeping device, movement of the driven body during the initialization process can be cancelled, and error in the movement resulting from executing the initialization process and deviation in the time can be eliminated.

In a piezoelectric actuator drive control method according to another aspect of the invention, the phase difference inversion detection process stores values from the clamping frequency to the phase difference inversion frequency in a storage means.

In a piezoelectric actuator drive control device according to another aspect of the invention, the control means includes a storage means for storing values from the clamping frequency to the phase difference inversion frequency.

By thus storing values from the clamping frequency to the phase difference inversion frequency, it is not necessary to set the clamping frequency based on the phase difference inversion frequency each time the phase difference is fed back, and the arrangement can thus be simplified.

In a piezoelectric actuator drive control method according to another aspect of the invention, the drive direction of the driven body can be switched to a forward direction or a reverse direction; and the initialization process is executed when the drive direction of the driven body changes.

In a piezoelectric actuator drive control device according to another aspect of the invention, the drive direction of the driven body can be switched to a forward direction or a reverse direction; and the initialization means is used when the vibration behavior changes.

When the drive direction of the driven body is changed, the initialization process is executed again to update the optimum phase difference and phase difference inversion frequency. As a result, stable suitable drive control is not lost when the vibration characteristic of the oscillator differs (is not symmetrical) when the driven body is driven forward and when the driven body is driven in reverse.

In a piezoelectric actuator drive control device according to another aspect of the invention, the oscillator vibrates in a plurality of oscillation modes; and the drive signal is single phase.

By thus driving the piezoelectric element in a plurality of vibration modes by supplying a single phase drive signal, the arrangement can be simplified compared with using a multiphase drive signal.

In a piezoelectric actuator drive control device according to another aspect of the invention, the oscillator has a flat, substantially rectangular shape; and the plural oscillation modes render a mixed mode combining longitudinal oscillation extending and contracting along a longitudinal axis of the oscillator, and sinusoidal oscillation that curves relative to the longitudinal axis.

By supplying to the oscillator a drive signal of a frequency between the resonance point of the longitudinal oscillation and the resonance point of the sinusoidal oscillation, an elliptical oscillation is produced in a part of the oscillator which can be used to drive a rotor or other driven body with high efficiency using a simple construction.

When a single phase drive signal is supplied to induce a mixed oscillation mode combining longitudinal oscillation and sinusoidal oscillation, the combination of the longitudinal oscillation phase and the sinusoidal oscillation phase can easily result in inversion of the phase difference between the drive signal and detection signal. As a result, the effect of achieving stable drive control by means of a clamping process based on detecting the phase difference inversion frequency and the phase difference inversion frequency or clamping frequency is particularly pronounced.

An electronic device according to another aspect of the invention includes a piezoelectric actuator; a driven body that is driven by the piezoelectric actuator; and the piezoelectric actuator drive control device described above.

By including the piezoelectric actuator drive control device of this invention, the same operation and effect can be achieved in the electronic device.

More specifically, the present invention can be used to provide appropriate, stable drive control that is resistant to changes in temperature, wear, load fluctuations, and other effects of aging, and is suitable for use in electronic devices that may be used outdoors or in environments subject to severe temperature change, changes in load from changes in attitude when the electronic device is worn, and electronic devices that may be subject to heating from the application of high current or continuous operation. Examples of such electronic devices include cell phones, personal data assistant devices (PDA), mechanical toys, cameras, and printers.

An electronic device according to another aspect of the invention is a timepiece including a timekeeping unit, and a time information display unit for displaying the time information kept by the timekeeping unit.

Thus included, the piezoelectric actuator can accurately drive the gears of the timekeeping unit and the hands, for example, of the time information display unit, and reliability can thus be improved.

Using the piezoelectric actuator to drive a time display mechanism for the hour, minute, or second, for example, affords an accurate movement, and prevents unstable drive control even when heat is produced from continuous operation.

The piezoelectric actuator can also be used for intermittent drive when calendar information changes to drive a timekeeping unit or time display unit for keeping calendar information such as the day, month, or weekday.

Other advantages of a piezoelectric actuator can also be achieved, including magnetic resistance, high speed response with small increments, a small, thin footprint, and high torque output.

The piezoelectric actuator drive control device of this invention can be achieved as a hardware device or by using a software control program.

This control program can simply cause a computer incorporated in the drive control device to function as the control means and phase difference detection means.

This aspect of the invention affords the same operation and effects as the drive control device described above.

This control program can be written to the computer over a network, or by means of a computer-readable data storage medium to which the program is written.

The desired control program can also be incorporated when the product is shipped from the factory or as selected by the user after purchase because the functions of the various aspects of the invention can be rendered by simply writing the control program distributed by such a data storage medium or communication means such as the Internet to the timepiece or portable device. This also affords greater use of common parts in different products, and greatly reduces the cost of manufacturing a wide range of products, because timepieces and portable devices having different control methods can be manufactured by simply changing the control program.

EFFECT OF THE INVENTION

This invention enables maintaining suitable drive control even when the drive conditions, such as the phase difference required to achieve a specific drive state, change, and can maintain stable drive control even when the temperature or load change when tracking the drive frequency to the phase difference.

BRIEF DESCRIPTION OF THE DRAWINGS

FIG. 18 shows a data table stored in the storage means in a preferred embodiment of the invention.

DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A preferred embodiment of the present invention is described below with reference to the accompanying figures.

1. General Configuration

Figure 1:
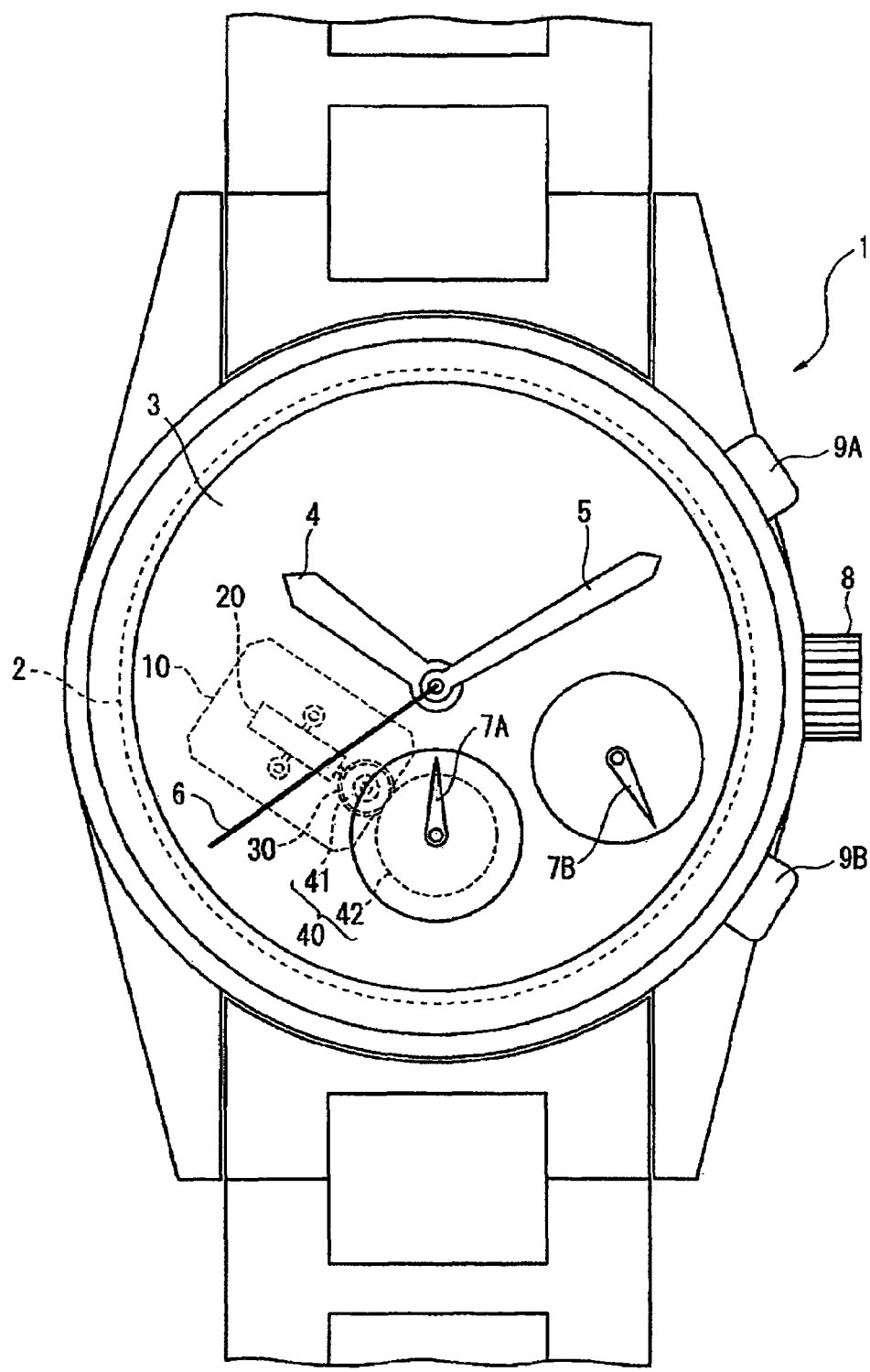
FIG. 1 shows a timepiece according to a first embodiment of the invention.

FIG. 1 is a plan view of an electronic timepiece 1 according to this embodiment of the invention. This electronic timepiece 1 is a wristwatch (watch) that is a timekeeping device having a movement 2 as the timekeeping unit, a dial 3, hour hand 4, minute hand 5, and seconds hand 6 as a time information display unit for displaying the current time, and a chronograph seconds hand 7A and chronograph minutes hand 7B for displaying the chronograph time. A crown 8, and chronograph operating buttons 9A and 9B on opposite sides of the crown 8, are disposed to the case of the electronic timepiece 1.

The hour hand 4, minute hand 5, and seconds hand 6 are the same as in analog quartz watch, and are driven by means of a circuit board having a quartz oscillator, a stepping motor having a coil, stator, and rotor, a drive wheel chain, and a battery.

2. Chronograph Seconds Hand Drive Mechanism

The drive mechanism for driving the chronograph seconds hand 7A includes a piezoelectric actuator (ultrasonic motor) 20, a rotor 30 that is a driven body rotationally driven by the piezoelectric actuator 20, and a speed reducing gear train 40 for transferring the rotation of the rotor 30 while reducing the speed of rotation.

The speed reducing gear train 40 includes a gear 41 that is disposed coaxially to the rotor 30 and rotates in unison with the rotor 30, and a gear 42 that meshes with gear 41 and is fixed to the rotational shaft of the chronograph seconds hand 7A.

Figure 2:
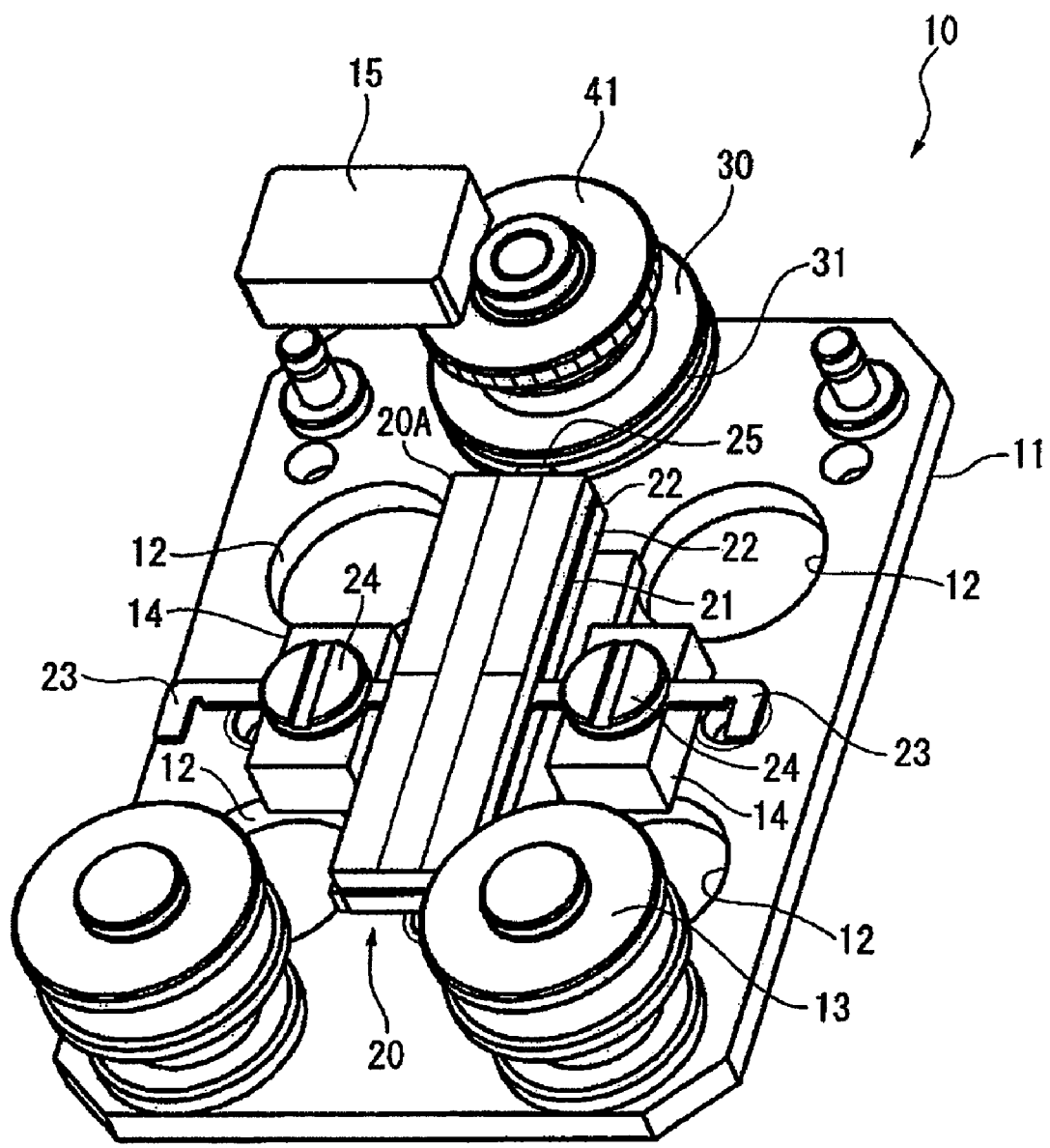
FIG. 2 is an oblique view of the piezoelectric actuator unit in the first embodiment of the invention.
Figure 3:
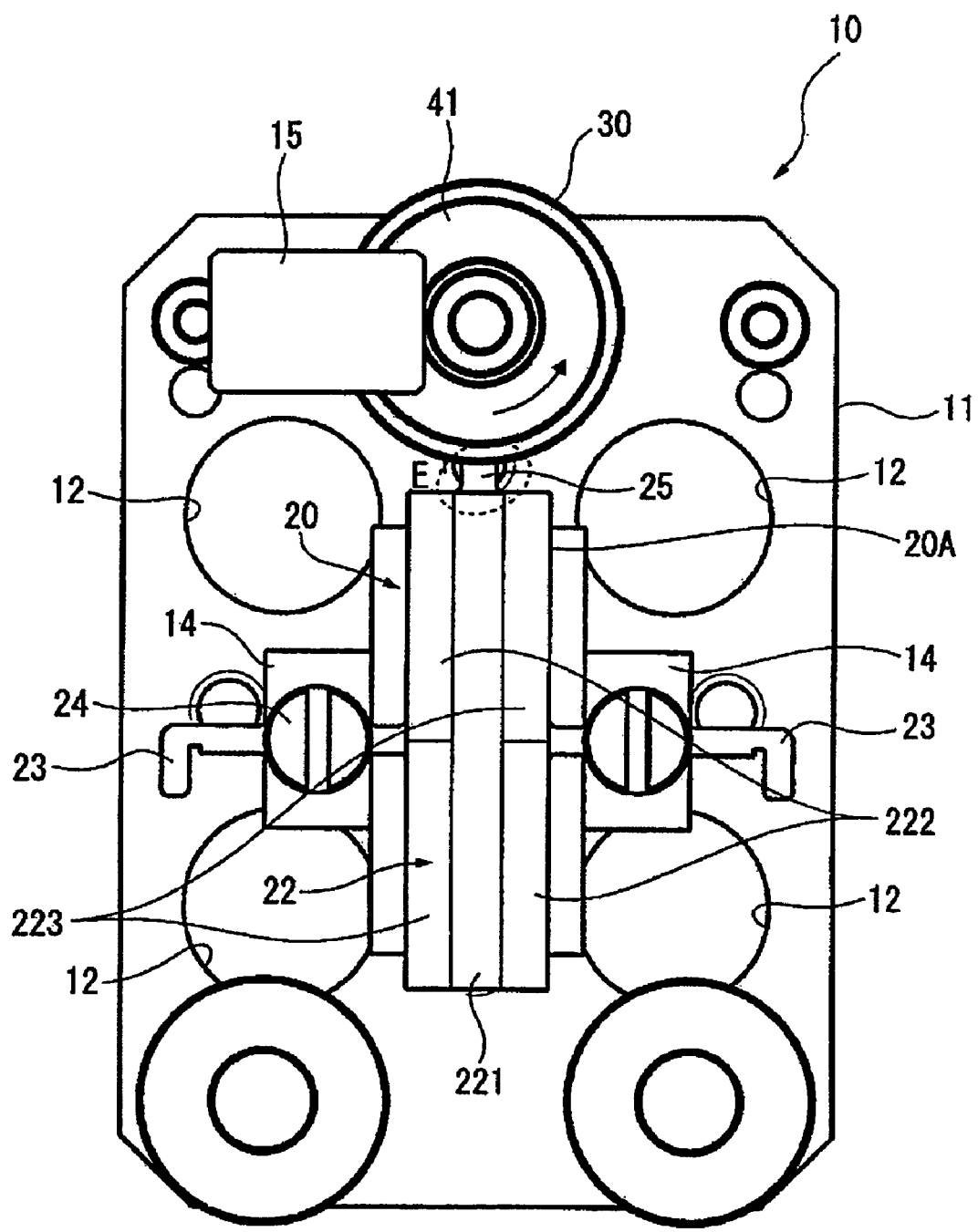
FIG. 3 is a plan view of the piezoelectric actuator unit in the first embodiment of the invention.

As shown in FIG. 2 and FIG. 3, the piezoelectric actuator 20, rotor 30, and gear 41 are part of a piezoelectric actuator unit 10.

3. Arrangement of the Piezoelectric Actuator Unit

The piezoelectric actuator unit 10 also includes a support plate 11 that is fixed to the base plate of the electronic timepiece 1, for example, a piezoelectric actuator 20 fixed to the support plate 11, and a rotor 30 and gear 41 disposed to rotate freely on the support plate 11.

Gear 41 is disposed so that gear 41 rotation can be detected by a rotation sensor 15 disposed above the gear 41.

Holes 12 are rendered in the support plate 11 to reduce the weight, and the support plate 11 is secured to the base plate, for example, by screws or other fasteners 13. Spacers 14 for mounting the piezoelectric actuator 20 are also affixed to the support plate 11.

4. Arrangement of the Piezoelectric Actuator

As shown in FIG. 2 and FIG. 3, the piezoelectric actuator 20 includes an oscillator 20A having a substantially rectangular, flat reinforcing plate 21 and piezoelectric elements 22 bonded to both sides of the reinforcing plate 21.

The reinforcing plate 21 has arm portions 23 extending to both sides from approximately the center of the long sides of the reinforcing plate 21, and these arm portions 23 are secured by screws 24 to the spacers 14. Note that the reinforcing plate 21 including these arm portions 23 is made from an electrically conductive metal, and the arm portions 23 are also used as electrodes for applying drive signals to the piezoelectric elements 22.

A contact part 25 protruding in the lengthwise direction of the reinforcing plate 21 is formed on one long end of the reinforcing plate 21, specifically the end opposite the rotor 30, with the contact part 25 touching the rotor 30. The contact part 25 is urged by a spring or other suitable urging member so that the contact part 25 contacts the outside surface of the rotor 30 with a specific force when the contact part 25 is set in a specific position relative to the rotor 30, thereby causing suitable friction to work between the contact part 25 and the side of the rotor 30 so that vibration of the oscillator 20A is transferred efficiently to the rotor 30.

A channel 31 (FIG. 2) is formed in the outside surface of the rotor 30, and the contact part 25 is disposed inside this channel 31 in this embodiment of the invention. This channel 31 acts as a guide to prevent the contact part 25 from separating from the contact surface of the rotor 30 in the event a shock is applied to the piezoelectric actuator 20 if the electronic timepiece 1 is dropped, for example.

The piezoelectric elements 22 are substantially rectangular, and are bonded to substantially rectangular portions on both sides of the reinforcing plate 21. Electrodes are rendered on both sides of the piezoelectric elements 22 by sputtering, vapor deposition, or other method.

Figure 4:
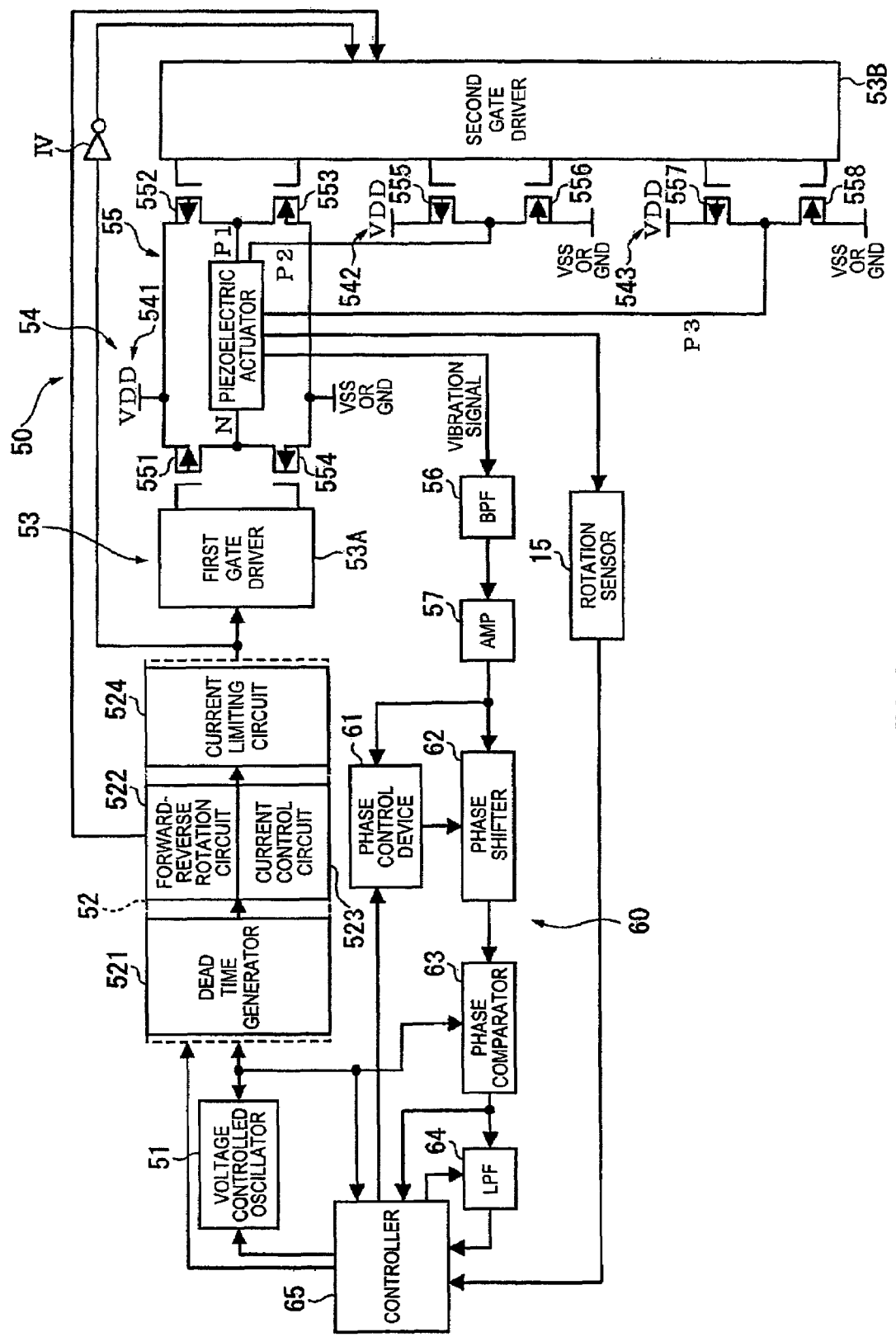
FIG. 4 is a block diagram of the piezoelectric actuator drive control device in the first embodiment of the invention.

A single electrode is formed over the entire surface of the piezoelectric elements 22 facing the reinforcing plate 21, and the piezoelectric elements 22 are electrically connected to the drive control device 50 (FIG. 4) through the reinforcing plate 21 and arm portions 23 that are in contact with this electrode (see N in FIG. 4).

A five-segment electrode is formed on the exposed surface of the piezoelectric elements 22 as shown in FIG. 3. More specifically, the electrode on the outside surface of the piezoelectric elements 22 is divided into three equal parts across the width of the piezoelectric elements 22, and the center electrode is used as drive electrode 221. The electrodes on both sides of the drive electrode 221 are divided lengthwise to the piezoelectric elements 22 into two equal parts, and the diagonally opposite corner electrodes are paired as drive electrodes 222 and drive electrodes 223.

These drive electrodes 221, 222, and 223 are connected by leads to the drive control device 50 (lines P1 to P3 in FIG. 4), and voltage is applied between the drive electrodes and reinforcing plate 21 (see N in FIG. 4). The drive control device 50 has three power supplies, that is, to apply voltage between the drive electrode 221 and reinforcing plate 21, to apply voltage between the drive electrodes 222 and reinforcing plate 21, and to apply voltage between the drive electrodes 223 and reinforcing plate 21.

The drive control device 50 (FIG. 4) of this electronic timepiece 1 supplies a single phase drive signal to the piezoelectric actuator 20 to rotationally drive the rotor 30.

Drive electrodes 222 and drive electrodes 223 disposed to the piezoelectric elements 22 are selectively used depending on whether the chronograph seconds hand 7A is driven to rotate in a specific forward direction or reverse direction, and the rotor 30 can be driven rotationally in either direction according to the vibration behavior of the oscillator 20A.

More specifically, to drive the rotor 30 in the forward direction as a result of the forward vibration behavior of the oscillator 20A, voltage is applied to drive electrode 221 and drive electrodes 222. The phase difference of the resulting mixed vibration mode combining the longitudinal vibration and a sinusoidal vibration produced by the elongation and contraction of the piezoelectric elements 22 causes the contact part 25 of the oscillator 20A to trace an elliptical path E (FIG. 3) biased to the lengthwise center axis of the piezoelectric elements 22. The contact part 25 strikes the rotor 30 during part of this path E, and causes the rotor 30 to rotate in a forward direction (denoted by the arrow in FIG. 3).

To drive the rotor 30 in the reverse direction as a result of the reverse vibration behavior of the oscillator 20A, voltage is applied to drive electrode 221 and drive electrodes 223 instead of drive electrodes 222. Because drive electrodes 222 and drive electrodes 223 are disposed line symmetrically to the lengthwise center axis of the piezoelectric elements 22, sinusoidal oscillation that intersects the longitudinal oscillation substantially line symmetrically to when voltage is applied to drive electrodes 222 is induced. As a result, the path of the contact part 25 of the oscillator 20A is a substantially elliptical path that is substantially line symmetric to the path when voltage is applied to the drive electrodes 222, and the rotor 30 is rotationally driven in the opposite or reverse direction.

When the rotor 30 turns, the gear 41 turns in unison with the rotor 30, causing gear 42 to turn in conjunction with gear 41 rotation, and thus causing the chronograph seconds hand 7A to turn either forward or reverse.

The detection signal (vibration signal) denoting the vibration state of the oscillator 20A is detected through the drive electrodes to which the drive signal is not applied when the rotor 30 turns in a particular direction. As a result, when the rotor 30 rotates forward, the detection signal is detected through drive electrodes 223, and when the rotor 30 rotates in reverse, the detection signal is detected through drive electrodes 222.

5. Configuration of the Piezoelectric Actuator Drive Device

The configuration of the drive control device 50 of the piezoelectric actuator 20 is described next with reference to FIG. 4.

As shown in FIG. 4, the drive control device 50 includes a voltage controlled oscillator (VCO) 51, a pulse control circuit 52, a gate driver 53, a power supply 54, a switching circuit 55, a bandpass filter (BPF) 56, a signal amplifier (AMP) 57, a phase detection means 60, and a controller 65 as a control means.

The voltage controlled oscillator 51 is an oscillator that can vary the frequency of the output signal according to the applied voltage, and generates the drive signal for the piezoelectric actuator 20.

The frequency (drive frequency) of the drive signal is determined according to the resonance point of the longitudinal vibration and the resonance point of the sinusoidal vibration of the oscillator 20A.

Figure 5A:
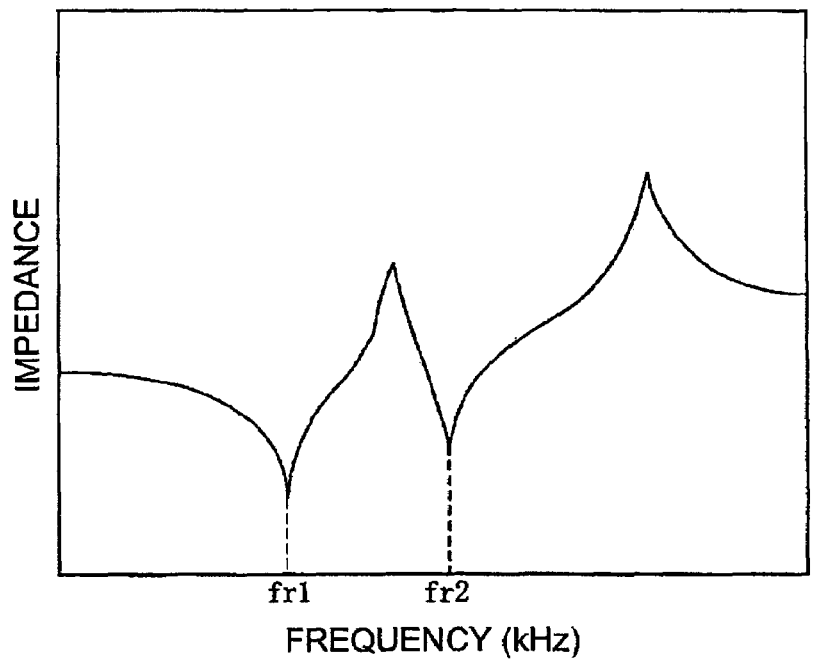
FIG. 5A is a graph showing the relationship between drive frequency and impedance.
Figure 5B:
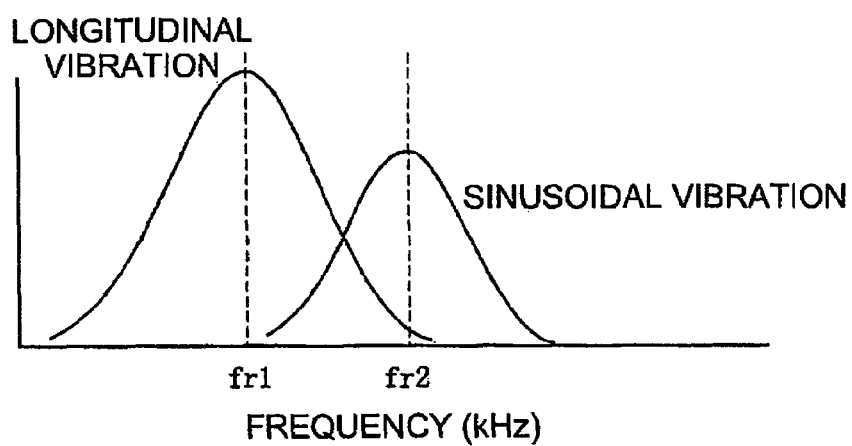
FIG. 5B is a graph showing the relationship between the drive frequency and the amplitude of longitudinal vibration and sinusoidal vibration in an oscillator in the first embodiment of the invention.

FIG. 5A shows the relationship between the drive frequency of the oscillator 20A and impedance, and FIG. 5B shows the relationship between the drive frequency of the oscillator 20A and the amplitude of the longitudinal vibration and the amplitude of the sinusoidal vibration.

As shown in FIG. 5A, there are two resonance points where impedance is lowest and amplitude is highest relative to the drive frequency. The resonance point where the frequency is lower is the resonance point of the longitudinal vibration, and the resonance point where the frequency is higher is the resonance point of the sinusoidal vibration.

More specifically, if the oscillator 20A is driven between the longitudinal resonance frequency fr1 of the longitudinal vibration and the sinusoidal resonance frequency fr2 of the sinusoidal vibration, the amplitude of both the longitudinal vibration and the sinusoidal vibration is assured and the piezoelectric actuator 20 can be driven with high efficiency. Bringing the longitudinal resonance frequency fr1 and sinusoidal resonance frequency fr2 closer together enables setting a drive frequency that results in a higher longitudinal vibration and sinusoidal vibration amplitude.

Referring again to FIG. 4, the pulse control circuit 52 controls the drive signal produced by the voltage controlled oscillator 51, and includes a dead time generator 521 for generating the dead time to control the switching timing of the switching circuit 55 described below and suppress shoot-through current, a forward-reverse rotation circuit 522 and current control circuit 523 for changing the direction of rotor 30 rotation and outputting the appropriate control value, and a current limiting circuit 524 for inserting the dead time at the drive signal period to regulate the drive signal duty.

The forward-reverse rotation circuit 522 outputs a control value for switching the direction of rotor 30 rotation to the second gate driver 53B. More specifically, the forward-reverse rotation circuit 522 selectively outputs control values corresponding to drive electrodes 221 and 222 to the second gate driver 53B to drive the rotor 30 in the forward rotation direction, and selectively outputs control values corresponding to drive electrodes 221 and 223 to drive the rotor 30 in the reverse direction.

The gate driver 53 is a drive circuit for controlling the on/off state of the switching circuit 55 based on the drive signal output from the pulse control circuit 52, and in this embodiment of the invention includes a first gate driver 53A and second gate driver 53B.

The drive signal input from the pulse control circuit 52 to the second gate driver 53B passes inverter (NOT gate) IV, and is inverted to the drive signal input to the first gate driver 53A.

The power supply 54 in this embodiment of the invention includes a first power supply 541 that is used when the rotor 30 rotates forward and reverse, a second power supply 542 that is used only when the rotor 30 rotates forward, and a third power supply 543 that is used only when the rotor 30 turns in reverse. These first, second, and third power supplies 541, 542, and 543 apply a voltage of the potential difference between power supply VDD and VSS, or between VDD and GND, to the piezoelectric actuator 20.

The switching circuit 55 includes switches 551, 552, 555, 557, which are p-channel MOS-FET devices in this embodiment of the invention, and switches 553, 554, 556, 558, which are n-channel MOS-FET devices in this embodiment of the invention. These switches 551 to 556 [sic?, 558?] are controlled by the voltage applied to the gate by first gate driver 53A or second gate driver 53B, and are thereby controlled to the on or off state.

The second gate driver 53B is connected to forward-reverse rotation circuit 522, and drives only switches 552, 553 (FIG. 4, P1) and switches 555, 556 (P2) when the rotor 30 rotates forward.

More specifically, when the rotor 30 turns forward, the first gate driver 53A driving switches 551 and 554, and the second gate driver 53B driving switches 552 and 553 (P1) and switches 555 and 556 (P2), output mutually inverted drive signals, thus setting switches 551 and 552, which are both p-channel MOS-FET devices, to opposite states so that when switch 551 is on, switch 552 is off. This also applies to p-channel MOS-FET switches 551 and 555.

Switches 553 and 554, which are both n-channel MOS-FET devices, behave in the same way. That is, when one switch 553 is on, the other switch 554 is off. This also applies to n-channel MOS-FET switches 556 and 554.

When one of serially connected switches 551 and 554 is on, the other is off. Likewise, when one of serially connected switches 552 and 553, or switches 555 and 556, is on, the other is off.

Switches 551 to 554 (or switches 551, 555, 556, 554) are bridge connected to the piezoelectric elements 22 by first gate driver 53A and second gate driver 53B. The switch circuit rendered by the pair of switches 551, 553 (or switches 551, 556) at diagonally opposite parts of the bridge, and the switch circuit rendered by the pair of switches 552, 554 (or switches 555, 554) are alternately switched on/off. As a result, the specific supply voltage applied by the power supply 54 is converted to an alternating rectangular wave voltage and applied to the piezoelectric actuator 20. In other words, first power supply 541 and second power supply 542 apply an alternating voltage to the piezoelectric elements 22 between the drive electrodes 221 and 222 and reinforcing plate 21 (FIG. 2) to drive the rotor 30 in the forward rotating direction.

To drive the rotor 30 in the reverse direction, second gate driver 53B drives switches 557, 558 (P3) instead of switches 555, 556 (P2) so that switches 551, 552, 553, 554 (or switches 551, 557, 558, 554) are bridge connected to the piezoelectric elements 22. The switch circuit rendered by the pair of switches 551, 553 (and switches 551, 558), and the switch circuit rendered by the pair of switches 554, 552 (or switches 554, 557) are alternately switched on/off. In other words, first power supply 541 and third power supply 543 apply an alternating voltage to the piezoelectric elements 22 between the drive electrodes 221 and 223 and reinforcing plate 21 (FIG. 2) to drive the rotor 30 in the reverse rotating direction.

If the serially connected switches 551, 554 or switches 552, 553 (or switches 555, 556 or switches 557, 558) go on simultaneously when switching the on/off state of switches 551 to 558, shoot-through current flows. Because this shoot-through current is not used for driving the piezoelectric actuator 20, it simply wastes power and can result in burning switch devices. The pulse control circuit 52 therefore prevents shoot-through current flow by waiting a predetermined time (dead time) after turning one switch off before turning the other switch on.

The bandpass filter 56 (single peak) passes only those detection signals detected from the vibration state of the piezoelectric actuator 20 that are within a predetermined frequency band, and eliminates signals of all other frequencies.

The detection signal is detected through the drive electrodes 222 or 223 that are not used to supply the drive signal causing the rotor 30 to rotate forward or reverse (see P2 and P3 in FIG. 5). Using the potential of the arm portions 23 (N in FIG. 5) as a reference signal, the detection signal is detected from the potential difference between the reference signal and the potential of the drive electrodes 222, or the reference signal and the potential of the drive electrodes 223, that is, from a difference signal of the drive electrodes 222 or 223 to the arm portions 23.

The detection signal passed by the bandpass filter 56 is amplified by the signal amplifier 57.

The phase difference detection means 60 includes a phase control device 61, phase shifter 62, phase comparator 63, and lowpass filter (LPF) 64.

The phase control device 61 outputs a control signal to the phase shifter 62 at every second period of the detection signal, and the phase shifter 62 shifts the preset optimum phase difference and the phase of the detection signal according to this control signal.

The phase comparator 63 compares the phase of the detection signal output from the phase shifter 62 and the phase of the drive signal output from the voltage controlled oscillator 51, and outputs the detected phase difference. As noted above, the phase shifter 62 shifts the phase of the detection signal only by the optimum phase difference, and the closer the output of the phase comparator 63 is to zero, the closer the actual phase difference is to the optimum phase difference.

The lowpass filter 64 passes only signals of a frequency less than or equal to a specified frequency, and eliminates signals of a frequency greater than [or equal to, sic] the specified frequency, and functions as an integration circuit.

The phase difference detection means 60 therefore outputs the difference between the phase of the drive signal and the phase of the detection signal shifted by the phase shifter 62, that is, the deviation (magnitude) to the optimum phase difference, through the lowpass filter 64 to the controller 65.

The controller 65 outputs a voltage signal to the voltage controlled oscillator 51 to eliminate deviation to the input optimum phase difference.

Figure 6:
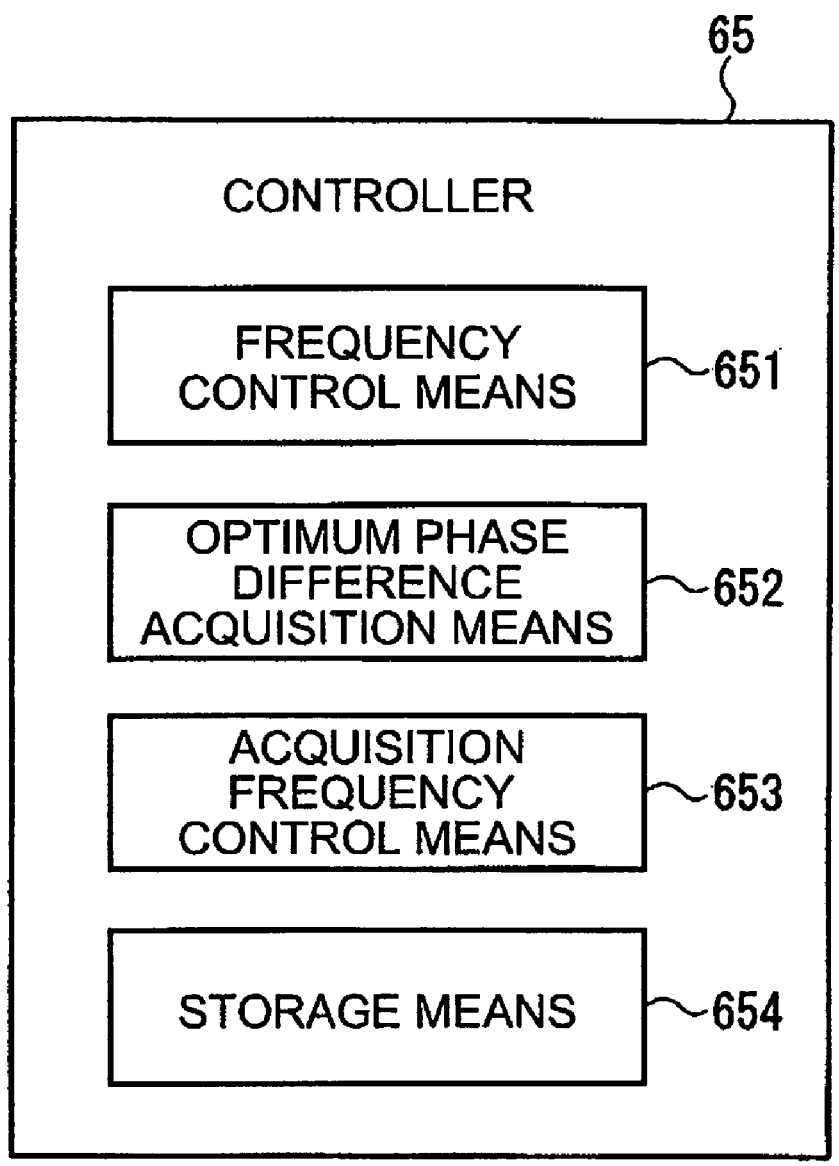
FIG. 6 is a block diagram of the controller in the piezoelectric actuator drive control device in a preferred embodiment of the invention.

FIG. 6 is a block diagram of the controller 65. As shown in the figure, the controller 65 includes a frequency control means 651 for causing the frequency of the drive signal to track the phase difference feedback from the phase difference detection means 60, an optimum phase difference acquisition means 652 for acquiring the optimum phase difference required to achieve the desired drive state, an acquisition frequency control means 653 for controlling how frequently the optimum phase difference is determined, and a storage means 654.

The optimum phase difference acquisition means 652 determines the optimum phase difference at the frequency controlled by the acquisition frequency control means 653. The acquisition frequency is defined in terms of how long the piezoelectric actuator 20 has been continuously driven since operation was started by operating the operating button 9A (see FIG. 1). The acquisition frequency is one hour of continuous driving in this embodiment of the invention, and is stored in storage means 654.

6. Piezoelectric Actuator Drive Control

Operation of the piezoelectric actuator 20 by means of the drive control device 50 is described below with reference to the flow charts in FIG. 7 and FIG. 8.

Figure 7:
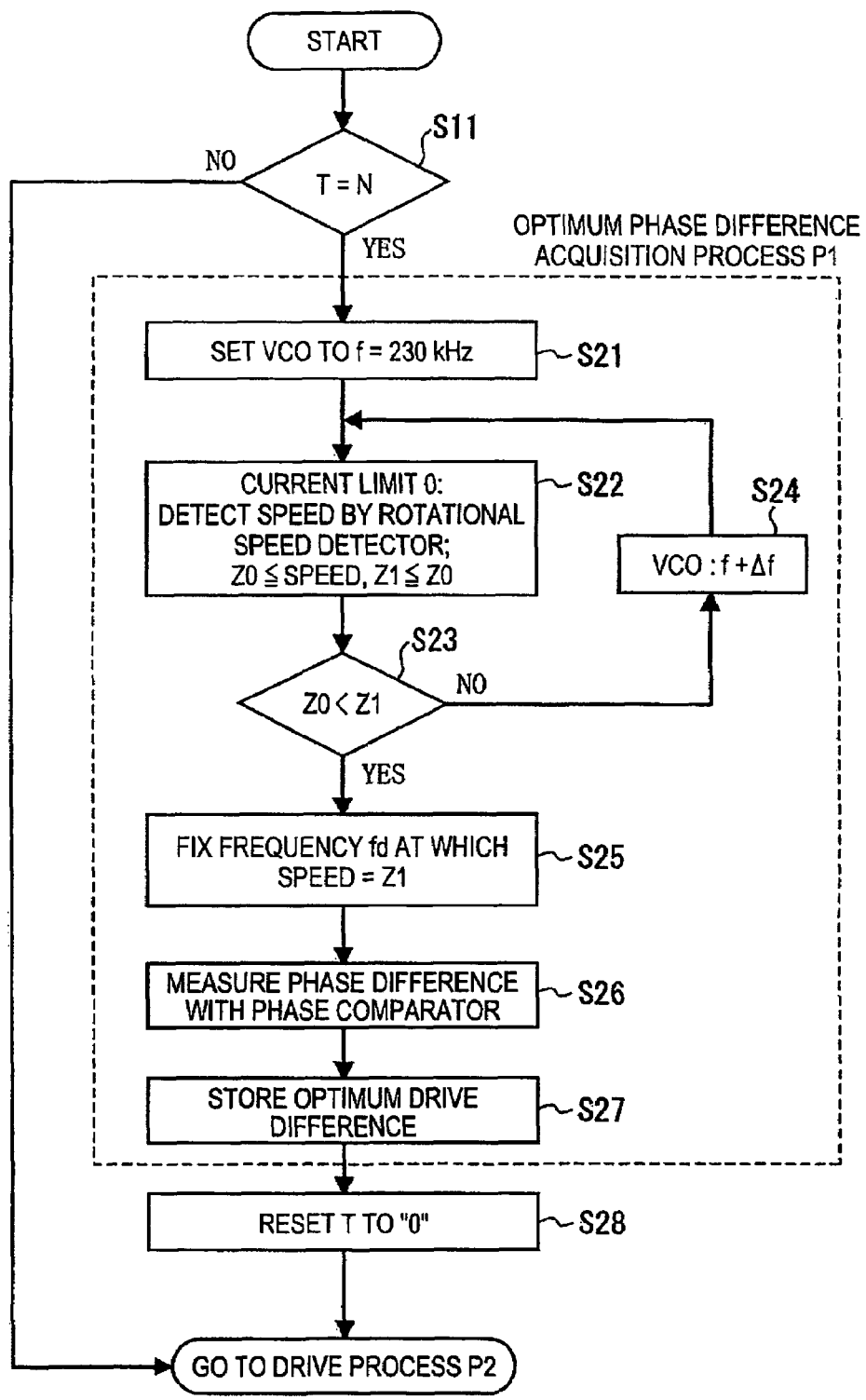
FIG. 7 is a flow chart of the optimum phase difference acquisition process executed by the piezoelectric actuator drive control device in the first embodiment of the invention.
Figure 8:
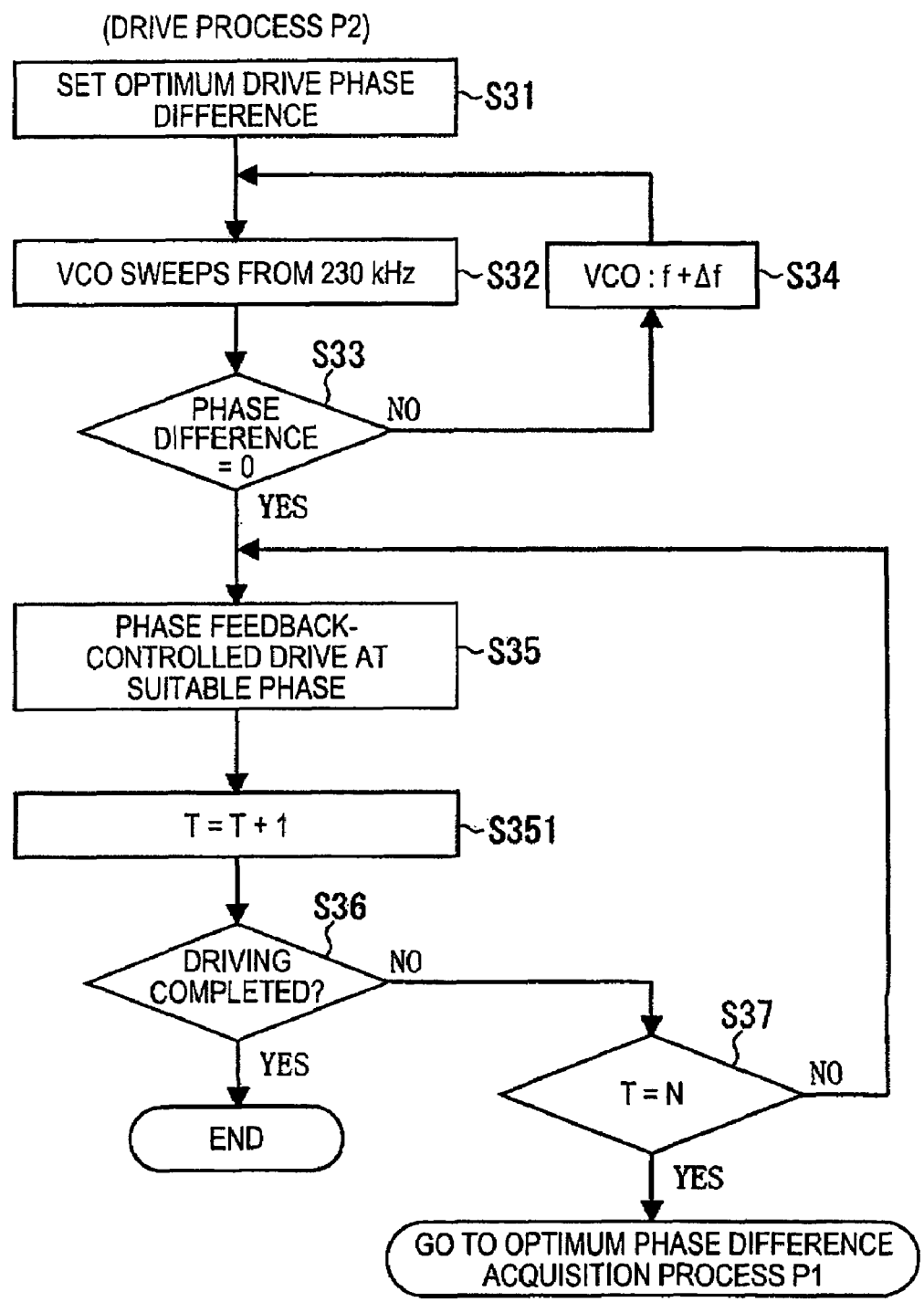
FIG. 8 is a flow chart of the drive process executed by the piezoelectric actuator drive control device in the first embodiment of the invention.

The controller 65 of the drive control device 50 executes the optimum phase difference acquisition process P1 shown in FIG. 7, and the drive process P2 shown in FIG. 8.

6.1 Operation of the Acquisition Frequency Control Means

Referring to FIG. 7, the controller 65 checks the elapsed time T since piezoelectric actuator 20 operation started, that is, the continuous drive time, using the timer function of the acquisition frequency control means 653 (step S11) to execute the optimum phase difference acquisition process P1 at a predetermined frequency. More specifically, if confirmation of the continuous drive time (step S11) determines that the elapsed time T since the piezoelectric actuator 20 started operating has reached the continuous drive time N stored in the storage means 654 of the controller 65 (step S11 returns Yes), the optimum phase difference acquisition process P1 is executed. If not (step S11 returns No), the drive process P2 described in FIG. 8 is executed.

When piezoelectric actuator 20 operation starts, continuous drive time N is initialized to 0.

6.2 Optimum Phase Difference Acquisition Process

In the optimum phase difference acquisition process P1 the optimum phase difference acquisition means 652 of the controller 65 controls driving the rotor 30 to find the desired piezoelectric actuator 20 drive state, which in this embodiment of the invention is defined as operating at substantially maximum efficiency (maximum rotor 30 speed).

More specifically, the frequency of the drive signal produced by the voltage controlled oscillator 51 is first set to a low frequency (230 kHz in this embodiment of the invention) (step S21) and the speed of the rotor 30 is detected based on the speed input from the rotation sensor 15 (FIG. 2) with no current limiting (step S22). Two variables Z0 and Z1 are used to detect the rotational speed. Each time the speed is detected, the current speed is stored to Z0, and Z0 and Z1 are compared. If Z0 is greater than Z1, Z0 is stored to Z1. The speed that is provisionally the maximum rotational speed each time the drive frequency is swept is thus continuously substituted for Z1 and Z1 is thus updated.

Z0 and Z1 are then compared Z0 (step S23), and if Z0 (the currently detected speed) is less than or equal to Z1 (the value provisionally stored as the maximum rotational speed) (step S23 returns No), the peak speed has still not been detected. The drive frequency is therefore increased a predetermined amount (step S24), and sweeping continues. In this embodiment of the invention the drive frequency is increased in 0.5 kHz increments and the drive frequency is swept one way from 230 kHz to 280 kHz. It will be obvious that in this and the following embodiments of the invention the drive frequency can alternatively be swept from high frequency to low frequency.

If Z0 is less than Z1 (step S23 returns Yes), rotor speed is considered to have passed the peak speed. The value of Z1 provisionally stored based on the data from the previous detection instance is therefore set as the frequency denoting the maximum rotor speed (maximum drive efficiency), and control goes to step S25.

The frequency is then fixed to the frequency fd at which the rotor speed equals Z1 (step S25), and the phase comparator 63 then detects the phase difference in this state (step S26). The phase difference detected by the phase comparator 63 is set as the optimum phase difference and stored in the storage means 654 of the controller 65 (step S27).

A piezoelectric actuator 20 that operates using resonance must be driven to achieve a specific vibration characteristic where the phase difference between the drive frequency and detection signal is a substantially constant value suitable for driving the actuator, and the optimum phase difference stored in the storage means 654 is therefore used as a target for drive control by the drive control device 50. The optimum phase difference affording the desired drive characteristic differs in piezoelectric actuators 20 having the same specifications due to deviations in shape and assembly, but running this optimum phase difference acquisition process P1 can eliminate variations in vibration characteristics resulting from differences in individual devices.

The elapsed time T is then reset to 0 (step S28).

This completes the optimum phase difference acquisition process P1 and passes control to the drive process P2.

6.3 Drive Process

In the drive process P2 shown in f8, the frequency control means 651 first sets the optimum phase difference stored by the controller 65 in the optimum phase difference acquisition process P1 to the phase shifter 62 (FIG. 4) (step S31). The drive frequency is then swept from 230 kHz (step S32) and phase difference feedback control is applied by the phase difference detection means 60 (FIG. 4) and frequency control means 651 (FIG. 6). More specifically, the drive frequency is swept using the same frequency increment described above until the phase difference output from the phase comparator 63 goes to 0, that is, until the detected phase difference matches the optimum phase difference set in the phase shifter 62 (steps S33 and S34).

If the phase difference matches the optimum phase difference (step S33 returns Yes), the phase difference detection means 60 continues phase difference feedback control in the same way, thereby causing the frequency of the drive signal to track the phase difference between the detection signal and the drive signal (step S35). More specifically, the frequency control means 651 controls the voltage signal input to the voltage controlled oscillator 51 so that the phase difference equals the optimum phase difference and output from the phase comparator 63 is therefore zero.

During phase difference feedback control (step S35) the controller 65 increments the drive time counter denoting the elapsed time T one every period of a predetermined clock signal.

Phase difference feedback control (step S35) continues until a stop driving command is input to the controller 65 (step S36).

Phase difference feedback control based on the phase difference between the drive signal and detection signal (i.e., the optimum phase difference) is used to control driving the piezoelectric actuator 20 in this embodiment of the invention, but the resonance point may change if friction develops between the contact part 25 and rotor 30 or the pressure of the contact part 25 on the rotor 30 changes when a certain amount of time passes after operation starts when the piezoelectric actuator 20 is driven continuously. While driving the piezoelectric actuator 20 can be initially desirably controlled using phase difference feedback control that maintains the phase difference yielding the maximum drive efficiency in the piezoelectric actuator 20, that is, feedback control that targets the optimum phase difference yielding the desired drive state, change in the vibration characteristic over time may change the optimum phase difference that is targeted by drive control device 50 control to achieve the maximum drive efficiency, and the desired torque may therefore not be achieved.

Figure 9:
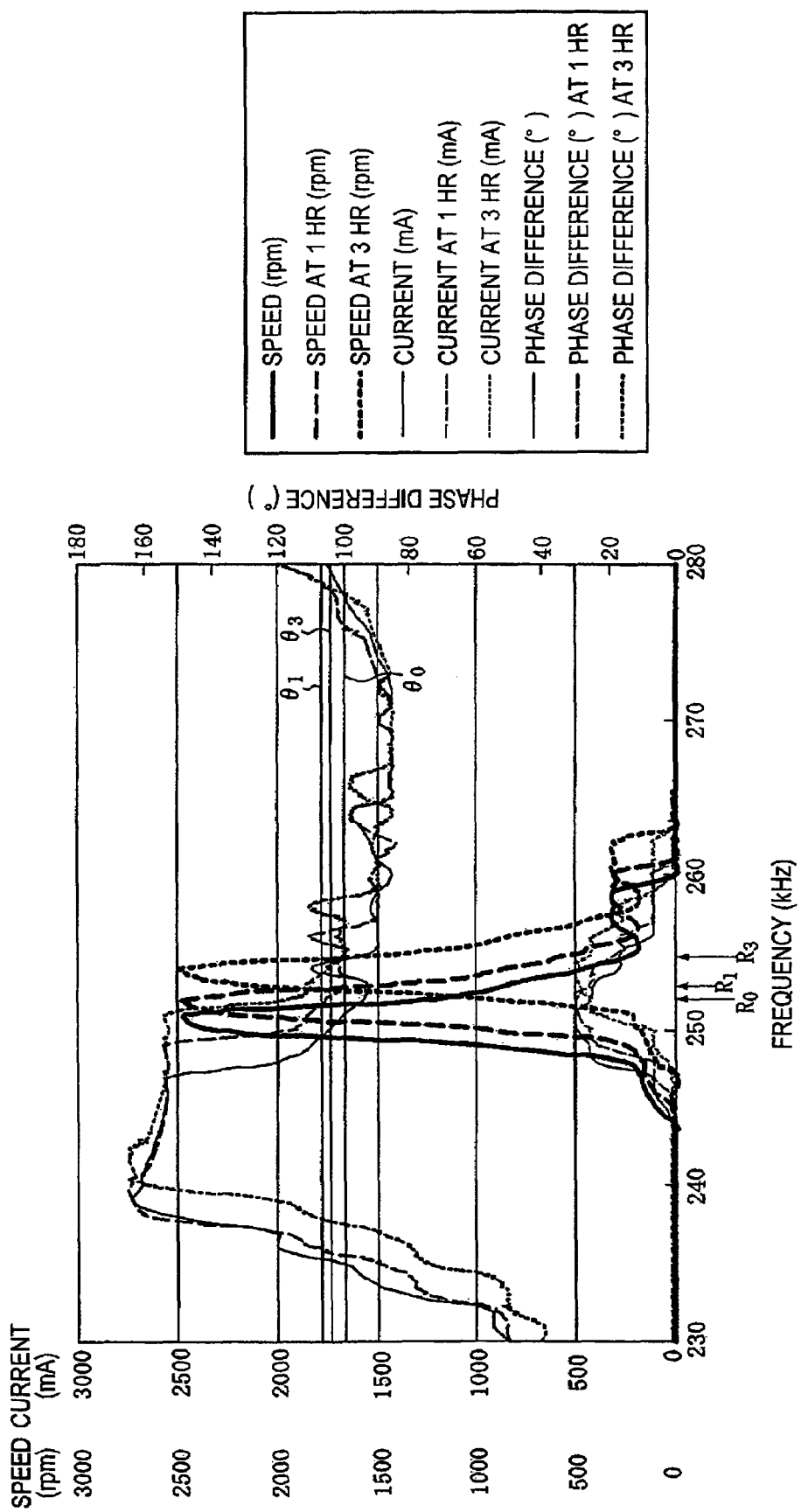
FIG. 9 is a graph showing the change in the piezoelectric actuator drive characteristics in the first embodiment of the invention.

This is described by the graph in FIG. 9 showing the time change in the drive characteristic of the piezoelectric actuator 20.

The speed of the rotor 30, the current supply to the piezoelectric actuator 20, and the phase difference indicated by the solid curves in FIG. 9 are the values acquired by sweeping the drive frequency (x-axis) at the initial start of piezoelectric actuator 20 operation. The speed, current, and phase difference curves indicated by the dotted lines in FIG. 9 were acquired when sweeping the drive frequency at one and three hours after operation started.

As shown in this graph, the speed, current, and phase difference are not constant when sweeping the drive frequency, and change with time after operation starts. The resonance point of the oscillator 20A of the piezoelectric actuator 20 (that is, the drive frequency when speed is near 2500 rpm in FIG. 9) is initially R0 and gradually increases to R1 after one hour and R3 after three hours, and the speed, current, and phase difference therefore shift when sweeping the drive frequency. Causes for this shift are attributed to wear of the rotor 30 and the contact part 25 of the oscillator 20A, and change in the pressure of the contact part 25 urging the rotor 30 to move.

When phase difference feedback control in the drive process P2 continues for a predetermined time corresponding to the time change in the drive characteristic of the piezoelectric actuator 20, the acquisition frequency control means 653 of the controller 65 detects that the elapsed time T has reached continuous drive time N (renewal step S37 in FIG. 8) and therefore runs the optimum phase difference acquisition process P1 shown in FIG. 7 again. The optimum phase difference acquisition process P1 is thus repeated when the continuous drive time (1 hour in this example) stored in the controller 65 passes, and the value defined as the optimum phase difference is thus updated.

While the value θ0 initially set as the optimum phase difference in the example shown in FIG. 9 is approximately 100 degrees, this value is updated to θ1 (approximately 103 degrees) when the optimum phase difference acquisition process P1 is run after one hour of operation. The optimum phase difference acquisition process P1 is again run regularly after two hours and three hours, and when the optimum phase difference acquisition process P1 is run three hours after startup, θ3 (approximately 102 degrees) is defined as the optimum phase difference. The optimum phase difference is again updated at four hours after startup and every hour thereafter.

The value stored and used as the optimum phase difference is thus corrected for shifts in the resonance point over time, and drive control by the drive control device 50 is suitably applied based on the updated optimum phase difference.

7. Effects of this Embodiment of the Invention

The effects of this embodiment of the invention are described below.

(1) The drive control device 50 of the piezoelectric actuator 20 that drives the chronograph seconds hand 7A has a controller 65, and the acquisition frequency control means 653 of this controller 65 runs a optimum phase difference acquisition process P1 at a predetermined frequency. As a result, as the optimum phase difference (the optimum phase difference required to achieve maximum drive efficiency in this embodiment of the invention) required to achieve a desired drive state changes over time, the optimum phase difference is redefined and corrected to a suitable optimum phase difference each time the optimum phase difference acquisition process P1 runs. Because the suitability of the optimum phase difference can thus be assured, suitable drive control can be achieved in the drive process P2 based on this optimum phase difference, producing the torque required to drive the rotor 30 and achieve the desired drive efficiency.

(2) Maximum drive performance can also be obtained from the piezoelectric actuator 20 and drive efficiency can be maximized by the drive process P2 of the drive control device 50 because the drive frequency is adjusted by phase difference feedback control using the optimum phase difference yielding maximum efficiency as the tracking target instead of using a fixed drive frequency.

(3) By incorporating the drive control device 50 into an electronic timepiece 1, which is a wristwatch, driving the timepiece can be desirably controlled to great effect regardless of variation in the load, for example.

The drive control device 50 according to this embodiment of the invention can be advantageously used in wristwatches, which are used outdoors and in other environments subject to severe temperature change and which are subject to change in the load on the driven body as the attitude of the wristwatch changes while being worn, and is particularly well suited to driving the second hand, which tends to produce heat and result in wear between the rotor 30 and the contact part 25 of the oscillator 20A as a result of high power being applied or being continuously driven. An accurate, stable movement can thus be provided.

(4) The amplitude of both the longitudinal oscillation and sinusoidal oscillation can be increased and piezoelectric actuator 20 drive efficiency can be improved because the frequency of the drive signal supplied to the piezoelectric elements 22 of the piezoelectric actuator 20 is between the resonance frequency fr1 of the longitudinal oscillation and the resonance frequency fr2 of the sinusoidal oscillation. The arrangement can also be simplified because the piezoelectric actuator 20 is driven using a single drive signal.

Furthermore, the ability of this drive control device 50 to assure suitable, stable drive control is particularly effective because the drive frequency range is narrow when the resonance frequency is used, controlling the drive frequency is therefore difficult, and driving tends to be unstable because of variation in the resonance point due to aging and differences in individual devices.

Furthermore, the drive control device 50 can also be widely used as a drive control device for any piezoelectric actuator that uses resonance, and is not limited to controlling piezoelectric actuator 20.

(5) The drive means of the hour hand 4, minute hand 5, and seconds hand 6 in an electronic timepiece 1 is generally a stepping motor. This stepping motor can be replaced by piezoelectric actuator 20, however, to further reduce the thickness of the electronic timepiece 1 and improve the magnetic resistance of the electronic timepiece 1 because a piezoelectric actuator 20 is less susceptible to magnetic interference than a stepping motor.

Second Embodiment

A second embodiment of the invention is described next below.

Note that like parts in this and the first embodiment are identified by the same reference numerals, and further description thereof is omitted.

The first embodiment of the invention provides drive control for driving the piezoelectric actuator 20 at maximum efficiency. This embodiment of the invention differs by providing drive control that enables adjusting how much the piezoelectric actuator 20 drives the driven body.

Figure 10:
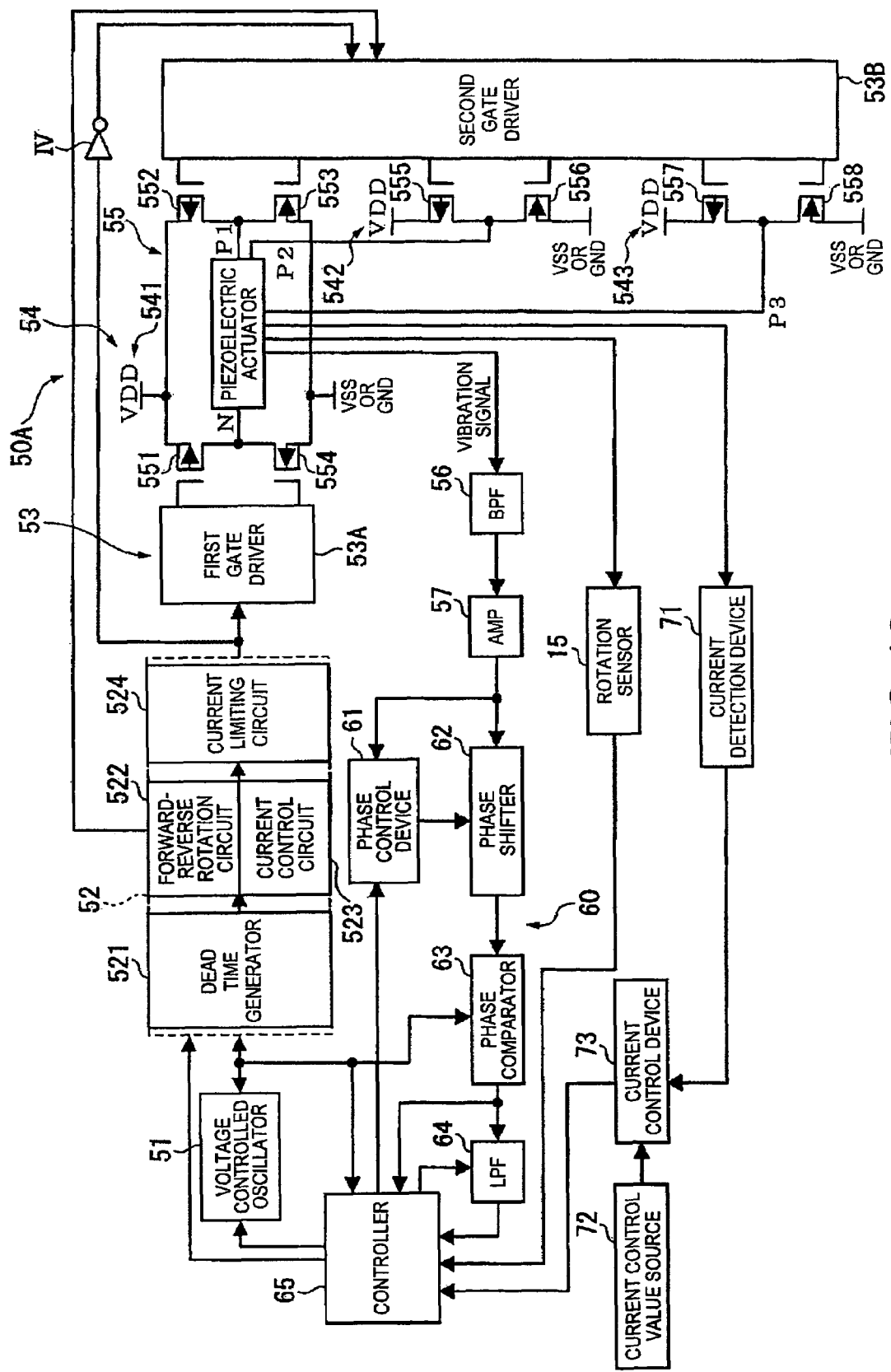
FIG. 10 is a block diagram of a piezoelectric actuator drive control device according to a second embodiment of the invention.

FIG. 10 is a block diagram showing the arrangement of a drive control device 50A for a piezoelectric actuator 20 according to this embodiment of the invention.

This drive control device 50A differs from the drive control device 50 shown in FIG. 4 by additionally includes a current detection device 71 for detecting current flow to the piezoelectric actuator 20 portion, a current control value source 72 for outputting a current control value, and a current control device 73 for outputting a control signal to the controller 65 based on the current control value output from the current control value source 72 and the current value output by the current detection device 71.

The controller 65 outputs a voltage signal to the voltage controlled oscillator 51 based on the output signal from the current control device 73. More specifically, the controller 65 uses feedback control based on the piezoelectric actuator 20 current in this embodiment of the invention.

In addition to the effects of the first embodiment, this embodiment of the invention affords the following effects.

(6) The voltage signal output by the controller 65 to the voltage controlled oscillator 51 is adjustable based on the current flow of the piezoelectric actuator 20. The vibration state of the piezoelectric actuator 20 can be controlled, and the speed of the rotor 30, for example, can therefore be controlled. The piezoelectric actuator 20 can therefore be used as a drive source to drive driven bodies such as a rotor 30 that requires adjustable speed control. Current feedback can also be used to assure suitable stable piezoelectric actuator 20 drive control.

Third Embodiment

A third embodiment of the invention is described next.

Drive control in this embodiment of the invention enables adjusting the speed of the rotor that is the driven body of the piezoelectric actuator 20 in substantially the same way as in the second embodiment but by using different means than in the second embodiment of the invention.

Figure 11:
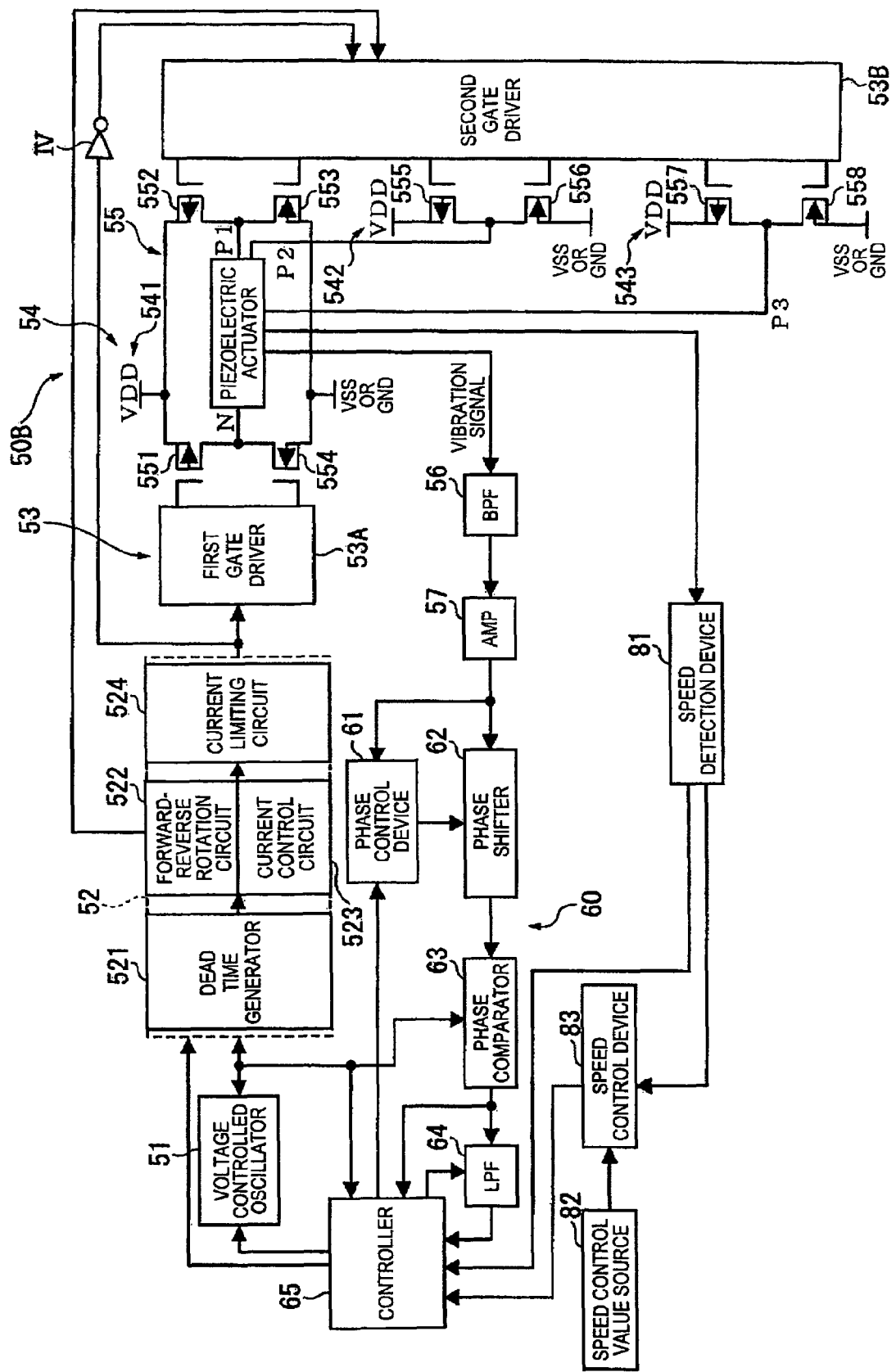
FIG. 11 is a block diagram of a drive control device according to a third embodiment of the invention.

FIG. 11 shows a drive control device 50B according to this embodiment of the invention.

This drive control device SOB differs from the drive control device 50 shown in FIG. 4 by additionally including a speed detection device 81 for detecting the speed of the rotor, a speed control value source 82 for outputting a speed control value, and a speed control device 83 for outputting a control signal to the controller 65 based on the speed detected by the speed detection device 81 and the speed control value output by the speed control value source 82.

The speed detection device 81 includes, for example, the rotation sensor 15 for detecting rotation of the gear 41 (FIG. 2) that is rendered in unison with the rotor 30 in the first embodiment of the invention.

Figure 12:
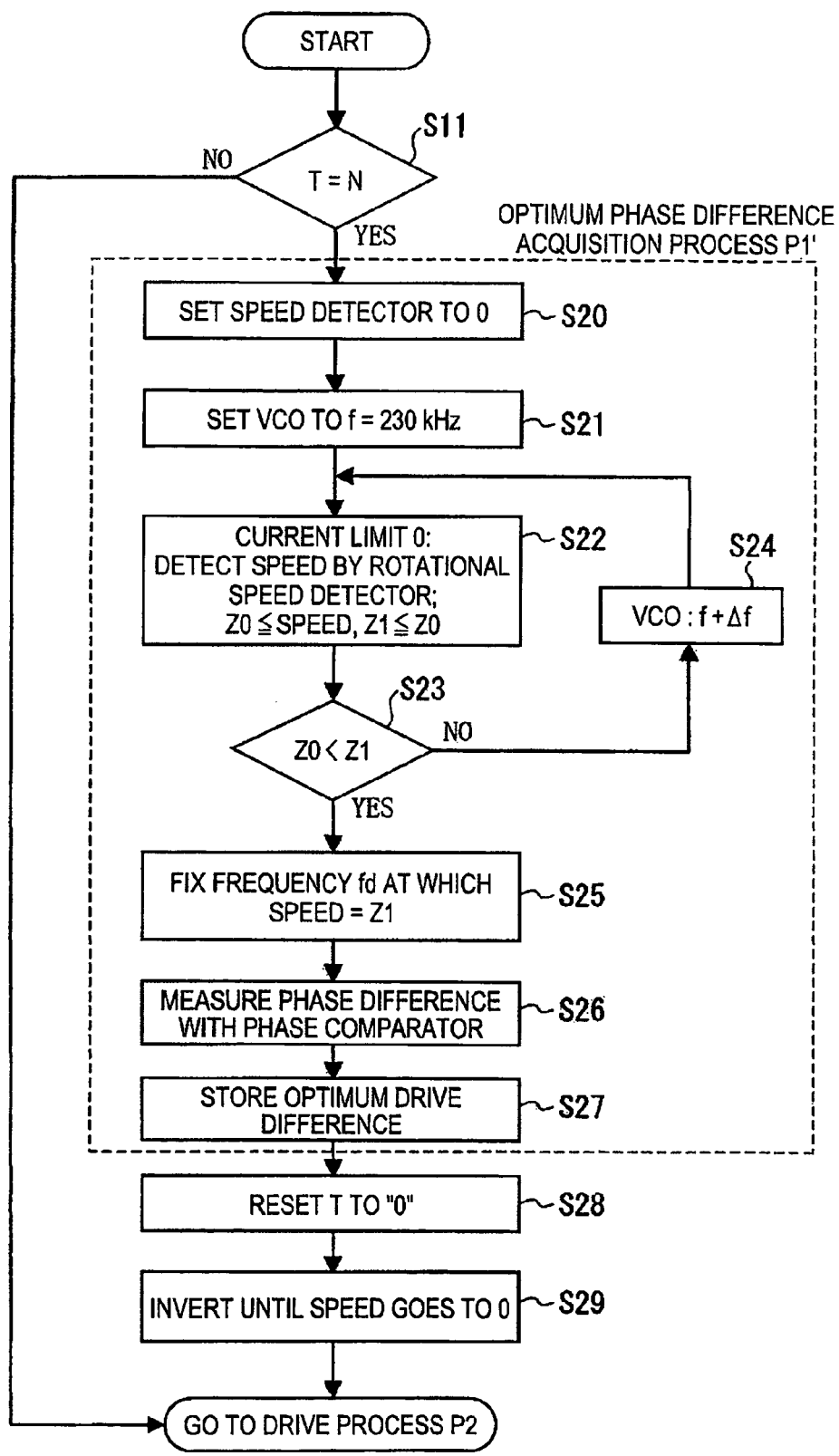
FIG. 12 is a flow chart of the optimum phase difference acquisition process executed by the piezoelectric actuator drive control device in a third embodiment of the invention.

FIG. 12 is a flow chart of an optimum phase difference acquisition process P1' according to this embodiment of the invention.

This optimum phase difference acquisition process P1' first sets the speed detection device 81 to 0 (step S20). Steps S21 to S28 then execute in the same way as the optimum phase difference acquisition process P1 described in FIG. 7. The speed detection device 81 continues detecting the speed of the rotor 30 while steps S21 to S28 execute.

The rotor 30, which has been rotating since step S20, is then reversed by the speed detection device 81, speed control value source 82, and speed control device 83 until the speed goes to 0 (motion resetting step, step S29). As a result, a control value reflecting the time required for optimum phase difference acquisition process P1' to execute is input through the timekeeping unit block of the circuit board to the speed control value source 82 when starting the drive process P2, and the speed of the rotor 30 is adjusted by the speed control device 83.

The speed detection device 81 continues detecting the speed of the rotor 30 while drive process P2 executes.

This embodiment of the invention affords the following effects in addition to the effects of the first embodiment.

(7) The controller 65 controls operation based on current flow to the piezoelectric actuator 20 in the second embodiment of the invention, but because the piezoelectric actuator 20 rotationally drives the rotor 30 by means of friction, slippage can occur. Error can therefore result with control based only on current. This embodiment of the invention directly detects the speed of the rotor 30 and gear 41, however, and therefore affords more accurate drive control.

(8) By adding steps S20 and S29 in optimum phase difference acquisition process P1', rotation of the rotor 30 is cancelled in the optimum phase difference acquisition process P1' before adjusting the speed of the rotor 30 in the drive process P2 based on the time required for the optimum phase difference acquisition process P1'. Executing the optimum phase difference acquisition process P1' can therefore eliminate error in the movement of the chronograph seconds hand 7A.

Fourth Embodiment

A fourth embodiment of the invention is described next.

The drive control device 50C according to this fourth embodiment of the invention combines drive control based on current as in the second embodiment of the invention, and drive control based on speed as in the third embodiment of the invention.

More specifically, the drive control device 50C in this embodiment of the invention includes a current detection device 71, current control device 73, speed detection device 81, speed control value source 82, and speed control device 83.

The speed control device 83 outputs a current control value to the current control device 73 based on the speed control value from the speed control value source 82 and the speed detected by the speed detection device 81.

The current control device 73 outputs a control signal to the controller 65 based on the current control value from the speed control device 83 and the current detected by the current detection device 71.

Feedback control in this embodiment of the invention therefore includes a control loop based on the rotor speed as a major loop, and a control loop based on current as a minor loop.

In addition to the effects of the first to third embodiments, this embodiment of the invention affords the following effect.

(9) Rotor speed (rotational velocity) can be controlled more accurately because the vibration state of the piezoelectric actuator 20 is controlled based on two parameters, the speed of the rotor 30 that is rotationally driven by the piezoelectric actuator 20 and the current flow through the piezoelectric actuator 20.

Fifth Embodiment

A fifth embodiment of the invention is described next.

A common feature of the first to fourth [eighth, sic] embodiments of the invention described above is that the optimum phase difference is repeatedly acquired at a predetermined frequency. A feature common to the fifth to eighth embodiments of the invention described below is that the frequency at which the phase difference reverses when sweeping the drive frequency is acquired, and the drive frequency used for phase difference feedback is clamped based on the frequency at which the size of the phase difference inverts.

The piezoelectric actuator drive control device and drive control method described in this embodiment of the invention are applied to a piezoelectric actuator 20 for driving the chronograph seconds hand 7A of a timepiece 1 as described in the first embodiment of the invention. This embodiment of the invention is therefore described with reference to FIG. 14 to FIG. 22 in addition to FIG. 1 to FIG. 3 and FIG. 5 describing the first embodiment of the invention.

5-1. Arrangement of the Piezoelectric Actuator Drive Control Device

Figure 14:
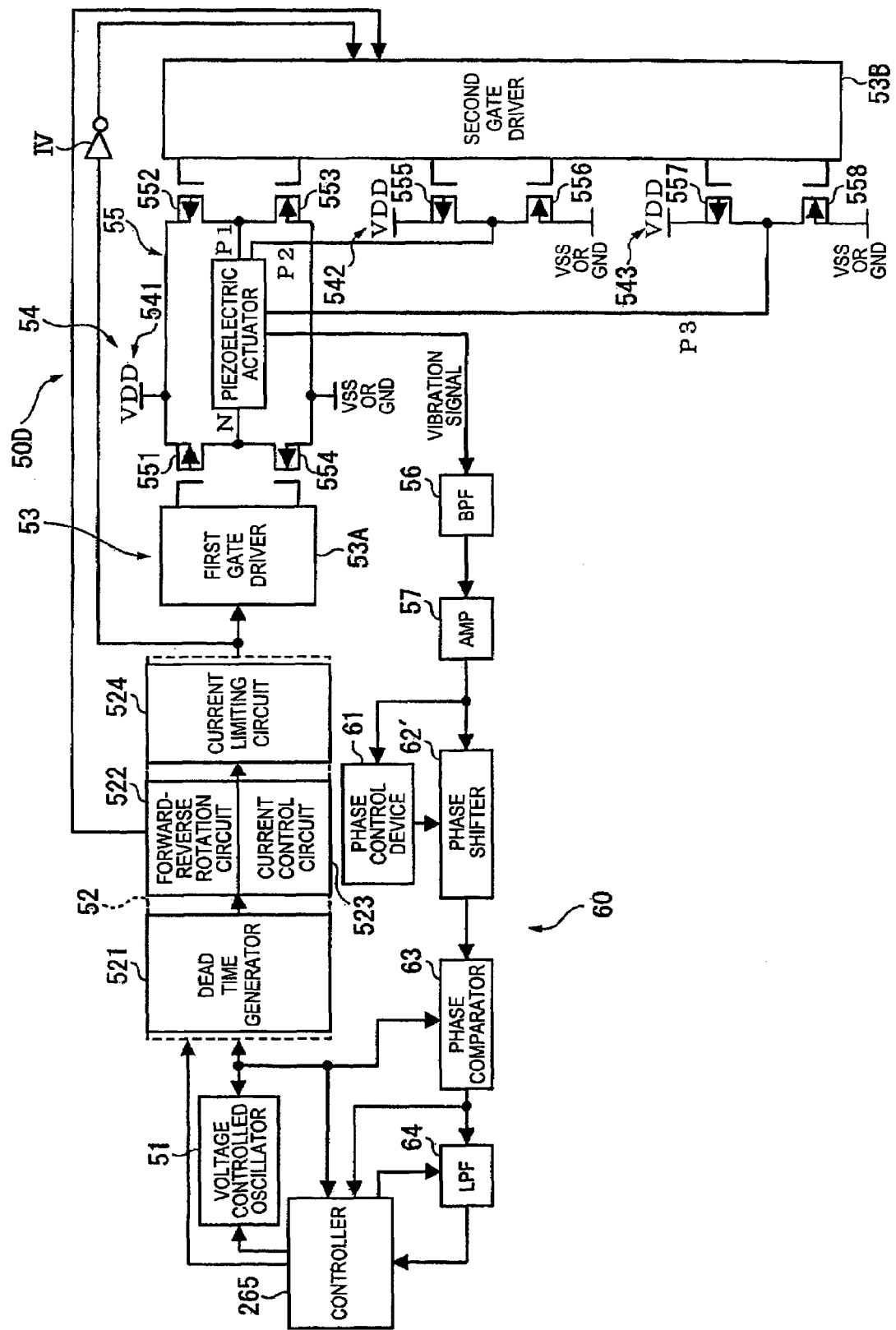
FIG. 14 is a block diagram of a piezoelectric actuator drive control device according to a fifth embodiment of the invention.

FIG. 14 shows the arrangement of a piezoelectric actuator drive control device 50D according to this embodiment of the invention.

The target phase difference used as an index for piezoelectric actuator 20 drive control is preset to the phase shifter 62' of the drive control device 50D. As a result, the controller 265 of the drive control device 50D outputs a voltage signal to the voltage controlled oscillator 51 to cancel deviation of the phase difference input from the lowpass filter 64 to the target phase difference.

Figure 15:
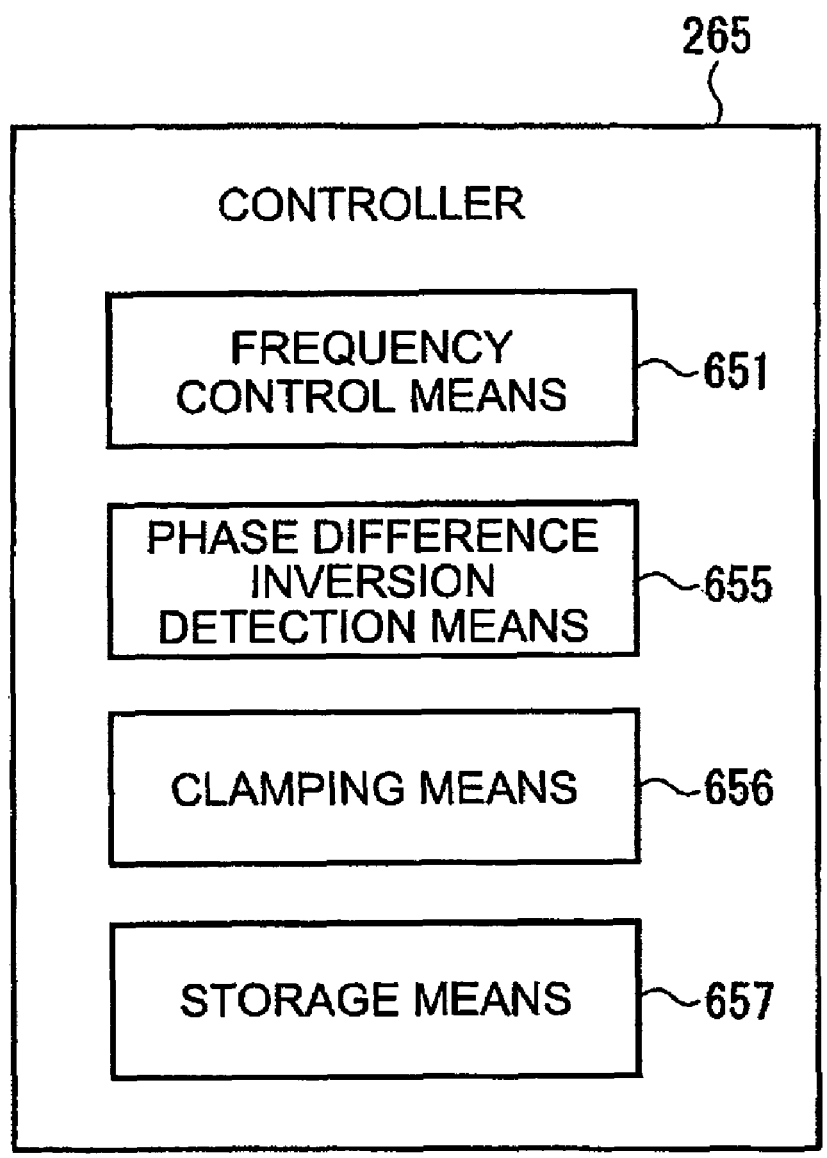
FIG. 15 is a block diagram of a controller in the piezoelectric actuator drive control device according to the fifth embodiment of the invention.

FIG. 15 is a schematic block diagram of the controller 265 used as the control means. This controller 265 includes a frequency control means 651 for causing the frequency of the drive signal to track the phase difference supplied as feedback from the phase difference detection means 60, a phase difference inversion detection means 655 for detecting if the phase difference between the phase of the drive signal and the phase of the detection signal equals the value of the target phase difference a plurality of times when sweeping the drive frequency, a clamping means 656 for limiting the drive frequency, and a storage means 657 for storing a data table TBL of drive frequency values (see FIG. 18).

The frequency control means 651 in the controller 265 functions as a means for tracking the frequency of the drive signal to the phase difference fed back from the phase difference detection means 60, and outputs a voltage signal to the voltage controlled oscillator 51 in order to eliminate deviation to the input target phase difference.

The controller 265 has two modes, an initialization mode M1 that is a first process (phase difference inversion detection process) which is run when driving the piezoelectric actuator 20 starts (FIG. 19), and a drive mode M2 (FIG. 20) that is a second process which executes after the initialization mode M1.

When the frequency of the drive signal supplied to the oscillator 20A is swept and the target phase difference is detected again, the clamping frequency where the phase difference reverses is stored in the data table TBL (FIG. 18) stored in the storage means 657.

Figure 16:
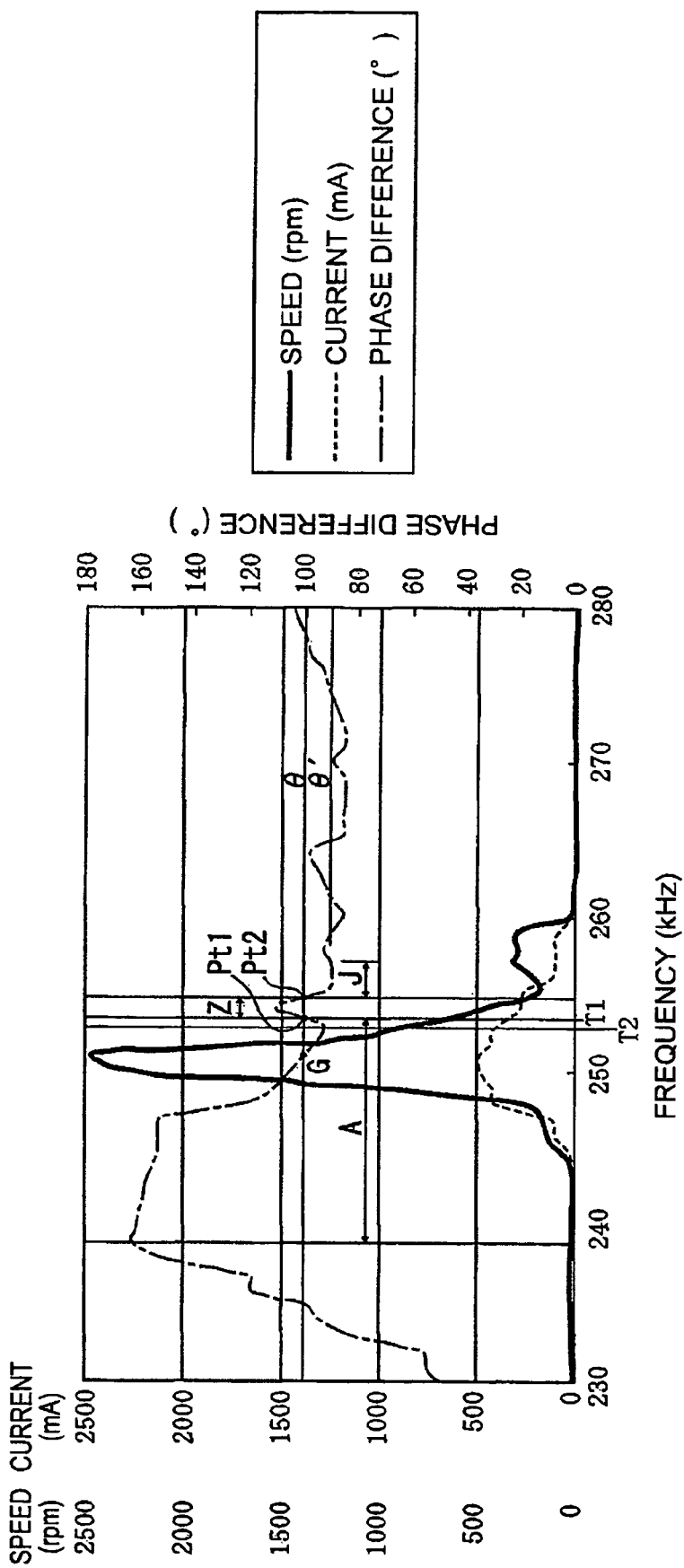
FIG. 16 is a graph showing change in the phase difference, rotor speed, and current during a frequency sweep of the drive signal in an oscillator according to a fifth embodiment of the invention.
Figure 17:
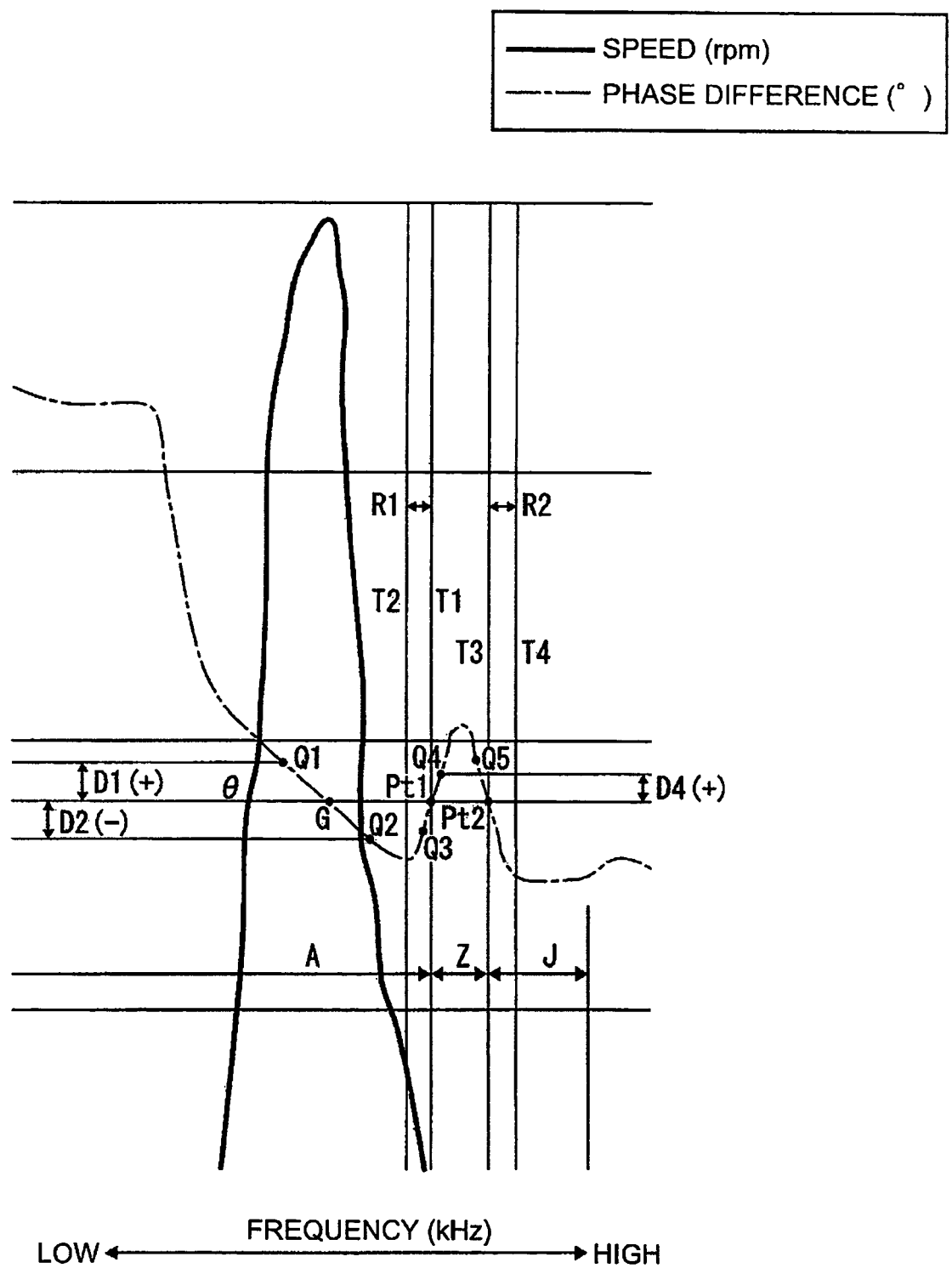
FIG. 17 is an enlargement of a part of the graph shown in FIG. 16 [6, sic].

FIG. 16 is a graph showing the phase difference of the oscillator 20A, the speed of the rotor 30, and the current flow through the piezoelectric actuator 20 when sweeping the drive signal frequency. FIG. 17 is an enlargement of part of FIG. 16. Note that the values and the slope of the rise and fall may vary due to individual differences in the oscillator 20A.

The phase difference between the drive signal and detection signal is indicative of the vibration characteristic of the oscillator 20A, and in this embodiment of the invention the phase difference in the optimum drive state (specified drive state) G achieving substantially the maximum rotor 30 speed is target phase difference θ (approximately 100 degrees in this embodiment of the invention). When the phase difference is target phase difference θ, the piezoelectric actuator 20 can be driven at maximum efficiency by the resonance of longitudinal oscillation and the resonance of sinusoidal oscillation in the oscillator 20A.

A drive range A wherein the vibration characteristic is stable, the slope of the rise or fall in the phase difference during the drive frequency sweep is in one direction only, and includes the optimum drive state G is set in the drive control device 50D for phase difference feedback control. In this drive range A the phase difference drops when the drive frequency increases, and the tracking direction of the drive frequency based on the size of the phase difference to the target phase difference θ does not reverse.

Due to alignment error in the piezoelectric elements 22 and reinforcing plate 21 of the oscillator 20A, and overlap in the phase of longitudinal oscillation and the phase of sinusoidal oscillation as a result of driving the oscillator 20A by supplying a single drive signal, the phase difference may increase and reach the target phase difference θ again (at inversion point Pt1) after decreasing from the target phase difference θ in drive range A when sweeping the drive frequency from the low frequency side to the high frequency side. At this inversion point Pt1 the phase difference is increasing, which is opposite the slope of the phase difference at optimum drive state G (that is, decreasing). The period from this inversion point Pt1 to return point Pt2, where the phase difference reaches the target phase difference θ again and the slope of the rise or fall in the phase difference has returned to the same slope as before the phase difference inversion, is phase difference inversion range Z wherein phase difference feedback control is unstable.

As shown in FIG. 17, on opposite sides of phase difference inversion range Z are phase difference inversion range R1 that is −0.5 kHz wide from the phase difference inversion frequency T1 at inversion point Pt1, and phase difference return range R2 that is +0.5 kHz wide from return frequency T3 at phase return point Pt2. The limits of phase difference inversion range R1 are therefore phase difference inversion frequency T1 and clamping frequency T2, which is phase difference inversion frequency T1 minus 0.5 kHz, and the limits of phase difference return range R2 are return frequency T3 and return clamping frequency T4, which is return frequency T3 plus 0.5 kHz.

The frequencies in phase difference inversion range R1 and phase difference return range R2 including phase difference inversion frequency T1, clamping frequency T2, return frequency T3, and return clamping frequency T4 are stored in a table in the storage means 657.

FIG. 18 shows the content of the data table TBL stored in the storage means 657. The storage means 657 stores the frequencies in phase difference inversion range R1 and phase difference return range R2 as data table TBL.

5-2. Piezoelectric Actuator Drive Control

The process whereby the drive control device 50D drives the piezoelectric actuator 20 is described next with reference to the flow charts in FIG. 19 and FIG. 20.

The controller 265 of the drive control device 50D executes the initialization mode M1 (FIG. 19), which is the first process run when driving the piezoelectric actuator 20 starts, and then executes the drive mode M2 (FIG. 20), which is the second process run after the first process.

5-2-1. Initialization Mode

Figure 19:
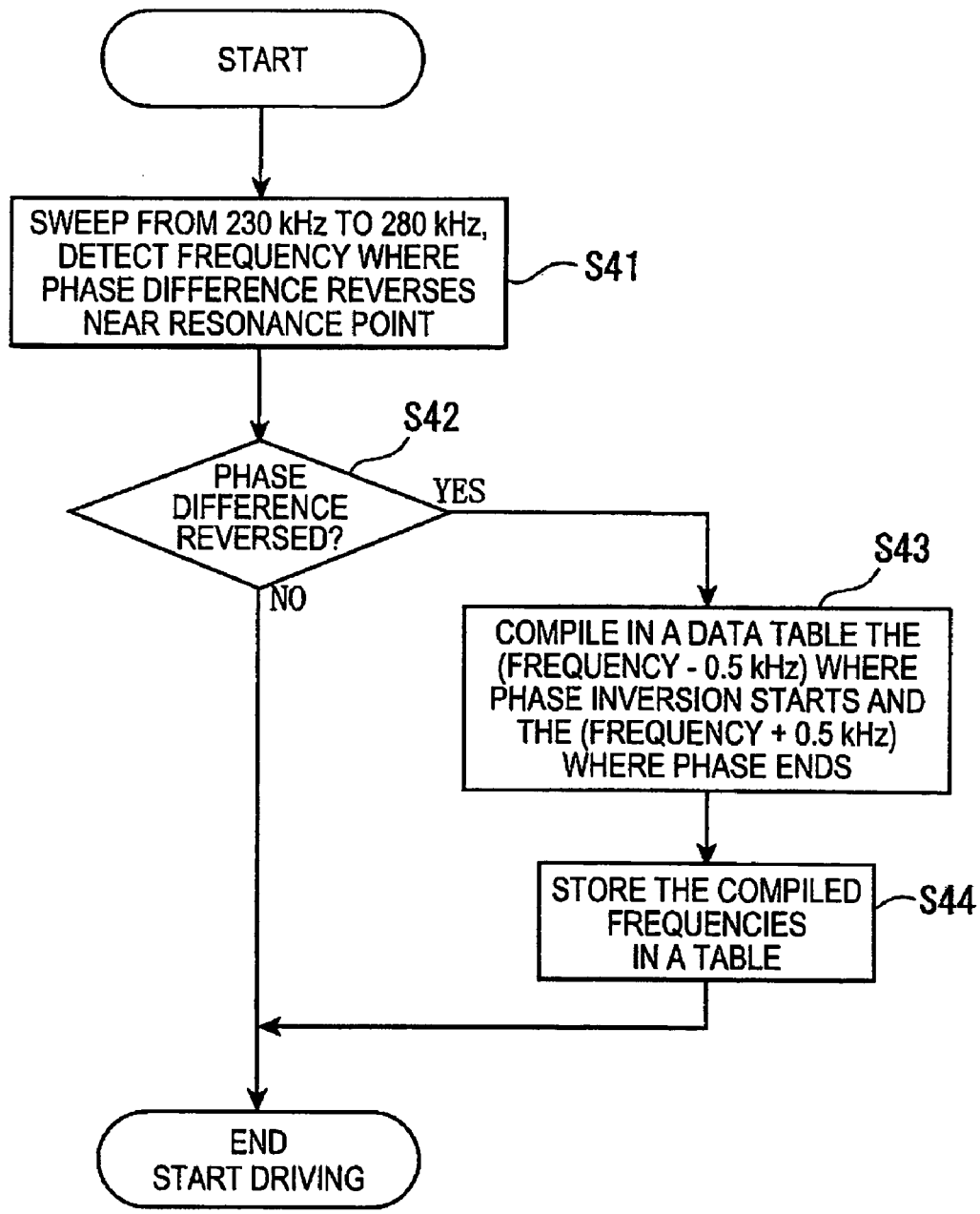
FIG. 19 is a flow chart of drive control in the piezoelectric actuator initialization mode in a preferred embodiment of the invention.

The rotor 30 is driven to detect the optimum drive state of the piezoelectric actuator 20 (defined as the state G in which rotor speed is substantially highest (FIG. 16) in this embodiment of the invention), and whether the reversing phenomenon occurs, that is, whether the size of the phase difference reverses when the target phase difference θ is achieved again when sweeping the drive frequency, is determined (steps S41, S42) in the initialization mode M1 shown in FIG. 19. The target phase difference θ is set in the phase shifter 62.

More specifically, the phase difference inversion detection means 655 of the controller 265 applies phase difference feedback control using the phase difference detection means 60 while sweeping the frequency of the drive signal output by the voltage controlled oscillator 51 in one direction from 230 kHz to 280 kHz in steps S41 and S42.

If this phase difference inversion results as described in FIG. 16, the phase difference inversion detection result (S42)

is YES, the data table TBL (FIG. 18) is compiled (S43), and the data table TBL is stored in the storage means 657 (S44).

If phase difference inversion does not occur, the phase difference inversion detection result (S42) is NO, and data in the data table TBL stored in the storage means 657 is deleted in this embodiment of the invention.

This completes the initialization mode M1, and passes control to the drive mode M2.

5-2-2. Drive Mode

Figure 20:
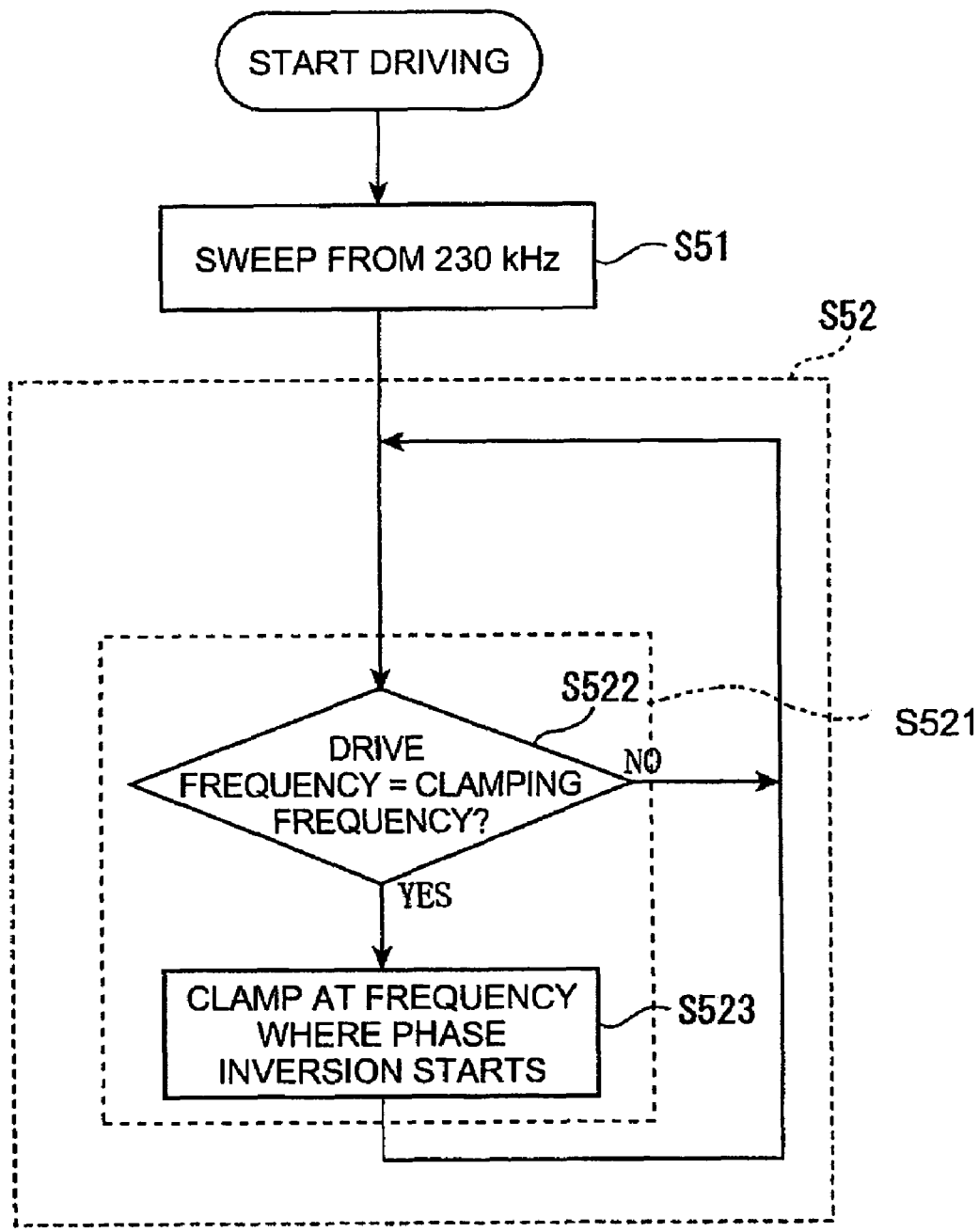
FIG. 20 is a flow chart of drive control in the piezoelectric actuator drive mode in a preferred embodiment of the invention.

In the drive mode M2 shown in FIG. 20, the controller 265 starts sweeping the frequency of the drive signal output by the voltage controlled oscillator 51 from 230 kHz (S51), and starts the feedback process for tracking the frequency of the drive signal to the phase difference between the detection signal and drive signal (S52).

The feedback control process (S52) controls the voltage signal output by the controller 265 so that the output of the phase comparator 63 goes to zero, that is, so that the phase difference goes to the target phase difference θ (S521). To generate the voltage signal output to the voltage controlled oscillator 51, the clamping means 656 determines whether the drive frequency indicated by the voltage signal to be generated matches a frequency in the data table TBL (FIG. 18).

If the drive frequency indicated by the voltage signal to be generated does not match a frequency in the data table TBL (S522 returns No), the voltage signal is generated and output to the voltage controlled oscillator 51, thus changing the frequency of the drive signal output by the voltage controlled oscillator 51.

More specifically, when the drive state is Q1, there is a positive deviation D1 between the detected phase difference and the optimum phase difference θ, that is, the phase difference is greater than the optimum phase difference, and the drive frequency is therefore increased in order to reduce the phase difference. If the drive state is Q2, there is a negative deviation D2 between the phase difference and the target phase difference θ, that is, the phase difference is less than the optimum phase difference, and the drive frequency is therefore decreased in order to increase the phase difference.

Steps S521 and S522 repeat until the drive frequency denoted by the voltage signal generated by the controller 265 matches a frequency in the data table TBL.

This enables good response to changes in the resonance point of the oscillator 20A and change in the vibration characteristic when, for example, the oscillator 20A produces heat from continuous operation, or the load changes due to a change in the ambient temperature or change in the attitude of the electronic timepiece 1.

If phase difference inversion is not detected in the previously executed initialization mode M1, the controller 265 in this embodiment of the invention controls the generated voltage signal each time a detection signal is input (S521) without determining whether the drive frequency denoted by the voltage signal matches a frequency in the data table TBL (S522).

However, because the data table TBL stored in the storage means 657 is blank when there is no phase difference inversion in this embodiment of the invention, step S522 will always return NO and drive will be normally controlled if step S522 searches the data table TBL for the drive frequency denoted by the voltage signal whether or not the phase difference has reversed.

If the voltage signal to be generated by the controller 265 matches a frequency in the data table TBL (FIG. 18) (S522 returns Yes), the frequency at the start of the phase difference inversion is clamped to generate and output the voltage signal (S523).

This holds the frequency of the drive signal generated by the voltage controlled oscillator 51 and limits tracking the drive frequency to the phase difference, and therefore prevents the drive frequency from passing clamping frequency T2 and reaching the phase difference inversion frequency T1, and thus prevents reversing the tracking direction of the drive frequency based on the phase difference.

If tracking the drive frequency to the phase difference is not limited, the drive state of the piezoelectric actuator 20 may pass drive state Q3 in the phase difference inversion range R1 and reach drive state Q4. While the drive frequency must decrease from drive state Q4 in order to return to the optimum drive state G, the drive frequency is increased in order to reduce the phase difference because the phase difference is greater than the target phase difference.

More specifically, because the tracking direction of the drive frequency based on U whether the phase difference is greater or less than the target phase difference θ reverses before and after inversion point Pt1, the drive frequency is adjusted in the direction opposite the appropriate direction, and the drive state goes from drive state Q4 to drive state Q5, that is, to a drive state away from the optimum drive state G. The slope of the change in the phase difference reverses between drive state Q4 and drive state Q5, the drive frequency is changed by phase difference feedback control before and after return point Pt2 where the phase difference is equal to the target phase difference θ, and it is substantially impossible to return the drive state of the piezoelectric actuator 20 to near the optimum drive state G even though the drive state of the piezoelectric actuator 20 is far from the optimum drive state G.

Tracking the drive frequency to the phase difference is therefore limited as described above in order to prevent this problem.

Feedback control when the size of the phase difference inverts can be reliably prevented by setting a clamping frequency T2 separated from the phase difference inversion frequency T1 by a frequency width (0.5 kHz) greater than the variation in the drive frequency caused by phase difference tracking or a temperature change, and preventing the drive frequency from reaching this clamping frequency T2 as described above.

After clamping (S523), control returns to step S521 to repeat the process using the next detection signal, and track the drive signal frequency to the phase difference if step S522 returns NO.

The drive frequency can therefore track the phase difference instead of being fixed in order to handle changes in the vibration characteristic of the oscillator 20A caused by temperature change, for example, and if the size of the phase difference changes, driving the piezoelectric actuator 20 can be stably controlled without erroneously adjusting the drive frequency in the wrong direction.

Frequency data in the phase difference return range R2 is stored in the data table TBL (FIG. 18) in addition frequency data in the phase difference inversion range R1, and the values for the phase difference return range R2 are used as described below.

If it is necessary to shift driving to a drive range J (FIG. 16) on the high frequency side of return point Pt2 when the voltage signal output of the controller 265 is clamped by referencing clamping frequency T2, a frequency in phase difference return range R2 is preferably referenced to limit the drive frequency so that the drive state does not become unstable. More specifically, before actually changing the drive frequency the process causing the drive frequency to track the phase difference determines if the frequency to which the drive frequency is to be changed matches a value in the phase difference return range R2, and if a match is confirmed clamps that frequency in order to hold the drive frequency.

Stable drive control can thus be sustained except in phase difference inversion range Z where drive control is unstable.

Furthermore, there is also an optimum drive state on the high frequency side of the return point Pt2, and when the piezoelectric actuator 20 must be driven in drive range J, the drive frequency can be limited by referencing the frequencies in the phase difference return range R2.

If the phase difference repeatedly increases and decreases and the slope of change in the phase difference is not constant when sweeping the drive frequency as shown in FIG. 16, the size of the phase difference relative to the set target phase difference (θ' in FIG. 16, for example) may invert in more than one place.

In this situation the drive frequencies in the phase difference inversion range and phase difference return range of each inversion location can also be added to the data table TBL (FIG. 18) for drive control.

The drive control device 50D can thus control driving the piezoelectric actuator 20 in all drive frequency ranges swept from 230 kHz to 280 kHz except in the ranges where the phase difference inverts.

Figure 21:
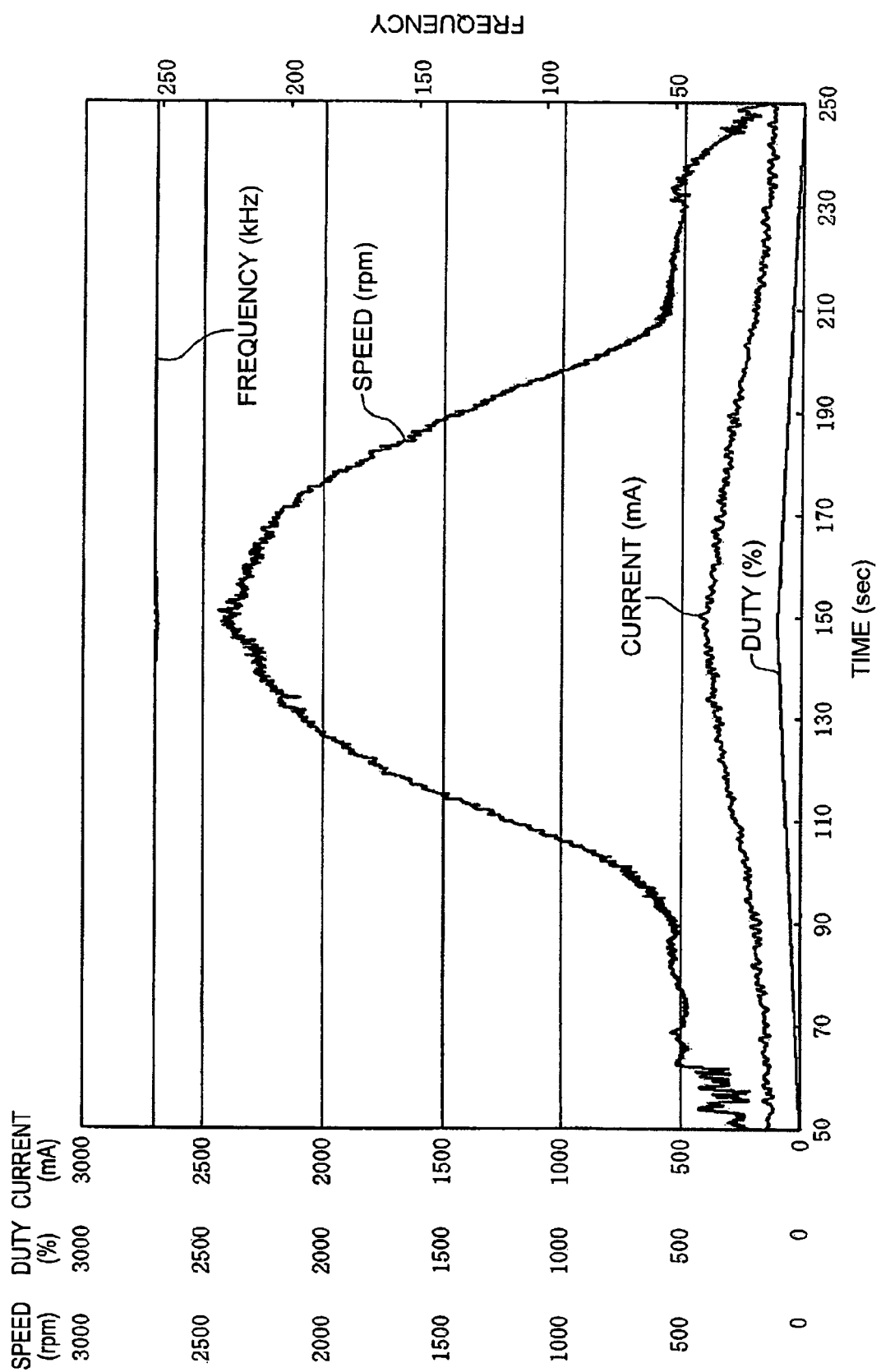
FIG. 21 is a graph showing the drive characteristic of a piezoelectric actuator in a preferred embodiment of the invention.
Figure 22:
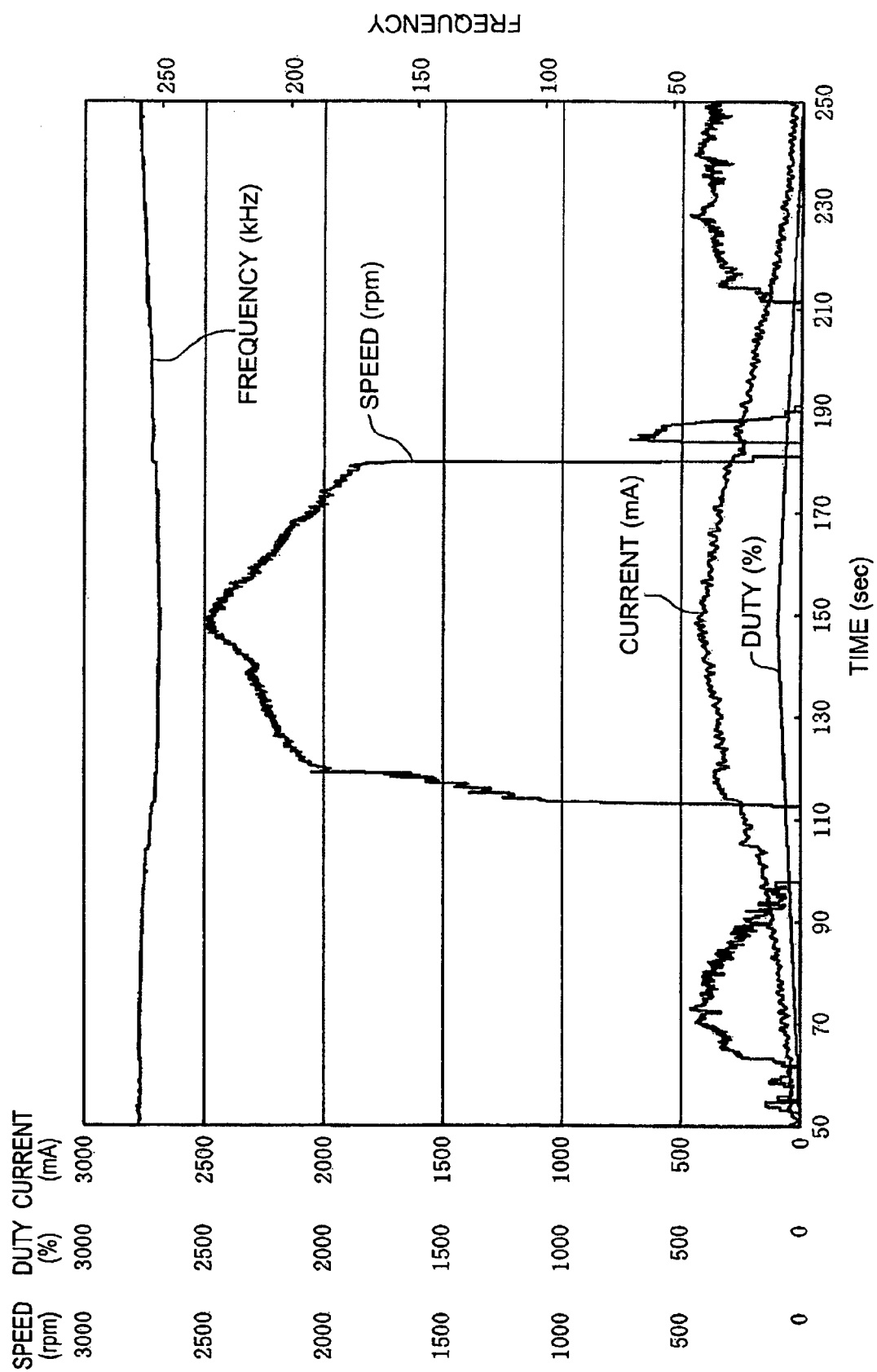
FIG. 22 is a graph showing the drive characteristic of a piezoelectric actuator in a preferred embodiment of the invention when the drive frequency is not limited, and is shown for comparison with the graph in FIG. 21 [11, sic].

FIG. 21 is a graph of the drive characteristic of the piezoelectric actuator 20, and FIG. 22 is a graph showing the drive characteristic of the piezoelectric actuator 20 when the drive frequency is not limited for comparison with FIG. 21. The continuous drive time of the piezoelectric actuator 20 is shown on the x-axis in both FIG. 21 and FIG. 22.

When the drive frequency is limited, there is substantially no increase or decrease in the drive frequency and the speed of the rotor 30 is stable as shown in FIG. 21 even in an environment in which the oscillator 20A tends to heat up easily with continuous operation. As shown in FIG. 22, however, the drive frequency fluctuates up and down due to temperature change resulting from heat output by the oscillator 20A, rotor 30 speed does not rise when the drive frequency is rising or falling, and the drive state is extremely unstable.

More specifically, it was confirmed that by limiting the drive frequency by means of the drive control device 50D described above, piezoelectric actuator 20 drive control is stable regardless of changes in temperature, for example.

5-3. Effects of this Embodiment of the Invention

The effects of this embodiment of the invention are described below.

(10) When the controller 265 of the piezoelectric actuator 20 drive control device 50D causes the frequency of the drive signal to track the phase difference detected by the phase difference detection means 60, the controller 265 references a data table TBL stored in storage means 657 in the initialization mode M1, and limits the drive frequency to clamp tracking of the drive frequency to the phase difference if the drive frequency will reach clamping frequency T2 when tracking the phase difference. As a result, the drive frequency can be prevented from being changed in the wrong direction when the size of the phase difference to the target phase difference θ inverts when sweeping the drive frequency, thus affording stable drive control.

(11) When the controller 265 sweeps the drive frequency, a clamping frequency T2 is set 0.5 kHz toward the optimum drive state G from the phase difference inversion frequency T1, and tracking the drive frequency to the phase difference is controlled so that the drive frequency does not go to the clamping frequency T2. As a result, the drive frequency can be prevented from tracking the phase difference in the wrong direction as a result of the size of the phase difference inverting even if the drive state approaches the inversion point Pt1 as a result of change in the drive frequency.

If the short sides of the oscillator 20A are approximately 1.98 mm, the long sides are approximately 7 mm, the target phase difference is approximately 100 degrees, and the drive frequency is approximately 250 kHz, the clamping frequency T2 is preferably in a range of 0.3 to 0.7 kHz of the phase difference inversion frequency T1.

More specifically, if the clamping frequency T2 is more than 0.7 kHz from phase difference inversion frequency T1, the drive frequency stops tracking the phase difference if there is even a slight variation in the ambient temperature or load, and the drive frequency will thereafter not be controlled according to temperature or load. Change in temperature or load will therefore render the drive state unstable, and drive control may degrade.

On the other hand, if clamping frequency T2 is less than 0.3 kHz from phase difference inversion frequency T1, the drive frequency cannot be prevented from entering a frequency range where the phase inverts because the frequency is controlled variably according to the phase difference, and drive control is therefore rendered unstable.

(12) The controller 265 has an initialization mode M1 that executes before driving starts, and a data table TBL containing the frequencies in the phase difference inversion range R1 is stored in the storage means 657 during the initialization mode M1. Each time the piezoelectric actuator 20 is driven, the data in the phase difference inversion range R1 stored in the storage means 657 can be updated, and drive control can therefore be based on the most recent state of the piezoelectric actuator 20.

This initialization mode M1 can also be executed regularly at some particular interval, such as every few hours.

Furthermore, because the frequencies in the phase difference inversion range R1 are stored in a data table TBL in storage means 657, the clamping frequency T2, return clamping frequency T4, and other frequency settings do not need to be set in the controller 265 each time the phase difference is fed back, and the arrangement can therefore be simplified.

(13) By incorporating the drive control device 50D into an electronic timepiece 1, which is a wristwatch, driving the timepiece can be desirably controlled to great effect regardless of variation in temperature or load, for example.

The drive control device 50D according to this embodiment of the invention can be advantageously used in wristwatches, which are used outdoors and in other environments subject to severe temperature change and which are subject to change in the load on the driven body as the attitude of the wristwatch changes while being worn, and is particularly well suited to driving the second hand, which tends to produce heat as a result of high power being applied or being continuously driven. An accurate, stable movement can thus be provided.

(14) The amplitude of both the longitudinal oscillation and sinusoidal oscillation can be increased and piezoelectric actuator 20 drive efficiency can be improved because the frequency of the drive signal supplied to the piezoelectric elements 22 of the piezoelectric actuator 20 is between the resonance frequency fr1 of the longitudinal oscillation and the resonance frequency fr2 of the sinusoidal oscillation. The arrangement can also be simplified because the piezoelectric actuator 20 is driven using a single drive signal.

Furthermore, the ability of this drive control device 50 to assure suitable, stable drive control is particularly effective because the drive frequency range is narrow when the resonance frequency is used, controlling the drive frequency is therefore difficult, and driving tends to be unstable because of variation in the resonance point due to temperature change, for example.

Furthermore, the drive control device 50D can also be widely used as a drive control device for any piezoelectric actuator that uses resonance, and is not limited to controlling piezoelectric actuator 20.

(15) The drive means of the hour hand 4, minute hand 5, and seconds hand 6 in an electronic timepiece 1 is generally a stepping motor. This stepping motor can be replaced by piezoelectric actuator 20, however, to further reduce the thickness of the electronic timepiece 1 and improve the magnetic resistance of the electronic timepiece 1 because a piezoelectric actuator 20 is less susceptible to magnetic interference than a stepping motor.

Sixth Embodiment

A sixth embodiment of the invention is described next below.

The fifth embodiment of the invention provides drive control for driving the piezoelectric actuator 20 at maximum efficiency. This embodiment of the invention differs by providing drive control that enables adjusting how much the piezoelectric actuator 20 drives the driven body.

Figure 23:
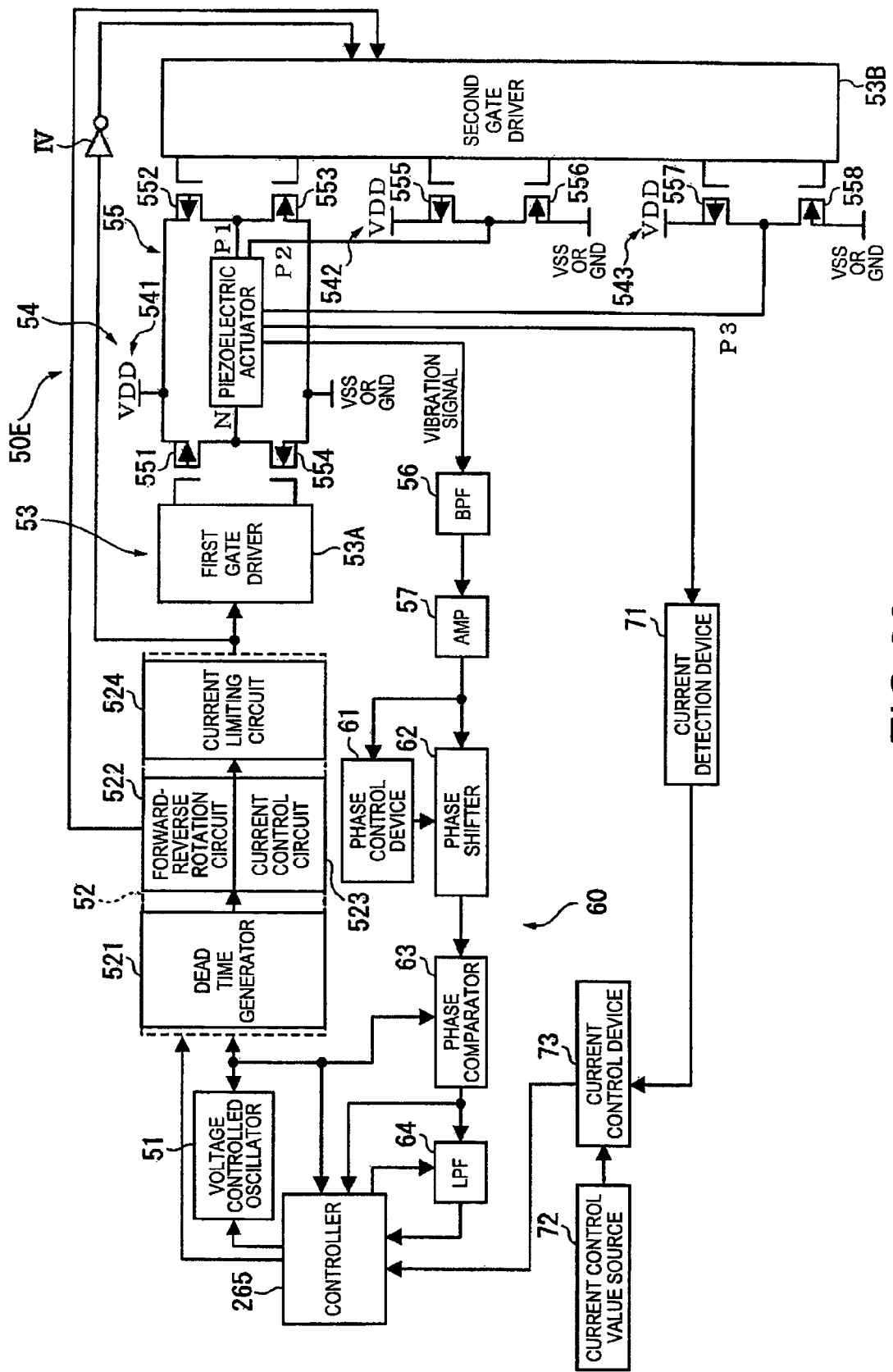
FIG. 23 is a block diagram of a piezoelectric actuator drive control device according to a sixth embodiment of the invention.

FIG. 23 is a block diagram showing the arrangement of a drive control device 50E for a piezoelectric actuator 20 according to this embodiment of the invention.

This drive control device 50E differs from the drive control device 50D shown in FIG. 14 by additionally including a current detection device 71 for detecting current flow to the piezoelectric actuator 20 portion, a current control value source 72 for outputting a current control value, and a current control device 73 for outputting a control signal to the controller 265 based on the current control value output from the current control value source 72 and the current value output by the current detection device 71.

The controller 265 outputs a voltage signal to the voltage controlled oscillator 51 based on the output signal from the current control device 73. More specifically, the controller 265 uses feedback control based on the piezoelectric actuator 20 current in this embodiment of the invention.

In addition to the effects of the above embodiments, this embodiment of the invention affords the following effects.

(16) The voltage signal output by the controller 265 to the voltage controlled oscillator 51 is adjustable based on the current flow of the piezoelectric actuator 20. The vibration state of the piezoelectric actuator 20 can be controlled, and the speed of the rotor 30, for example, can be therefore controlled. The piezoelectric actuator 20 can therefore be used as a drive source to drive driven bodies such as a rotor 30 that requires adjustable speed control. Current feedback can also be used to assure suitable stable piezoelectric actuator 20 drive control.

Seventh Embodiment

A seventh embodiment of the invention is described next.

This embodiment of the invention uses a different means than the sixth embodiment of the invention to control driving the piezoelectric actuator 20 to adjust the speed of a rotor as the driven body in substantially the same way as the second embodiment.

Drive control in this embodiment of the invention enables adjusting the speed of the rotor that is the driven body of the piezoelectric actuator 20 in substantially the same way as in the sixth embodiment but by using different means than in the sixth embodiment of the invention.

Figure 24:
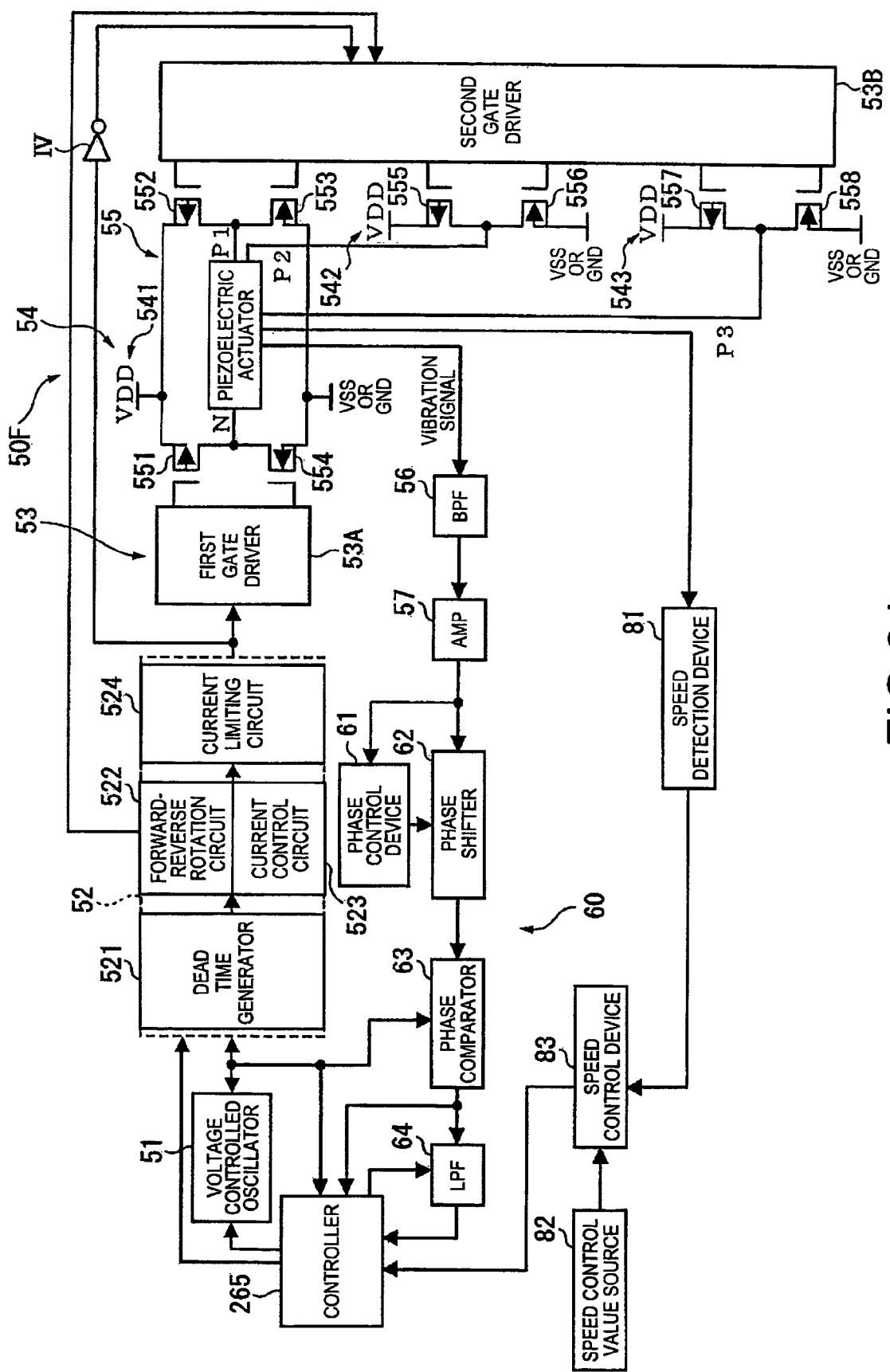
FIG. 24 is a block diagram of the drive control device in a seventh embodiment of the invention.
Figure 25:
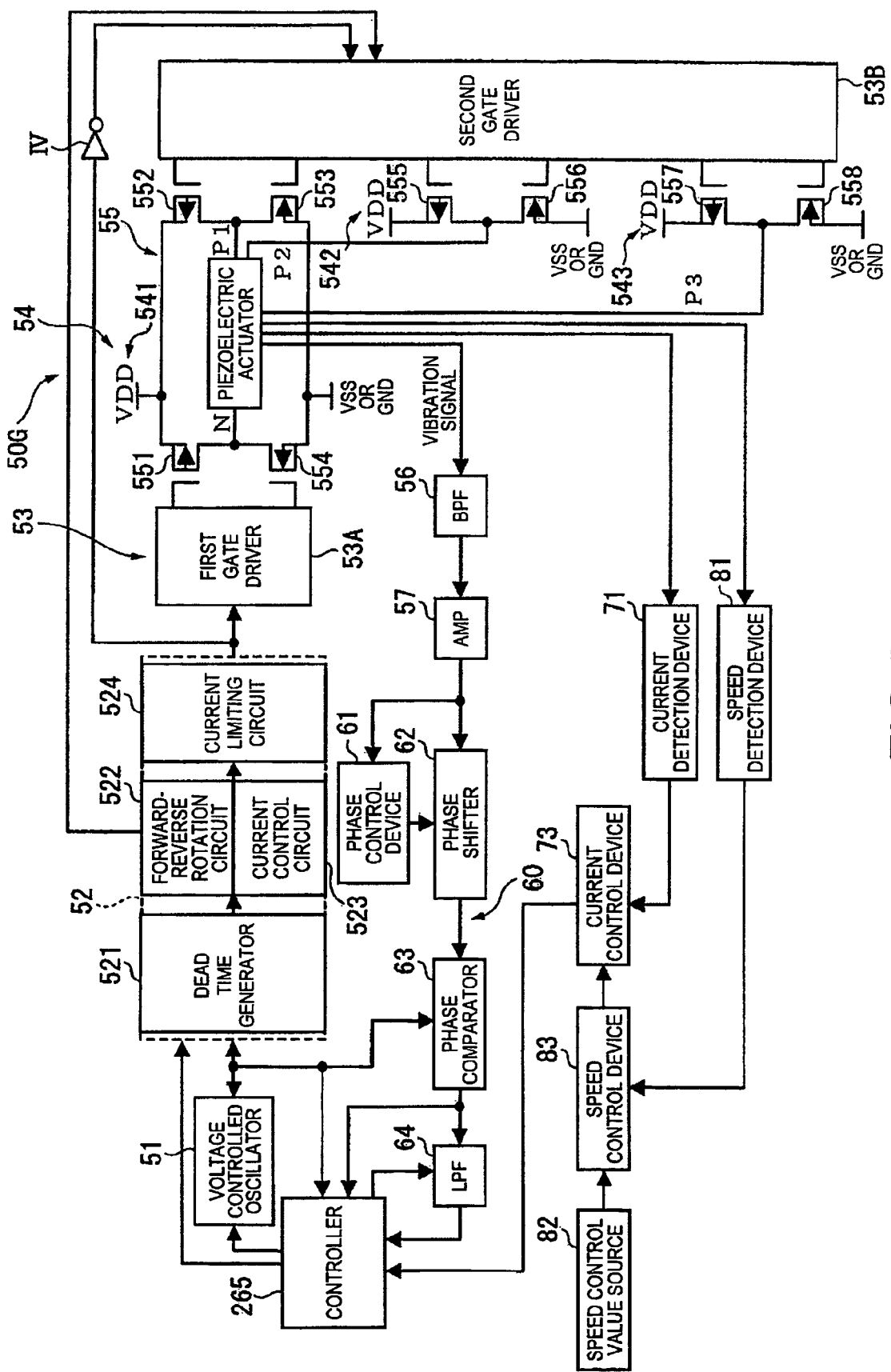
FIG. 25 is a block diagram of the drive control device in an eighth embodiment of the invention.

FIG. 24 shows a drive control device 50F according to this embodiment of the invention.

This drive control device 50F differs from the drive control device 50D shown in FIG. 44 by additionally including a speed detection device 81 for detecting the speed of the rotor, a speed control value source 82 for outputting a speed control value, and a speed control device 83 for outputting a control signal to the controller 265 based on the speed detected by the speed detection device 81 and the speed control value output by the speed control value source 82.

The speed detection device 81 includes, for example, the rotation sensor 15 for detecting rotation of the gear 41 (FIG. 2) that is rendered in unison with the rotor 30 in the first embodiment of the invention.

This embodiment of the invention affords the following effects in addition to the effects of the fifth embodiment.

(7) The controller 265 controls operation based on current flow to the piezoelectric actuator 20 in the sixth embodiment of the invention, but because the piezoelectric actuator 20 rotationally drives the rotor 30 by means of friction, slippage can occur. Error can therefore result with control based only on current. This embodiment of the invention directly detects the speed of the rotor 30 and gear 41, however, and therefore affords more accurate drive control.

Eighth Embodiment

An eighth embodiment of the invention is described next.

The drive control device 50G according to this eighth embodiment of the invention combines drive control based on current as in the sixth embodiment of the invention, and drive control based on speed as in the seventh embodiment of the invention.

More specifically, the drive control device 50G in this embodiment of the invention includes a current detection device 71, current control device 73, speed detection device 81, speed control value source 82, and speed control device 83.

The speed control device 83 outputs a current control value to the current control device 73 based on the speed control value from the speed control value source 82 and the speed detected by the speed detection device 81.

The current control device 73 outputs a control signal to the controller 265 based on the current control value from the speed control device 83 and the current detected by the current detection device 71.

Feedback control in this embodiment of the invention therefore includes a control loop based on the rotor speed as a major loop, and a control loop based on current as a minor loop.

In addition to the effects of the fifth to seventh embodiments, this embodiment of the invention affords the following effect.

(18) Rotor speed (rotational velocity) can be controlled more accurately because the vibration state of the piezoelectric actuator 20 is controlled based on two parameters, the speed of the rotor 30 that is rotationally driven by the piezoelectric actuator 20 and the current flow through the piezoelectric actuator 20.

Ninth Embodiment

A ninth embodiment of the invention is described next.

This embodiment of the invention has the features of the first embodiment and the features of the fifth embodiment of the invention. The piezoelectric actuator drive control device and drive control method described in this embodiment of the invention are applied to a piezoelectric actuator 20 for driving the chronograph seconds hand 7A of a timepiece 1 as described in the first embodiment of the invention. This embodiment of the invention is therefore described with reference to FIG. 26 to FIG. 29 in addition to FIG. 1 to FIG. 3 and FIG. 5 describing the first embodiment of the invention.

9-1. Arrangement of the Piezoelectric Actuator Drive Control Device

Figure 26:
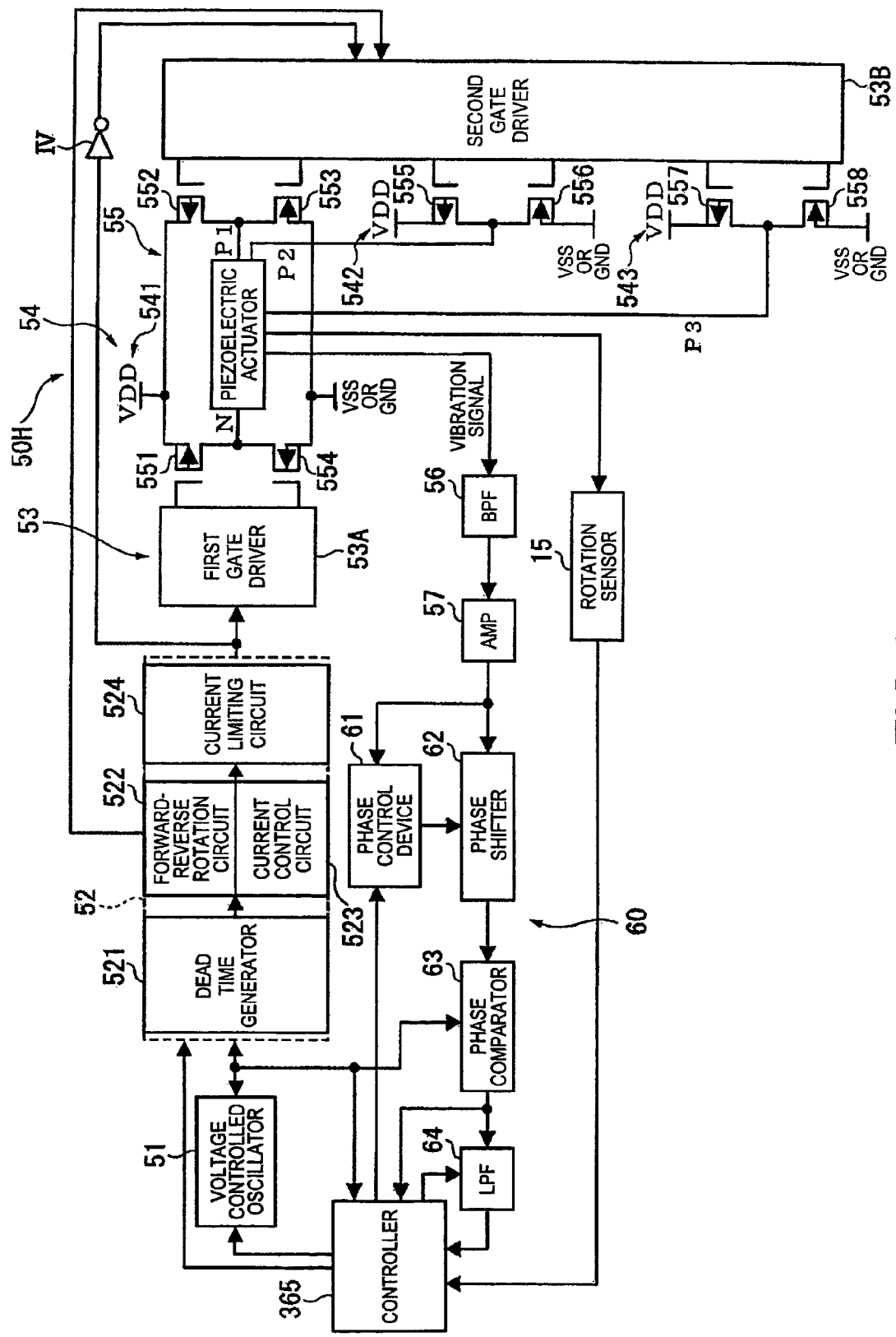
FIG. 26 is a block diagram of a piezoelectric actuator drive control device in a ninth embodiment of the invention.

FIG. 26 shows the arrangement of a piezoelectric actuator drive control device 50H according to this embodiment of the invention.

Figure 27:
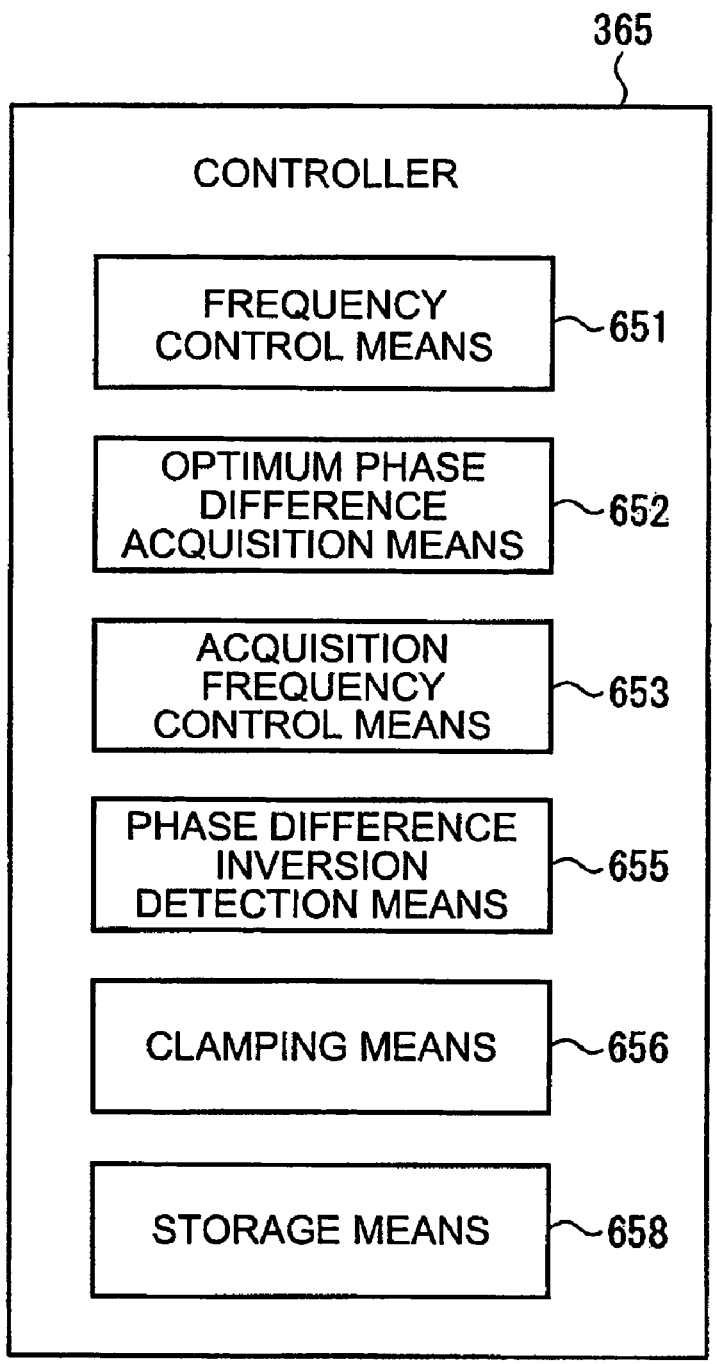
FIG. 27 is a block diagram of the controller in the drive control device of a piezoelectric actuator according to the ninth embodiment of the invention.

FIG. 27 is a schematic block diagram of the controller 365 used as the control means. This controller 365 includes a frequency control means 651, an optimum phase difference acquisition means 652, an acquisition frequency control means 653, a phase difference inversion detection means 655, a clamping means 656, and a storage means 658. An initialization means is rendered by the optimum phase difference acquisition means 652 and the phase difference inversion detection means 655.

The storage means 658 stores the content of the storage means 654 shown in FIG. 6, and the content of the storage means 657 shown in FIG. 15, that is, how long the piezoelectric actuator 20 has operated continuously since operation started (i.e., the continuous drive time, which is set to one hour, for example), and a table of drive frequency data.

The data table in storage means 658 stores the clamping frequencies where the size of the phase difference inverts as described in FIG. 18 when the optimum phase difference is detected again when sweeping the frequency of the drive signal supplied to the oscillator 20A. More specifically, as described in FIG. 16 and FIG. 17, the phase difference at the optimum drive state G (a predetermined drive state) where the rotor 30 speed is greatest is defined as the optimum phase difference, and the frequencies in the phase difference inversion range R1 and phase difference return range R2 containing the phase difference inversion frequency T1, clamping frequency T2, return frequency T3, and return clamping frequency T4 described above are compiled in a table stored in the storage means 658.

9-2. Piezoelectric Actuator Drive Control

The process whereby the drive control device 50H drives the piezoelectric actuator 20 is described next with reference to the flow charts in FIG. 28 and FIG. 29.

Figure 28:
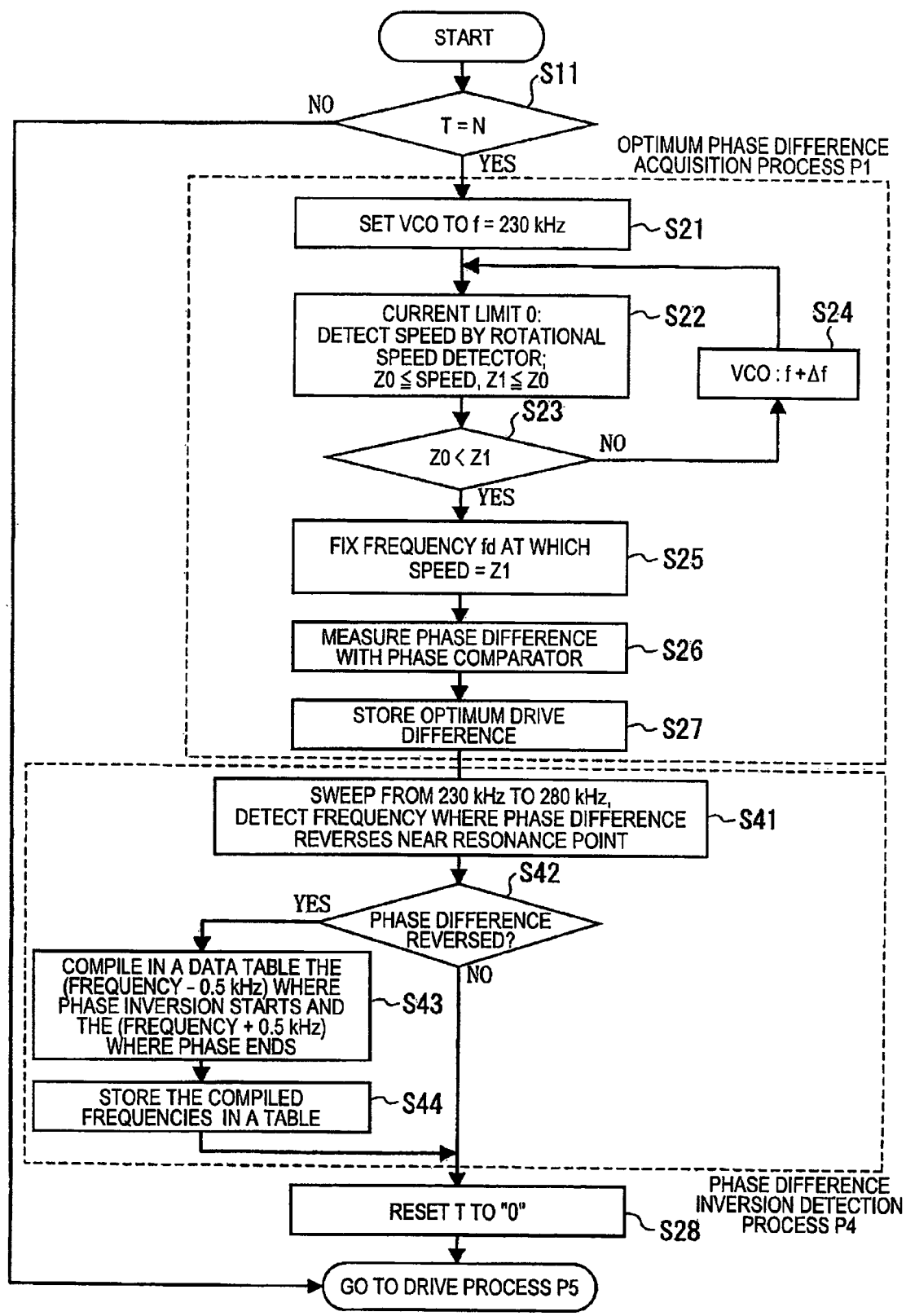
FIG. 28 is a flow chart of the optimum phase difference acquisition process and phase difference inversion detection process executed by the piezoelectric actuator drive control device in a preferred embodiment of the invention.
Figure 29:
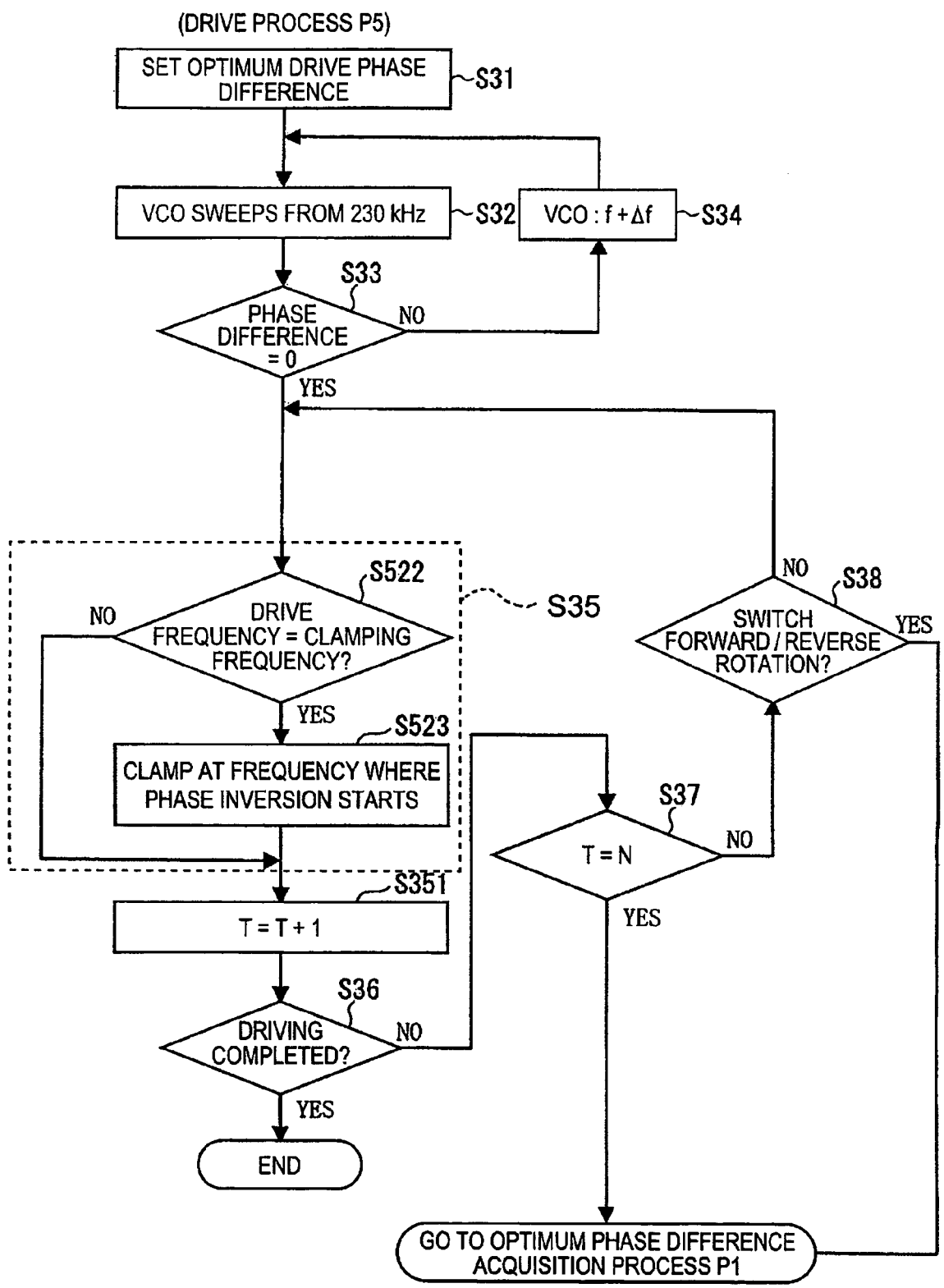
FIG. 29 is a flow chart of the drive process executed by the piezoelectric actuator drive control device in a preferred embodiment of the invention.

The controller 365 of the drive control device 50H executes the optimum phase difference acquisition process P1 and the phase difference inversion detection process P4 shown in FIG. 28, and the drive process P5 shown in FIG. 29.

Note that the optimum phase difference acquisition process P1 and phase difference inversion detection process P4 render the initialization process.

9-2-1. Operation of the Acquisition Frequency Control Means

As shown in FIG. 28, the controller 365 checks the elapsed time T since piezoelectric actuator 20 operation started, that is, the continuous drive time, using the timer function of the acquisition frequency control means 653 (step S11) to execute the optimum phase difference acquisition process P1 and phase difference inversion detection process P4 at a predetermined frequency. More specifically, if confirmation of the continuous drive time (step S11) determines that the elapsed time T since the piezoelectric actuator 20 started operating has reached the continuous drive time N stored in the storage means 658 of the controller 65 (step S11 returns Yes), the optimum phase difference acquisition process P1 is executed. If not (step S11 returns No), the drive process P5 described in FIG. 8 is executed.

When piezoelectric actuator 20 operation starts, continuous drive time N is initialized to 0.

9-2-2. Optimum Phase Difference Acquisition Process

In the optimum phase difference acquisition process P1 the optimum phase difference acquisition means 652 of the controller 65 controls driving the rotor 30 to find the desired piezoelectric actuator 20 drive state, which in this embodiment of the invention is defined as operating at substantially maximum efficiency (maximum rotor 30 speed).

More specifically, the frequency of the drive signal produced by the voltage controlled oscillator 51 is first set to a low frequency (230 kHz in this embodiment of the invention) (step S21) and the speed of the rotor 30 is detected based on the speed input from the rotation sensor 15 (FIG. 2) with no current limiting (step S22). Two variables Z0 and Z1 are used to detect the rotational speed. Each time the speed is detected, the current speed is stored to Z0, and Z0 and Z1 are compared. If Z0 is greater than Z1, Z0 is stored to Z1. The speed that is provisionally the maximum rotational speed each time the drive frequency is swept is thus continuously substituted for Z1 and Z1 is thus updated.

Z0 and Z1 are then compared Z0 (step S23), and if Z0 (the currently detected speed) is less than or equal to Z1 (the value provisionally stored as the maximum rotational speed) (step S23 returns No), the peak speed has still not been detected. The drive frequency is therefore increased a predetermined amount (step S24), and sweeping continues. In this embodiment of the invention the drive frequency is increased in 0.5 kHz increments and the drive frequency is swept one way from 230 kHz to 280 kHz. It will be obvious that in this and the following embodiments of the invention the drive frequency can alternatively be swept from high frequency to low frequency.

If Z0 is less than Z1 (step S23 returns Yes), rotor speed is considered to have passed the peak speed. The value of Z1 provisionally stored based on the data from the previous detection instance is therefore set as the frequency denoting the maximum rotor speed (maximum drive efficiency), and control goes to step S25.

The frequency is then fixed to the frequency fd at which the rotor speed equals Z1 (step S25), and the phase comparator 63 then detects the phase difference in this state (step S26). The phase difference detected by the phase comparator 63 is set as the optimum phase difference and stored in the storage means 658 [654, sic] of the controller 65 (step S27).

The following phase difference inversion detection process P4 is then executed based on the optimum phase difference stored in the storage means.

Whether the reversing phenomenon occurs, that is, whether the size of the phase difference inverts when the optimum phase difference (see FIG. 16 and θ in FIG. 17) is achieved again when sweeping the drive frequency, is determined (steps S41, S42) in the phase difference inversion detection process P4. The target phase difference θ is set in the phase shifter 62.

More specifically, the phase difference inversion detection means 655 of the controller 365 applies phase difference feedback control using the phase difference detection means 60 while sweeping the frequency of the drive signal output by the voltage controlled oscillator 51 in one direction from 230 kHz to 280 kHz in steps S41 and S42.

If this phase difference inversion results as described in FIG. 16, the phase difference inversion detection result (S42) from the clamping means 656 used for clamping the phase difference inversion frequency returns YES, the data table TBL (FIG. 18) is compiled (S43), and the data table TBL is stored in the storage means 658 [657, sic] (S44).

If phase difference inversion does not occur, the phase difference inversion detection result (S42) is NO, and data in the data table TBL stored in the storage means 658 is deleted in this embodiment of the invention.

When the optimum phase difference acquisition process P1 and phase difference inversion detection process P4 end, the elapsed time T is reset to 0 (step S28) and control goes to the drive process P5.

9-2-3. Drive Process

In the drive process P5 shown in FIG. 29, the controller 365 first sets the optimum phase difference stored in storage means 658 in the optimum phase difference acquisition process P1 to the phase shifter 62 (FIG. 26) (step S31). The drive frequency is then swept from 230 kHz (step S32) and phase difference feedback control is applied by the phase difference detection means 60 and frequency control means 651 (FIG. 26). More specifically, the drive frequency is swept using the same frequency increment described above until the phase difference output from the phase comparator 63 goes to 0, that is, until the detected phase difference matches the optimum phase difference set in the phase shifter 62 (steps S33 and S34).

If the phase difference matches the optimum phase difference (step S33 returns Yes), the phase difference detection means 60 continues phase difference feedback control in the same way, thereby causing the frequency of the drive signal to track the phase difference between the detection signal and the drive signal (step S35). More specifically, the frequency control means 651 controls the voltage signal input to the voltage controlled oscillator 51 so that the phase difference equals the optimum phase difference and output from the phase comparator 63 is therefore zero. To generate the voltage signal output to the voltage controlled oscillator 51, whether the drive frequency indicated by the voltage signal to be generated matches a frequency in the data table TBL (FIG. 18) is determined (S522).

If the drive frequency indicated by the voltage signal to be generated does not match a frequency in the data table TBL (S522 returns No), this voltage signal is generated and output to the voltage controlled oscillator 51, thus changing the frequency of the drive signal output by the voltage controlled oscillator 51.

If the drive frequency indicated by the voltage signal to be generated does not match a frequency in the data table TBL (S522 returns No), the voltage signal is generated and output to the voltage controlled oscillator 51, thus changing the frequency of the drive signal output by the voltage controlled oscillator 51.

More specifically, when the drive state is Q1 (FIG. 17), is a positive deviation D1 between the detected phase difference and the optimum phase difference θ, that is, the phase difference is greater than the optimum phase difference, and the drive frequency is therefore increased in order to reduce the phase difference. If the drive state is Q2 (FIG. 17), there is a negative deviation D2 between the phase difference and the target phase difference θ, that is, the phase difference is less than the optimum phase difference, and the drive frequency is therefore decreased in order to increase the phase difference.

Steps S521 and S522 repeat until the drive frequency denoted by the voltage signal generated by the controller 265 matches a frequency in the data table TBL.

If phase difference inversion is not detected in the previously executed phase difference inversion detection process P4, the controller 365 in this embodiment of the invention controls (S35) the generated voltage signal each time a detection signal is input without determining whether the drive frequency denoted by the voltage signal matches a frequency in the data table TBL (S522).

If the voltage signal to be generated by the controller 365 matches a frequency in the data table TBL (FIG. 18) (S522 returns Yes), the frequency at the start of the phase difference inversion is clamped to generate and output the voltage signal (S523).

This holds the frequency of the drive signal generated by the voltage controlled oscillator 51 and limits tracking the drive frequency to the phase difference, and therefore prevents the drive frequency from passing clamping frequency T2 and reaching the phase difference inversion frequency T1, and thus prevents reversing the tracking direction of the drive frequency based on the phase difference.

If control loops back to step S35 after clamping (S523), the process repeats based on the next detection signal, and step S522 then returns NO, the frequency of the drive signal tracks the phase difference.

Each time the phase difference feedback loop of steps S35, S522, and S523 runs, the controller 365 increments the drive time counter denoting the elapsed time T by one (step S351).

This drive process P5 continues until a stop driving command is input to the controller 365 (step S36) or a signal changing the direction of chronograph seconds hand 7A rotation is input to the controller 365 (S38).

Phase difference feedback control based on the phase difference between the drive signal and detection signal (i.e., the optimum phase difference) is used to control driving the piezoelectric actuator 20 in this embodiment of the invention, but the vibration characteristic of the piezoelectric actuator 20 can change over time due to heat or wear from continuously driving the piezoelectric actuator 20 as described with reference to FIG. 9. This changes the optimum phase difference that should be used as the target for control by the drive control device 50H, and can result in the desired torque not being achieved.

Such changes over time also change the phase difference inversion frequency T1 and clamping frequency T2, and therefore affect drive control.

When phase difference feedback control in the drive process P5 continues for a predetermined time corresponding to the time change in the drive characteristic of the piezoelectric actuator 20, the acquisition frequency control means 653 of the controller 365 [65, sic] detects that the elapsed time T has reached continuous drive time N (renewal step S37 in FIG. 29) and therefore runs the optimum phase difference acquisition process P1 and phase difference inversion detection process P4 shown in FIG. 28 again. The optimum phase difference acquisition process P1 is thus repeated when the continuous drive time (1 hour in this example) stored in the controller 365 passes, and the value defined as the optimum phase difference is thus updated. The phase difference inversion detection process P4 is also when the continuous drive time (1 hour in this example) stored in the controller 365 passes, and the values stored as the phase difference inversion frequency T1 and clamping frequency T2, for example, in storage means 658 are updated.

By thus correcting the values stored as the optimum phase difference, the phase difference inversion frequency T1, and the clamping frequency T2, for example, to account for shifting of the resonance point over time, drive control premised on an optimum phase difference can be desirably applied by the drive control device 50H.

The piezoelectric actuator 20 can thus drive the rotor 30 in a forward direction and a reverse direction by selectively supplying drive signals to the drive electrodes 221, 222, 223 as described above, but the combined phase differences of the longitudinal oscillation and sinusoidal oscillation when driving in the forward direction and when driving in the reverse are not symmetrical, and the drive characteristics differ when driving forward and reverse.

As a result, the optimum phase difference acquisition process P1 and phase difference inversion detection process P4 shown in FIG. 28 (where these processes P1 and P4 [P2, sic] constitute an initialization process) are executed again whenever the user causes the direction of chronograph seconds hand 7A rotation to change or the forward-reverse rotation circuit 522 (FIG. 26) inputs a signal for changing the direction of rotation to the controller 365 (S38 returns Yes) when, for example, a predetermined time passes or in order to adjust the displayed time.

The drive characteristic of the piezoelectric actuator 20 controlled as described above is substantially the same as described in FIG. 21.

9-3. Effect of this Embodiment of the Invention

In addition to the effects of the first and fifth embodiments of the invention described above, this embodiment of the invention affords the following effects.

(19) Changes in the resonance point and optimum phase difference due to temperature change, wear, or other effects of aging, and inversion of the phase difference when sweeping the frequency as a vibration characteristic of the piezoelectric actuator 20, can be easily accommodated as a result of the controller 365 running the optimum phase difference acquisition process P1 and phase difference inversion detection process P4 at a predetermined frequency. An accurate, stable movement can therefore be achieved for a chronograph seconds hand 7A that is driven continuously for a long period of time by the piezoelectric actuator 20 irrespective of the operating environment in which the electronic timepiece 1 incorporating the piezoelectric actuator 20 is used. As a result, the piezoelectric actuator can be used for an even wider range of applications while affording improved reliability and a lower cost.

(20) When the direction of chronograph seconds hand 7A rotation changes (S38), the optimum phase difference acquisition process P1 and phase difference inversion detection process P4 are run regardless of the length of the continuous drive time since piezoelectric actuator 20 operation started (S37). Therefore, even when the vibration behavior of the oscillator 20A differs when the rotor 30 is driven forward and when the rotor 30 is driven in reverse, the drive control device 50H can continue to suitably and stably control piezoelectric actuator 20 drive because the optimum phase difference, the phase difference inversion frequency, and the clamping frequency are updated.

(21) By supplying a single phase drive signal of a frequency between the resonance point of the longitudinal oscillation (fr1 in FIG. 5) and the resonance point of the sinusoidal oscillation (fr2 in FIG. 5) to the oscillator 20A, the phase of longitudinal oscillation and the phase of sinusoidal oscillation are merged and phase difference inversion occurs more easily. As a result, the effect of detecting the phase difference inversion frequency and clamping the drive frequency based on the phase difference inversion frequency is particularly effective for achieving stable drive control.

9-4. Variations of this Embodiment

In the ninth embodiment of the invention the optimum phase difference acquisition process P1 (FIG. 28) has steps (S21 and S24) for sweeping the drive frequency, the phase difference inversion detection process P4 also has a step (S41) for sweeping the drive frequency, and the band of drive frequencies swept in each of these steps for sweeping the drive frequency (that is, S21 [S24, sic], S24, and S41) is 230 kHz to 280 kHz in each of these steps.

A variation of this embodiment is described next with reference to FIG. 30 and FIG. 31.

Figure 30:
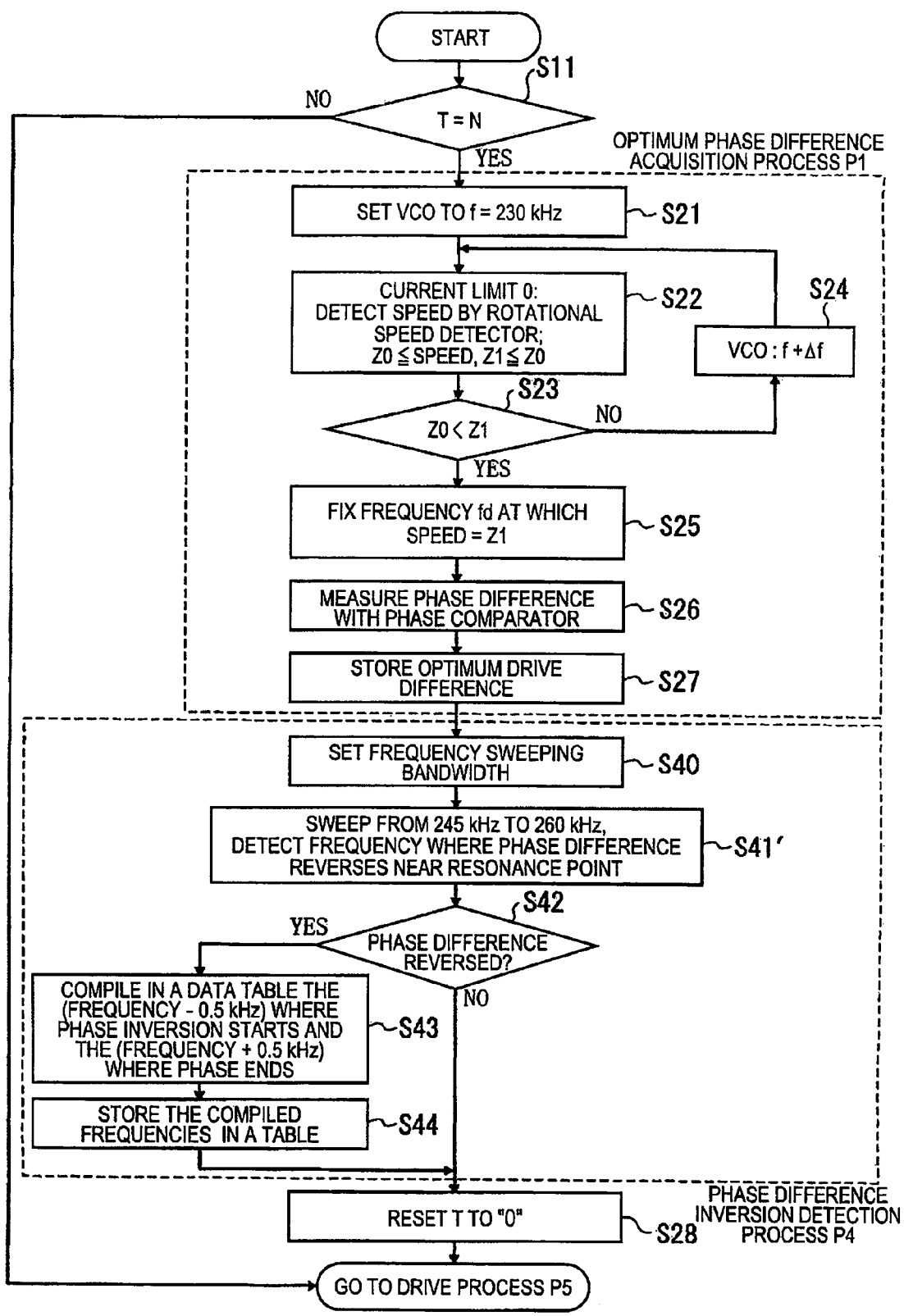
FIG. 30 is a flow chart of the optimum phase difference acquisition process and phase difference inversion detection process in a variation of the present invention.

In FIG. 30 the drive frequency sweeping steps (S21 and S24, and S41') sweep different frequency bands. More specifically, the frequency band swept by steps S21 and S24 in the optimum phase difference acquisition process P1 is the same as in FIG. 28. In the phase difference inversion detection process P4, however, a specific frequency sweeping band is first set based on the optimum phase difference acquired in the optimum phase difference acquisition process P1, the range of possible change in the phase difference between the drive signal and detection signal when the resonance point changes over time, and the range of possible change in the drive frequency during variable frequency drive control based on phase difference feedback (S40), and step S41' then sweeps the frequency band determined by step S40, such as 245 kHz to 260 kHz in this example. In step S40 the drive frequency sweeping band is set with consideration for change in the resonance point over time as shown in FIG. 9. The frequency band shown in step S41' in FIG. 30 is for example only.

Figure 31:
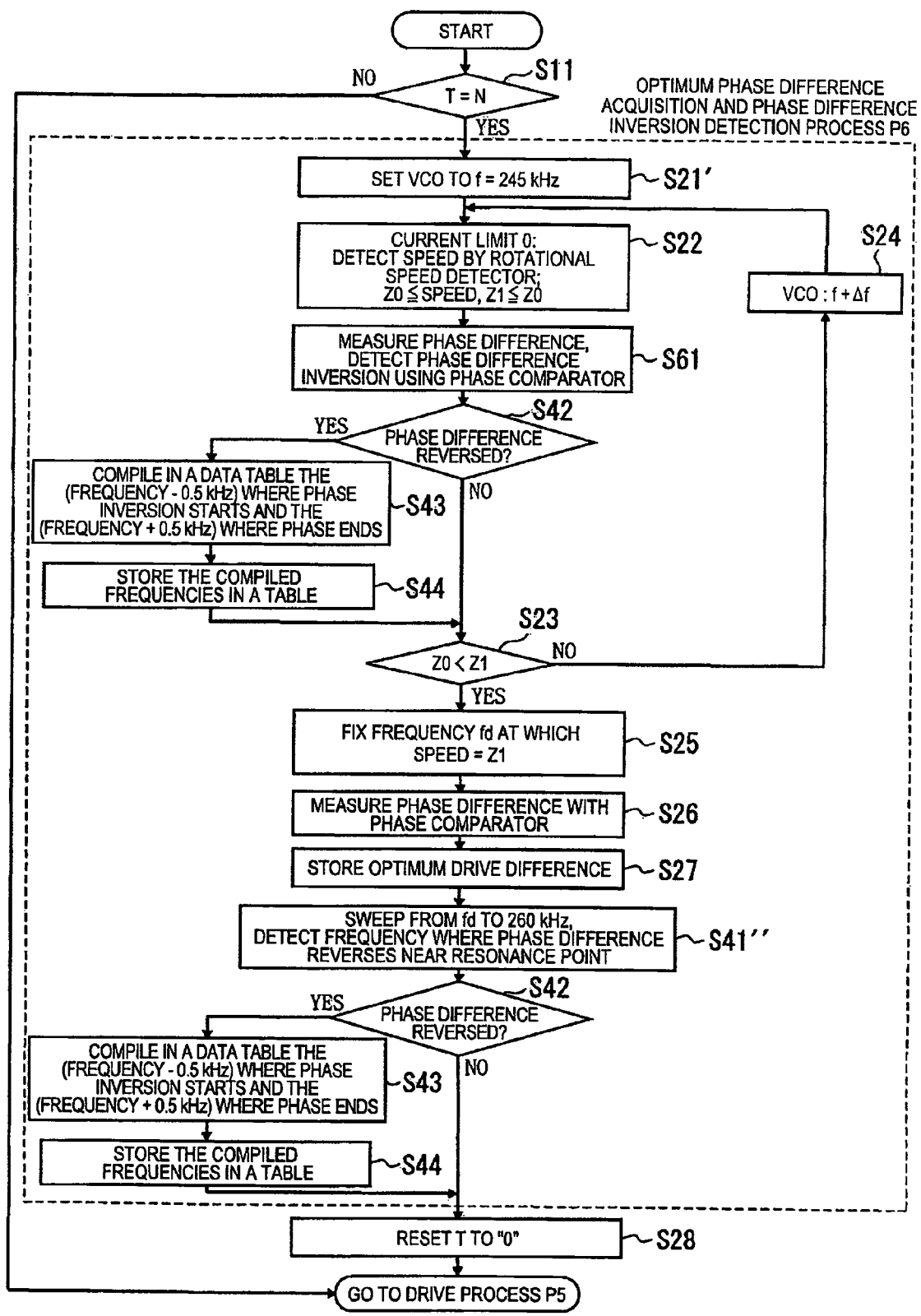
FIG. 31 is a flow chart of the optimum phase difference acquisition process and phase difference inversion detection process in another variation of the present invention.

FIG. 31 shows a variation (optimum phase difference acquisition and phase difference inversion detection process P6) in which the drive frequency sweeping steps (S21, S24, S41) are combined in one step. In this example the frequency at which sweeping starts is set to 245 kHz, for example, in step S21', and the phase difference inversion frequency is detected (S61) while sweeping (S24) to the drive frequency fd at which the maximum rotor speed is detected (step S23 returns Yes) to acquire the optimum phase difference (S27). After acquiring the optimum phase difference, step S41" sweeps from the frequency fd corresponding to the optimum phase difference to 260 kHz, for example, to determine if phase difference inversion occurs when the optimum phase difference is reached again (S42). The frequency band swept in steps S21' to S27 does not overlap the frequency band swept in step S41". In the method shown in FIG. 31, the drive frequency achieving the optimum phase difference and the drive frequency at which phase difference inversion occurs are assumed to be in a specific frequency range, and a range of drive frequencies corresponding to a range that varies with time and a range that varies with phase difference feedback control is swept.

The method shown in FIG. 31 can be easily achieved when the controller 365 is a software program, and this program is read into and executed by a data processing device.

Because the methods shown in FIG. 30 and FIG. 31 do not sweep overlapping drive frequency bands, less time is required to execute the optimum phase difference acquisition process P1 and phase difference inversion detection process P4. Executing the optimum phase difference acquisition process P1 and phase difference inversion detection process P4 therefore has less effect on the movement of the chronograph seconds hand 7A.

Tenth Embodiment

A tenth embodiment of the invention is described next below.

The ninth embodiment of the invention provides drive control for driving the piezoelectric actuator 20 at maximum efficiency. This embodiment of the invention differs by providing drive control that enables adjusting how much the piezoelectric actuator 20 drives the driven body.

Figure 32:
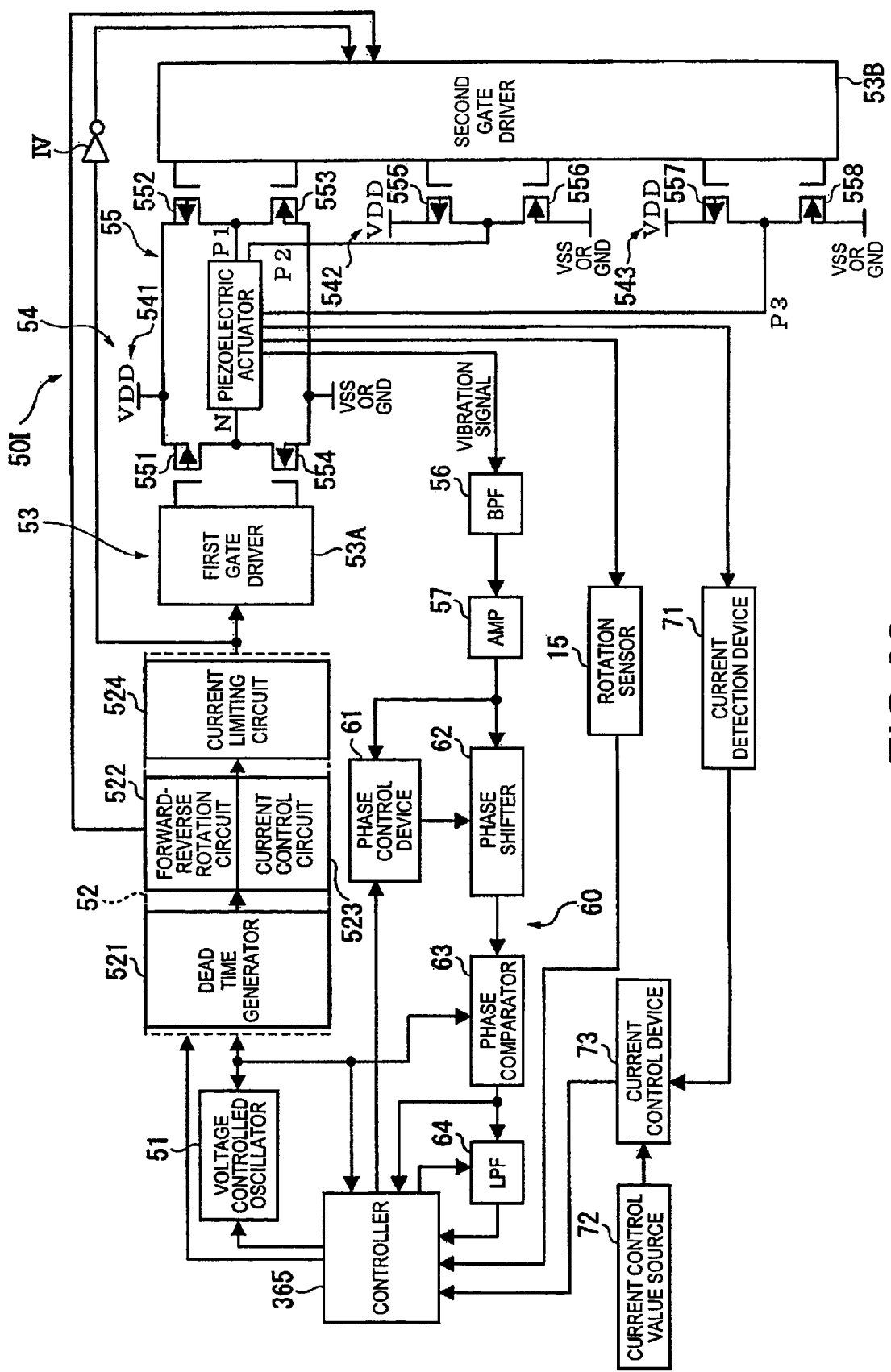
FIG. 32 is a block diagram of a piezoelectric actuator drive control device according to a tenth embodiment of the invention.

FIG. 32 is a block diagram showing the arrangement of a drive control device 501 for a piezoelectric actuator 20 according to this embodiment of the invention.

This drive control device 501 differs from the drive control device 50H shown in FIG. 26 by additionally including a current detection device 71 for detecting current flow to the piezoelectric actuator 20 portion, a current control value source 72 for outputting a current control value, and a current control device 73 for outputting a control signal to the controller 365 based on the current control value output from the current control value source 72 and the current value output by the current detection device 71.

In addition to the effects of the ninth embodiment, this embodiment of the invention also affords the same effects as the drive control device 50A described in the second embodiment of the invention (FIG. 10).

Eleventh Embodiment of the Invention

An eleventh embodiment of the invention is described next.

Drive control in this embodiment of the invention enables adjusting the speed of the rotor that is the driven body of the piezoelectric actuator 20 in substantially the same way as in the tenth embodiment but by using different means than in the tenth embodiment of the invention.

Figure 33:
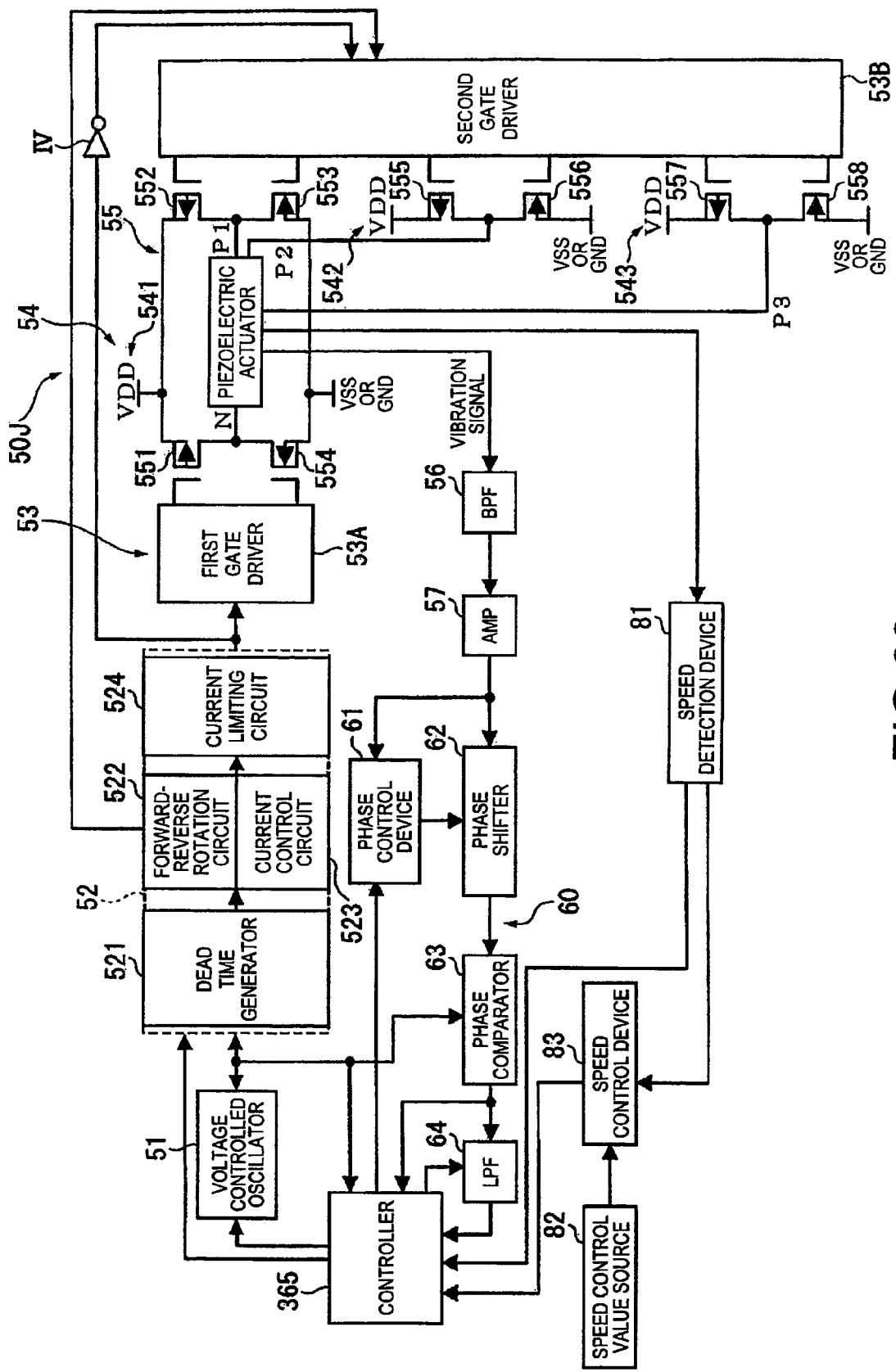
FIG. 33 is a block diagram of the drive control device in an eleventh embodiment of the invention.

FIG. 33 shows a drive control device 50J according to this embodiment of the invention.

This drive control device 50J differs from the drive control device 50H shown in FIG. 26 by additionally including a speed detection device 81 for detecting the speed of the rotor, a speed control value source 82 for outputting a speed control value, and a speed control device 83 for outputting a control signal to the controller 365 based on the speed detected by the speed detection device 81 and the speed control value output by the speed control value source 82.

The speed detection device 81 includes, for example, the rotation sensor 15 for detecting rotation of the gear 41 (FIG. 2) that is rendered in unison with the rotor 30 in the first embodiment of the invention.

Figure 34:
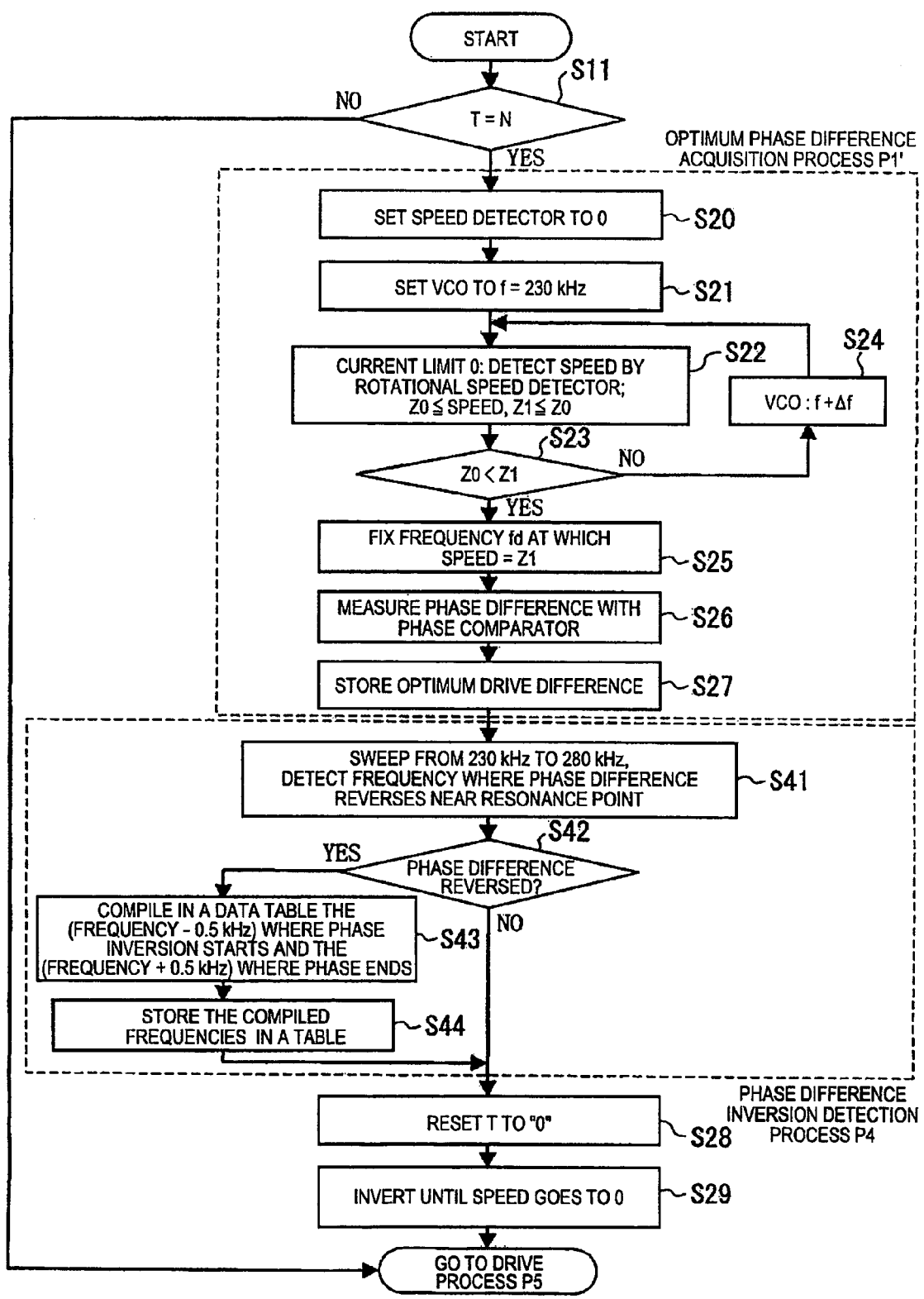
FIG. 34 is a flow chart of the optimum phase difference acquisition process executed by the piezoelectric actuator drive control device according to the eleventh embodiment of the invention.

FIG. 34 is a flow chart of an optimum phase difference acquisition process P1' according to this embodiment of the invention.

This optimum phase difference acquisition process P1' first sets the speed detection device 81 to 0 (step S20). Steps S21 to S27 then execute in the same way as the optimum phase difference acquisition process P1 described in FIG. 28. After acquiring the optimum phase difference S27 [sic] (S27), the phase difference inversion detection process P4 executes, and the elapsed time T is then reset (S28). The speed detection device 81 continues detecting the speed of the rotor 30 while steps S21 to S28 execute.

The rotor 30, which has been rotating since step S20, is then reversed by the speed detection device 81, speed control value source 82, and speed control device 83 until the speed goes to 0 (motion resetting step, step S29). As a result, a control value reflecting the time required for optimum phase difference acquisition process P1' and phase difference inversion detection process P4 to execute is input through the timekeeping unit block of the circuit board to the speed control value source 82 when starting the drive process P5 (FIG. 29), and the speed of the rotor 30 is adjusted by the speed control device 83.

The speed detection device 81 continues detecting the speed of the rotor 30 while drive process P5 executes.

In addition to the effects of the ninth embodiment, this embodiment of the invention also affords the same effects as the drive control device 50B described in the third embodiment of the invention (FIG. 11).

Twelfth Embodiment

A twelfth embodiment of the invention is described next.

Figure 35:
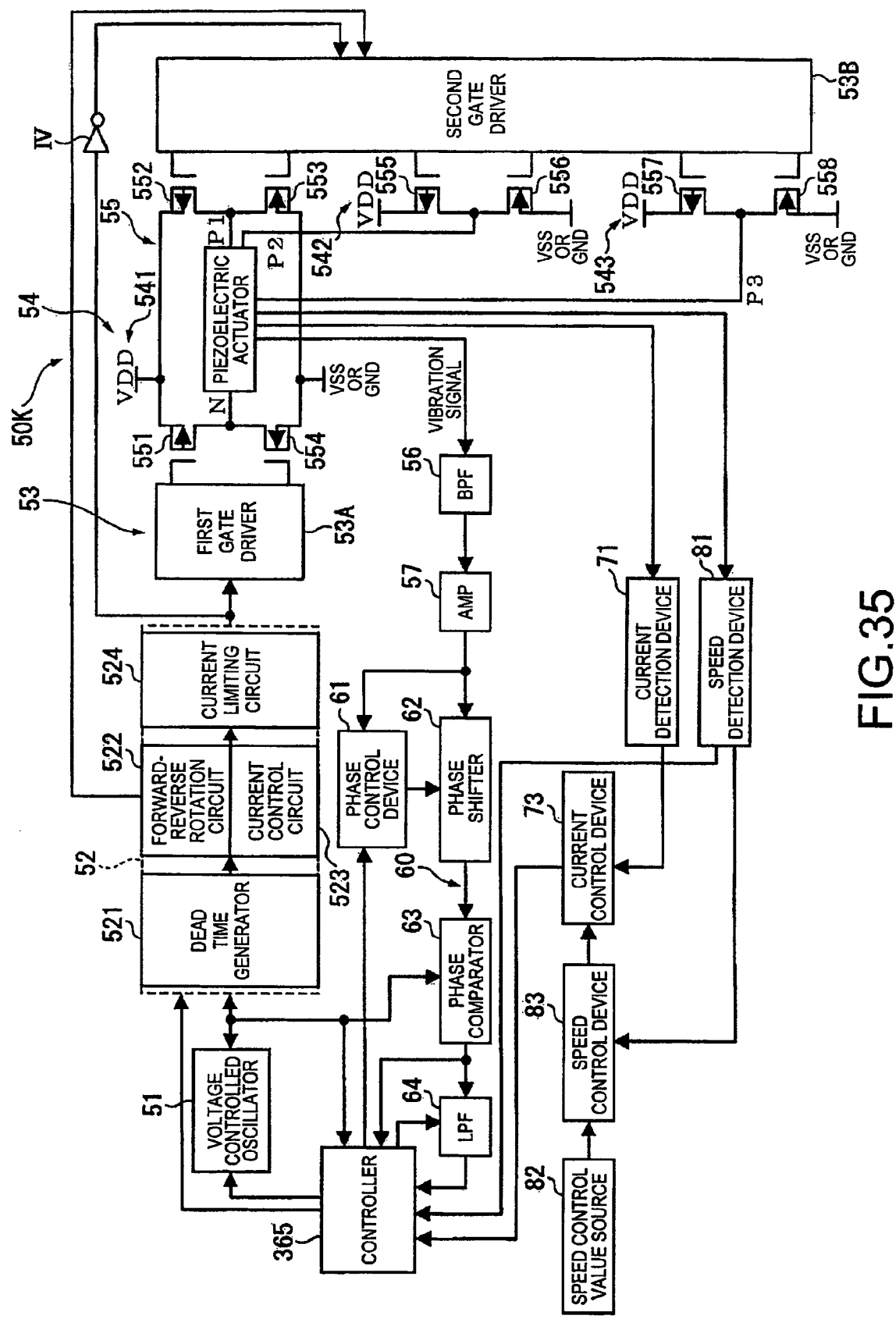
FIG. 35 is a block diagram of the drive control device in a twelfth embodiment of the invention.

The drive control device 50K according to the embodiment of the invention shown in FIG. 35 combines drive control based on current as in the tenth embodiment of the invention, and drive control based on speed as in the eleventh embodiment of the invention.

More specifically, the drive control device 50K in this embodiment of the invention includes a current detection device 71, current control device 73, speed detection device 81, speed control value source 82, and speed control device 83.

The speed control device 83 outputs a current control value to the current control device 73 based on the speed control value from the speed control value source 82 and the speed detected by the speed detection device 81.

The current control device 73 outputs a control signal to the controller 65 based on the current control value from the speed control device 83 and the current detected by the current detection device 71.

Feedback control in this embodiment of the invention therefore includes a control loop based on the rotor speed as a major loop, and a control loop based on current as a minor loop.

Figure 13:
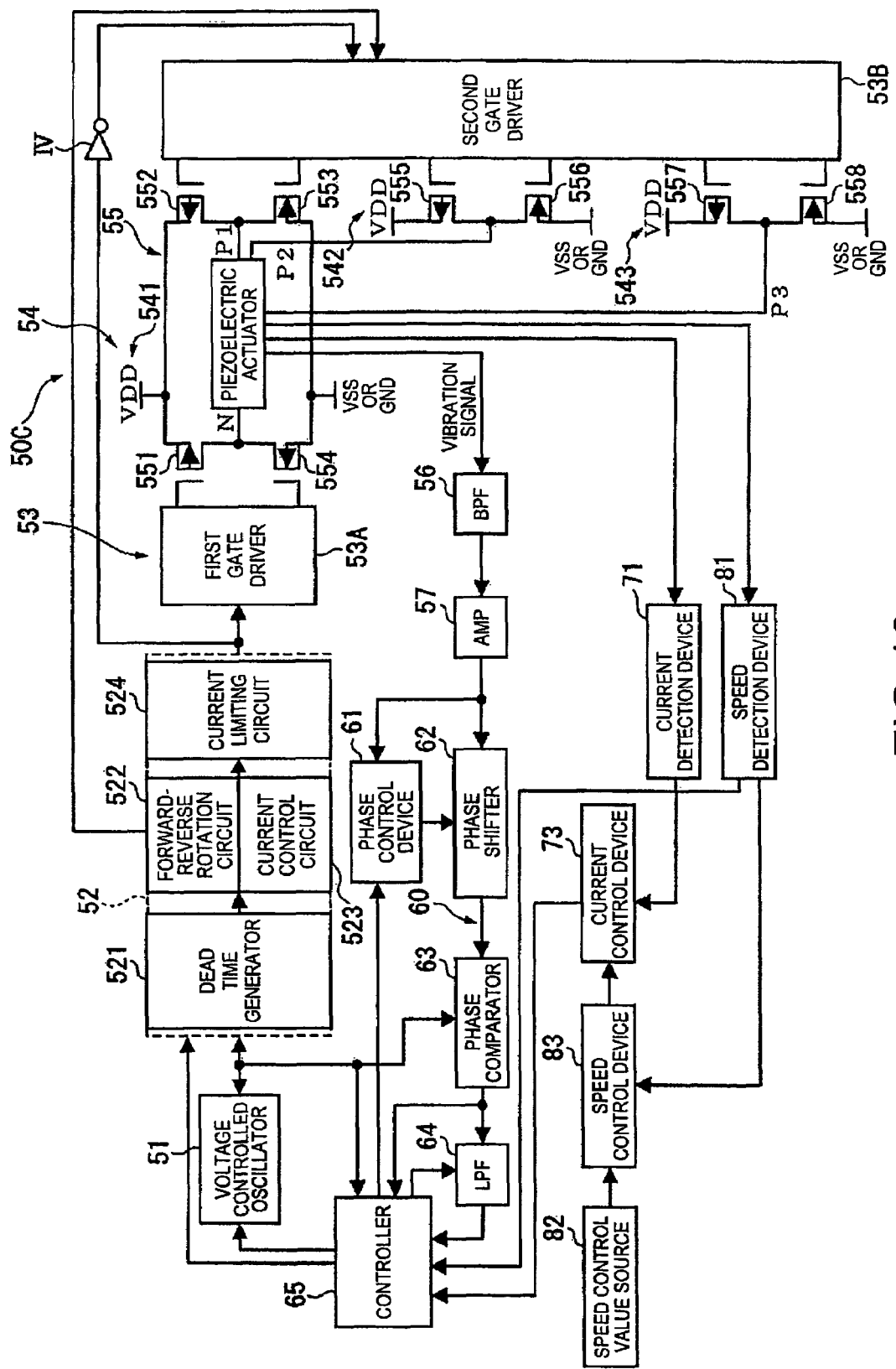
FIG. 13 is a block diagram of a drive control device according to a fourth embodiment of the invention.

In addition to the effects of the ninth embodiment, this embodiment of the invention also affords the same effects as the drive control device 50C described in the fourth embodiment of the invention (FIG. 13).

Other Variations of the Invention

The present invention is not limited to the embodiments described above, and can be varied and improved in many ways.

Figure 36:
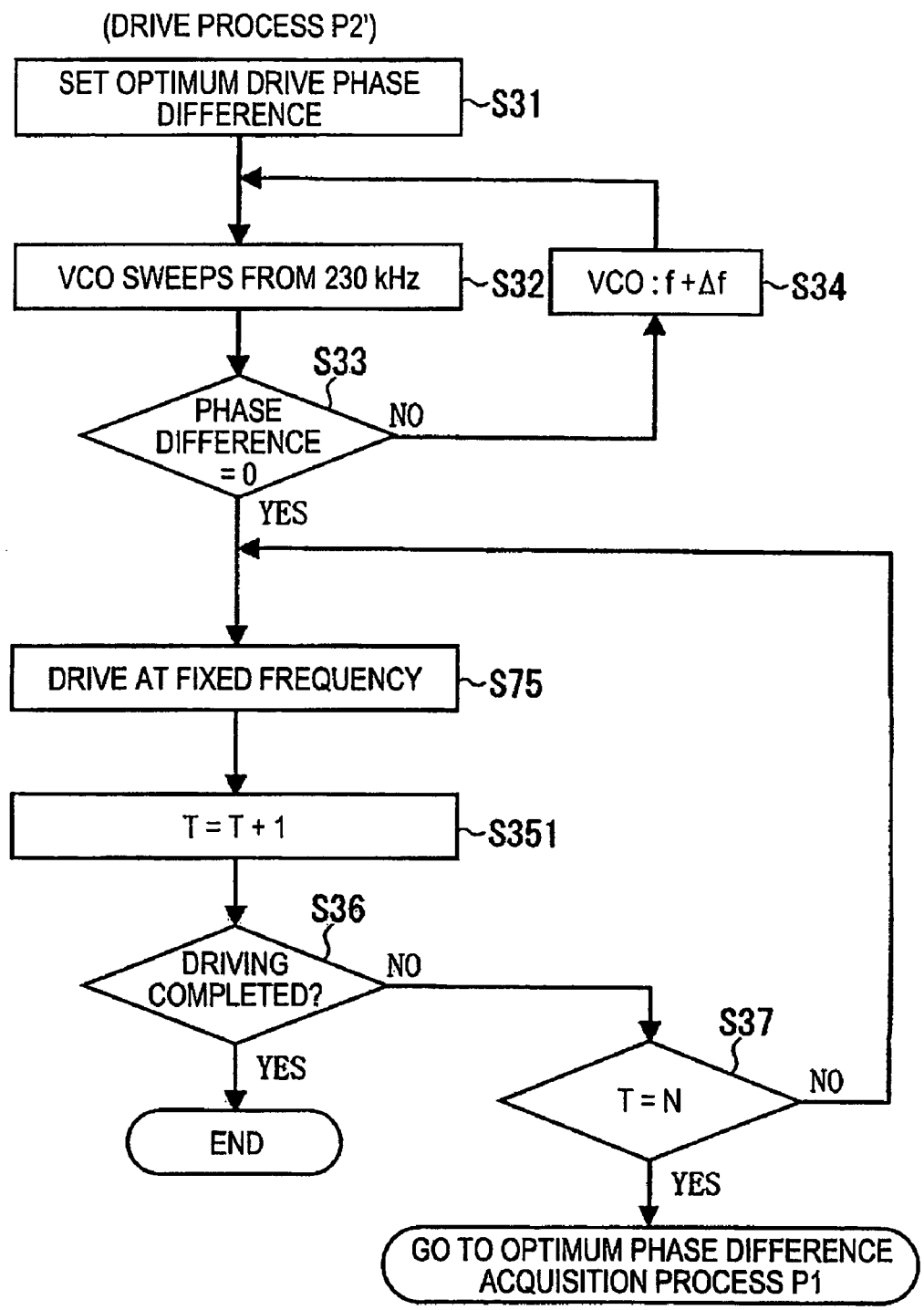
FIG. 36 is a flow chart of a first variation of the drive process according to the present invention.

FIG. 36 shows a drive process P2' (first variation) that can be used instead of the drive process P2 (FIG. 8) described in the first embodiment of the invention. This drive process P2' applies drive control using a fixed drive frequency (step S75) instead of executing the phase difference feedback step S35 shown in drive process P2.

The drive process thus does not necessarily need to use phase difference feedback control, and can operate with a fixed drive frequency.

Figure 37:
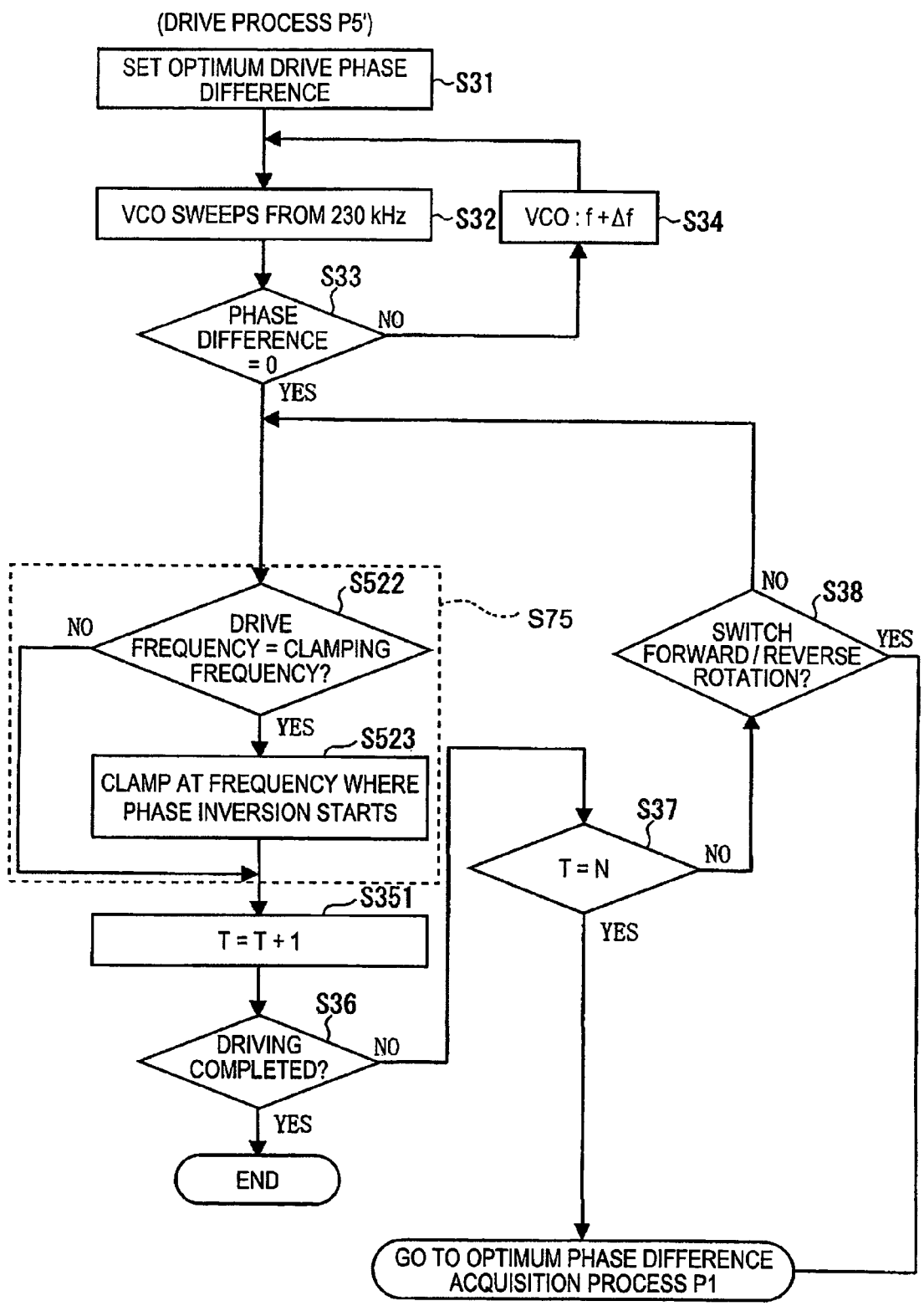
FIG. 37 is a flow chart of a second variation of the drive process according to the present invention.
Figure 38:
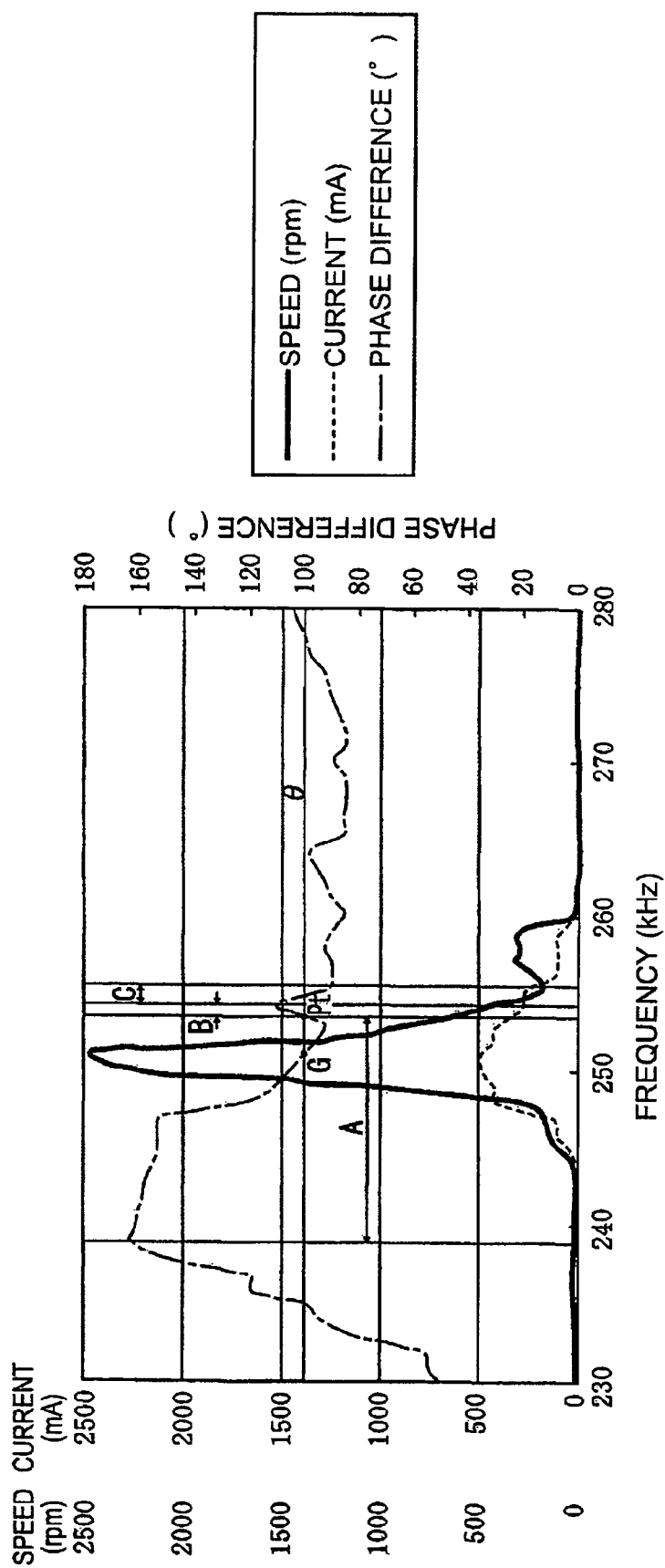
FIG. 38 is a graph showing change in the phase difference, rotor speed (drive), and current during a drive signal frequency sweep.

FIG. 37 shows a drive process P5' (second variation) that can be used instead of the drive process P5 (FIG. 29) described in the ninth embodiment of the invention. This drive process P5' applies drive control using a fixed drive frequency (step S75) instead of executing the phase difference feedback step S35 shown in drive process P5.

The drive process thus does not necessarily need to use phase difference feedback control, and can operate with a fixed drive frequency.

When acquiring the optimum phase difference at a specific frequency in the examples described above, time, a number of startup operations, or the number of times some other specific operation is executed must be counted using a suitable means. The count can also be stored in nonvolatile memory, for example, when the piezoelectric actuator is not driven so that counting resumes when the piezoelectric actuator is restarted. This eliminates the need to unconditionally execute the optimum phase difference acquisition process whenever the piezoelectric actuator starts, and enables accumulating the drive time or count when driving the piezoelectric actuator starts and stops at short intervals so that the optimum phase difference, which can vary over time with wear, can be acquired at a predetermined frequency.

The controller 65 of the drive control device 50 in each of these embodiments is rendered as a control means including a frequency control means, optimum phase difference acquisition means, acquisition frequency control means, phase difference inversion detection means, clamping means, and storage means, but each of these means can be rendered in separate controllers as desired. The controller 65 is also not limited to a hardware construction, and can be rendered in software.

The frequency at which the optimum phase difference acquisition process P1 is executed is controlled by the acquisition frequency control means to an interval of one hour in each of the preceding embodiments, but the time set as this acquisition frequency is not limited to one hour. This interval can more particularly be set to any range from multiple minutes to multiple hours according to the size of the load of the driven body. The acquisition frequency can also be adjusted according to the elapsed time since operation started to increase the frequency as the time since operation started increases, that is, to execute the optimum phase difference acquisition process at shorter time intervals.

The frequency of the optimum phase difference acquisition process can also be defined on a basis other than time. More specifically, the frequency can be defined in terms of how many times the piezoelectric actuator is started so that, for example, the frequency is set to 255 startup operations and is stored in memory in the controller. The frequency can also be set according to when the piezoelectric actuator is assembled in the electronic device. This assembly time includes replacing the piezoelectric actuator due to wear of the contact part between the oscillator and the driven body.

The method of determining this frequency can be suitably decided according to the load of the driven body or the operating mode of the piezoelectric actuator, for example. The frequency can also be set separately for forward and reverse rotation of the rotor.

In the first embodiment of the invention the optimum phase difference is defined to maximize the piezoelectric actuator drive efficiency, but the invention is not so limited. When driving at maximum drive efficiency is not necessary, the optimum phase difference can be set to a desirable drive state that does not yield the maximum drive efficiency.

The phase difference detection means 60 in these embodiments includes a phase shifter 62 and phase comparator 63, sets the target phase difference in the phase shifter 62, and controls driving to maintain this target phase difference by controlling operation so that output from the phase comparator 63 decreases. The invention is not so limited, however, and any phase difference detection means arrangement that detects the deviation between the optimum phase difference and the phase difference of the detection signal and drive signal based on the optimum phase difference, the detection signal phase, and the drive signal phase can be used. For example, if the phase difference detection means 60 (see FIG. 4, for example) is rendered by a control program installed in a computer instead of as a hardware arrangement, the target phase difference θ can be set in the phase comparator 63 instead of the phase shifter 62, and the phase comparator 63 can directly calculate the phase difference and compare the calculated phase difference with the optimum phase difference to detect the deviation of the calculated phase difference to the optimum phase difference.

The vibration characteristic of the oscillator 20A in the fifth embodiment of the invention is shown by way of example in FIG. 16, but the invention is not so limited. The slope of change in the phase difference in the optimum drive state could be rising. When sweeping the drive frequency from low frequency to high frequency in this situation, the phase difference inversion point is where the phase difference rises from the target phase difference and then drops and returns to the target phase difference. The clamping frequency is thus preferably set to a value (including the phase difference inversion frequency) on the optimum drive state side of the phase difference inversion frequency at the inversion point.

The range of drive signal frequencies that is swept in the first process, and the sweeping direction, are not limited to the range and direction described in the fifth embodiment of the invention. In the fifth embodiment of the invention the drive frequency is swept from low to high frequency in the initialization mode M1, but the drive frequencies can be swept from high frequency to low frequency, and the clamping frequency can be set on the low frequency side of the frequency in the optimum drive state G. The range of frequencies swept is also not limited to the range of 230 kHz to 280 kHz as described in the fifth embodiment of the invention, and can be suitably set according to the desired drive state.

The optimum phase difference acquisition process P1 and phase difference inversion detection process P4 in the ninth embodiment of the invention are executed when the direction of rotor 30 rotation changes (S38). This method can also be applied to the first and fifth embodiments of the invention, and devices in which the drive characteristic when the driven body is driven forward differs from when the driven body is driven in reverse can also be desirably controlled by executing the optimum phase difference acquisition process and phase difference inversion detection process constituting the initialization process when the vibration behavior of the oscillator is changed. More specifically, drive can be controlled so that the amount driven (expressed by the movement of the driven body or the current flow through the oscillator) when forward drive is applied is equal to the amount driven when reverse drive is applied, or differs by a specific amount.

The present invention is also not limited to being used in timepieces, and is suitable for use in various electronic devices, particularly portable electronic devices for which small size is essential.

Examples of such electronic devices include telephones with a clock function, cell phones, contactless IC cards, notebook computers, personal digital assistants (PDA), and cameras.

The invention can also be used in cameras that do not have a clock function, in digital cameras, video cameras, cell phones with a built-in camera function, and other electronic devices. When used in an electronic device with a camera function, the drive means of the present invention can be used to drive the lens focusing mechanism, zoom mechanism, and aperture control mechanism.

The drive means of the present invention can also be used in the meter needle drive mechanism of measuring instruments, the meter needle drive mechanism for the instrument panel of an automobile, piezoelectric buzzers, inkjet printer heads, the paper feed mechanism in printers, the drive mechanism or attitude correction mechanism in movable toys such as dolls and riding toys, ultrasonic motors, and other applications.

The piezoelectric actuator in these embodiments of the invention is used for driving the hands to indicate the time in an electronic timepiece 1, but the invention is not so limited and the piezoelectric actuator can be used to drive the mechanism for displaying the date or weekday.

The type of timepiece is also not limited to a wristwatch, and could be a pocket watch, a wall clock, or a mantle clock, for example. The invention can also be used in the mechanism for driving the works of a cuckoo clock, for example, in such timepieces.

The driven body can be a rotor that is driven rotationally or a linearly moving body that is driven in a straight line, and the direction in which the driven body is driven is not limited.

The best modes and methods of achieving the present invention are described above, but the invention is not limited to these embodiments. More specifically, the invention is particularly shown in the figures and described herein with reference to specific embodiments, but it will be obvious to one with ordinary skill in the related art that the shape, material, number, and other detailed aspects of these arrangements can be varied in many ways without departing from the technical concept or the scope of the objective of this invention.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

KEY TO THE FIGURES 1 electronic timepiece (clock, timekeeping device)
2 movement (timekeeping unit)
3 dial (time information display unit)
4 hour hand (time information display unit)
5 minute hand (time information display unit)
6 seconds hand (time information display unit)
7A chronograph seconds hand (time information display unit)
7B chronograph minutes hand (time information display unit)
20 piezoelectric actuator
20A oscillator
22 piezoelectric element
30 rotor (driven body)
50, 50A-50K drive control device
60 phase difference detection means
65, 265, 365 controller (control means)
651 frequency control means
652 optimum phase difference acquisition means
653 acquisition frequency control means
654, 657, 658 storage means
655 phase difference inversion detection means
656 clamping means
P1, P1' optimum phase difference acquisition process
P2, P2' drive process
$\theta 0, \theta 1, \theta 2$ optimum phase difference
S29 motion resetting step
T1 phase difference inversion frequency
T2 clamping frequency
TBL data table

What is claimed is:

1. A drive control method for driving a piezoelectric actuator by a drive signal being supplied to said piezoelectric actuator to drive a driven body, said drive control method comprising:
    detecting a phase difference between said drive signal and a detection signal showing an oscillation state of said piezoelectric actuator;
    acquiring an optimum phase difference, which is the phase difference that realizes a prescribed drive state of the piezoelectric actuator by sweeping a drive frequency of said drive signal;
    detecting a phase difference inversion which the phase difference reaches the optimum phase difference again except for the optimum phase difference acquired by said acquiring, by sweeping said drive frequency in a prescribed range including a prescribed drive state frequency corresponding to said prescribed drive state and in a prescribed direction;
    setting a clamping frequency to a frequency in the side of said prescribed drive state frequency from a phase difference inversion frequency corresponding to the phase difference inversion;
    prohibiting said drive frequency of said drive signal from reaching said clamping frequency; and
    making said drive frequency of said drive signal track an optimum phase difference frequency corresponding to said optimum phase difference, so that the phase difference reaches said optimum phase difference, by changing said drive frequency of said drive signal based on a difference size between said phase difference and said optimum phase difference.

2. The drive control method according to claim 1, further comprising
    reacquiring said optimum phase difference after driving for a prescribed time.

3. The drive control method according to claim 2, further comprising
    storing a frequency range between said clamping frequency and said phase difference inversion frequency.

4. The drive control method according to claim 2, wherein a drive direction of said piezoelectric actuator is switchable.

5. The drive control method according to claim 4, wherein detecting said phase difference inversion is implemented when said drive direction of said piezoelectric actuator is switched.

6. A drive control apparatus of a piezoelectric actuator having an oscillator oscillating by a drive signal being supplied to said piezoelectric actuator, said drive control apparatus comprising:

a phase difference detecting unit detectin a phase difference between said drive signal and a detection signal showing an oscillation state of said piezoelectric actuator;

an optimum phase difference acquisition unit acquiring an optimum phase difference, which is the phase difference that realizes a prescribed drive state of asid piezoelectric actuator by sweeping a drive frequency of said drive signal;

a phase difference inversion detection unit detecting a phase difference inversion frequency where the phase difference reaches the optimum phase difference again except for the optimum phase difference, by sweeping said drive frequency in a prescribed range including a prescribed drive state frequency corresponding to said prescribed drive state and in a prescribed direction;

a clamping frequency setting unit setting a clamping frequency in the side of said prescribed drive state frequency from a phase difference inversion frequency corresponding to the phase difference inversion;

a drive frequency prohibit unit prohibiting said drive signal from reaching said clamping frequency; and a control unit setting the frequency of said drive signal based on the optimum phase difference, the control unit making said drive frequency of said drive signal track an optimum phase difference frequency corresponding to said optimum phase difference, so that the phase difference reaches said optimum phase difference, by changing said drive frequency of said drive signal based on a difference size between said phase difference and said optimum phase difference, in a state of prohibiting said drive signal from reaching said clamping frequency by the drive frequency prohibit unit.

7. The drive control apparatus according to claim 6, further comprising a renewal unit acquiring said optimum phase difference again after said drive frequency prohibit unit prohibits said drive frequency of said drive signal from reaching said clamping frequency, detects said phase difference between said drive signal and said detection signal, and makes said drive frequency of said drive signal track said optimum phase difference frequency corresponding to said optimum phase difference by changing said drive frequency of said drive signal based on said difference size between said phase difference and said optimum phase difference, in a state of prohibiting said drive signal from reaching said clamping frequency by the drive frequency prohibit unit.

8. The drive control apparatus according to claim 7, wherein said control unit includes a storage unit storing a frequency range between said clamping frequency and said phase difference inversion frequency.

9. The drive control apparatus according to claim 6, wherein said oscillator oscillates in a plurality of oscillation modes, and said drive signal is a single phase.

10. The drive control apparatus according to claim 9, wherein said oscillator has a flat and substantially rectangular shape.

11. The drive control apparatus according to claim 9, wherein said oscillation modes include a longitudinal mode in which said oscillator extends in a length direction of said oscillator and a bending mode in which said oscillator bends against said length direction.

12. The drive control apparatus according to claim 6, wherein said control unit switches a drive direction of said piezoelectric actuator.

13. The drive control apparatus according to claim 12, wherein said phase difference inversion detection unit detects said phase difference inversion frequency where said phase difference reaches said optimum phase difference again except for said optimum phase difference, by sweeping said drive frequency in said prescribed range including said prescribed drive state frequency corresponding to said prescribed drive state and in said prescribed direction, when said driven direction of the piezoelectric actuator is switched by said control unit, and said clamping frequency setting unit sets said clamping frequency in the side of said prescribed drive state frequency from said phase difference inversion frequency corresponding to the phase difference inversion, when said drive direction of said piezoelectric actuator is switched.

14. An electric apparatus, comprising:

a piezoelectric actuator including an oscillator oscillating by a drive signal being supplied to said piezoelectric actuator;

a drive control apparatus of said piezoelectric actuator;

a driven body driven by said piezoelectric actuator, said drive control apparatus comprising a phase differece detecting unit detecting a phase difference between said drive signal and a detection signal showing an oscillation state of said piezoelectric actuator, an optimum phase difference acquisition unit and acquiring an optimum phase difference, which is the phase difference that realizes a prescribed drive state of said piezoelectric actuator by sweeping a drive frequency of said drive signal, a phase difference inversion detection unit detecting a phase difference inversion frequency where the phase difference reaches the optimum phase defference again except for the optimum phase difference, by sweeping said drive frequency in a prescribeb range including a prescribed drive state frequency corresponding to said prescribed drive state and in a prescribed direction, a clamping frequency setting unit setting a clamping frequency in the side of said prescribed drive state frequency from a phase difference inversion frequency corresponding to the phase difference inversion, a drive frequency prohibit unit prohibiting said drive signal from reaching said clamping frequency, and a control unit setting the frequency of said drive signal based on the optimum phase difference, the control unit making said drive frequency of said drive signal track an optimum phase difference frequency corresponding to said optimum phase difference, so that the phase difference reaches said optimum phase difference, by changing said frequency of said drive signal based on a difference size between said phase difference and said optimum phase difference, in a state of prohibiting said drive signal from reaching said clamping frequency by said drive frequency prohibit unit.

15. The electric apparatus according to claim 14, further comprising
a renewal unit acquires said optimum phase difference again after said drive frequency prohibit unit prohibits said drive frequency of said drive signal from reaching said clamping frequency, detects the phase difference between said drive signal and said detection signal, and makes said drive frequency of said drive signal tack said optimum phase difference frequency corresponding to said optimum phase difference by changing said drive frequency of said drive signal based on said difference size between said phase difference and said optimum phase difference, in a state of prohibiting said drive signal from reaching said clamping frequency by the drive frequency prohibit unit.

16. The electric apparatus according to claim 15, wherein said control unit includes a storage unit to store a frequency range between said clamping frequency and said phase difference inversion frequency.

17. The electric apparatus according to claim 15, wherein
said control unit switches a drive direction of said piezoelectric actuator.

18. The electric apparatus according to claim 15, further comprising
a time keeping unit measuring and keeping time information, and
a time information display unit connected to said piezoelectric actuator and displaying said time information.

19. The drive control method according to claim 1, wherein
acquiring said optimum phase difference includes resetting the position of the driven body that moved while acquiring said optimum phase difference to a position before acquiring said optimum phase difference.

20. The drive control method according to claim 19, wherein
making said drive frequency of said drive signal track said optimum phase difference frequency corresponding to said optimum phase difference controls a moving distance of said driven body based on the time of detecting said phase difference inversion.

* * * * *